US012518682B2

(12) United States Patent
Okamoto et al.

(10) Patent No.: US 12,518,682 B2
(45) Date of Patent: Jan. 6, 2026

(54) INFORMATION PROCESSING SYSTEM AND INFORMATION PROCESSING METHOD

(71) Applicants: Sony Group Corporation, Tokyo (JP); Sony Semiconductor Solutions Corporation, Kanagawa (JP)

(72) Inventors: Eizo Okamoto, Kanagawa (JP); Hirotomo Ema, Fukuoka (JP); Shoji Yamane, Aichi (JP); Nobutane Chiba, Kanagawa (JP); Hideki Date, Kanagawa (JP)

(73) Assignees: Sony Group Corporation (JP); Sony Semiconductor Solutions Corporation (JP)

( * ) Notice: Subject to any disclaimer, the term of this patent is extended or adjusted under 35 U.S.C. 154(b) by 0 days.

(21) Appl. No.: 18/694,736

(22) PCT Filed: Sep. 22, 2022

(86) PCT No.: PCT/JP2022/035333
§ 371 (c)(1),
(2) Date: Mar. 22, 2024

(87) PCT Pub. No.: WO2023/058465
PCT Pub. Date: Apr. 13, 2023

(65) Prior Publication Data
US 2024/0404456 A1      Dec. 5, 2024

(30) Foreign Application Priority Data

Oct. 4, 2021   (JP) ................................. 2021-163394

(51) Int. Cl.
*G09G 3/32*       (2016.01)
*G09G 5/12*       (2006.01)
(Continued)

(52) U.S. Cl.
CPC ................. *G09G 3/32* (2013.01); *G09G 5/12* (2013.01); *H04N 5/2224* (2013.01);
(Continued)

(58) Field of Classification Search
CPC ...... G09G 3/32; G09G 5/12; G09G 2300/026; G09G 2300/06; G09G 2310/08;
(Continued)

(56) References Cited

U.S. PATENT DOCUMENTS

2012/0140096 A1*   6/2012   Ostlund ............... H04N 9/3129
                                                       348/241
2022/0163868 A1*   5/2022   Wang ..................... H04N 23/73
(Continued)

FOREIGN PATENT DOCUMENTS

CN       112565620 A       3/2021
EP       3757979 A1       12/2020
(Continued)

OTHER PUBLICATIONS

International Search Report for PCT/JP2022/035333 mailed Dec. 6, 2022. 3 pages.

*Primary Examiner* — Peter D Mcloone
(74) *Attorney, Agent, or Firm* — Lerner David LLP

(57) ABSTRACT

The present technology relates to an information processing system and an information processing method capable of preventing a black belt from occurring in a case of imaging a display section. A control unit of a vertical blanking period control unit controls a vertical blanking period of a video displayed on a video wall on the basis of the exposure time of a video camera that captures the video wall. The present technology can be applied to, for example, a re-imaging system used in virtual production in which a video displayed on an LED display is re-imaged as a background, and a PC, (Continued)

a video wall controller, a video wall, a video camera, and the like constituting the re-imaging system.

17 Claims, 40 Drawing Sheets

(51) Int. Cl.
  *H04N 5/222* (2006.01)
  *H04N 23/66* (2023.01)
  *H04N 23/73* (2023.01)
  *H04N 25/531* (2023.01)
(52) U.S. Cl.
  CPC ............. *H04N 23/66* (2023.01); *H04N 23/73* (2023.01); *G09G 2300/026* (2013.01); *G09G 2300/06* (2013.01); *G09G 2310/08* (2013.01); *G09G 2320/0233* (2013.01); *G09G 2340/0435* (2013.01); *G09G 2370/022* (2013.01); *H04N 25/531* (2023.01)

(58) Field of Classification Search
  CPC .............. G09G 2320/0233; G09G 2340/0435; G09G 2370/022; H04N 23/66; H04N 23/73; H04N 23/2224; H04N 25/531
  See application file for complete search history.

(56) References Cited

U.S. PATENT DOCUMENTS

| | | | | |
|---|---|---|---|---|
| 2023/0090876 A1* | 3/2023 | Kaneko | ................ | H04N 25/535 348/229.1 |
| 2023/0113256 A1* | 4/2023 | Popp | .................... | H04N 5/2224 348/207.99 |

FOREIGN PATENT DOCUMENTS

| | | |
|---|---|---|
| JP | H11184445 A | 7/1999 |
| JP | 2017083788 A | 5/2017 |
| JP | 2019134206 A | 8/2019 |
| WO | 2018164105 A1 | 9/2018 |

* cited by examiner

FIG. 31

INFORMATION PROCESSING SYSTEM AND INFORMATION PROCESSING METHOD

CROSS-REFERENCE TO RELATED APPLICATIONS

This application is a national phase entry under 35 U.S.C. § 371 of International Application No. PCT/JP2022/035333 filed Sep. 22, 2022, which claims the priority from Japanese Patent Application No. 2021-163394 filed in the Japanese Patent Office on Oct. 4, 2021, the entire contents of which are hereby incorporated by reference.

TECHNICAL FIELD

The present technology relates to an information processing system and an information processing method, and more particularly, to an information processing system and an information processing method capable of preventing a black belt from occurring in a case where a display section is imaged.

BACKGROUND ART

In recent years, a market for a direct-view display such as a light emitting diode (LED) display is expanding. For example, a virtual production in which a background such as a landscape is reproduced by displaying the background on an LED display at a content production site and the background and a subject are imaged (re-imaged) by a camera has rapidly grown.

In such virtual production, when re-imaging is performed by a rolling shutter type image sensor in a camera, a black belt which is band-shaped luminance unevenness may occur in a re-captured image due to non-correspondence between an exposure time of the camera and a light emission cycle of an LED display. The black belt is a band-shaped region having lower luminance than other regions, and the color of the black belt is black of various concentrations.

In order to lower the visibility of the black belt, it has been devised to shorten the light emission cycle of the LED display, that is, to increase the number of times of light emission of the LED in the exposure period (see, for example, Patent Document 1).

However, in the invention described in Patent Document 1, the visibility of black belts can be reduced, but it is difficult to prevent the black belt itself from occurring.

In addition, the number of vertical blanking periods of the video displayed on the LED display, the vertical blanking periods being included in the exposure period of the camera, varies depending on the row, whereby a black belt may occur.

CITATION LIST

Patent Document

Patent Document 1: WO 2018/164105 A

SUMMARY OF THE INVENTION

Problems to be Solved by the Invention

As described above, it is desired to prevent a black belt from occurring in the case of imaging the display section, but such a demand is not sufficiently met.

The present technology has been made in view of such a situation, and an object thereof is to prevent a black belt from occurring in the case of imaging the display section.

Solutions to Problems

An information processing system according to an aspect of the present technology is an information processing system including a control unit that controls a vertical blanking period of a video displayed on a display section on the basis of an exposure time of an imaging unit that images the display section.

An information processing method according to an aspect of the present technology is an information processing method including a control step of an information processing system controlling, on the basis of an exposure time of an imaging unit that images a display section, a vertical blanking period of a video displayed on the display section.

In an aspect of the present technology, on the basis of an exposure time of an imaging unit that images a display section, a vertical blanking period of a video displayed on the display section is controlled.

Note that the information processing system may be an independent device, a module incorporated in another device, or a plurality of devices.

The information processing system according to an aspect of the present technology can be implemented by causing a computer to execute a program.

In addition, in order to implement the information processing system according to an aspect of the present technology, the program to be executed by the computer can be provided by being transmitted via a transmission medium, or being recorded on a recording medium.

BRIEF DESCRIPTION OF DRAWINGS

FIG. 31 is a block diagram illustrating a detailed configuration example of the display unit in FIG. 29.

MODE FOR CARRYING OUT THE INVENTION

Figure 1:
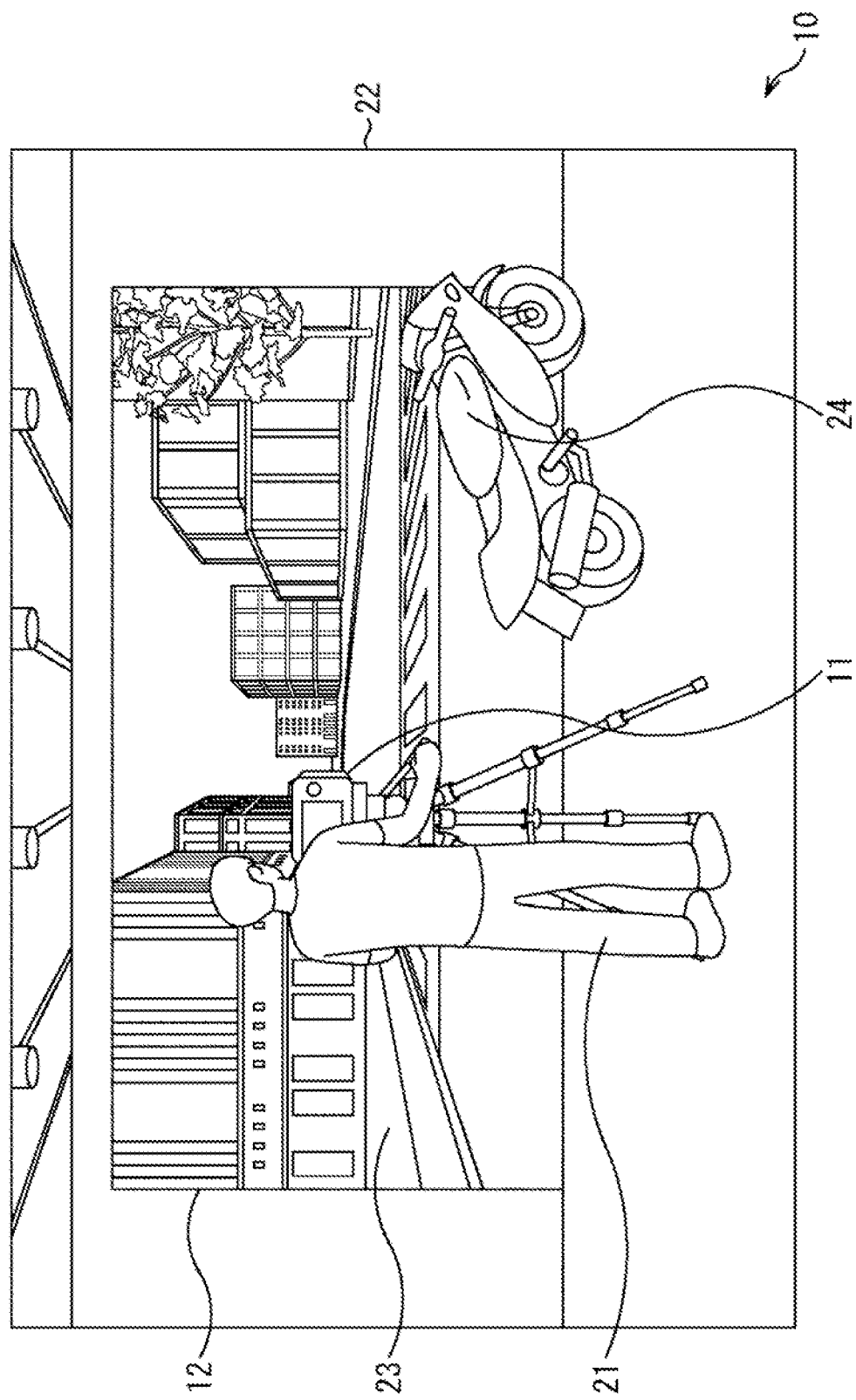
FIG. 1 is a diagram illustrating an outline of the first embodiment of a re-imaging system to which the present technology is applied.

A mode for carrying out the present technology (hereinafter, referred to as an embodiment) is hereinafter described. Note that the description will be made in the following order.
1. First Embodiment (configuration example of re-imaging system that controls refresh rate)
2. Second Embodiment (configuration example of re-imaging system that also controls vertical blanking period)
3. Third Embodiment (configuration example of re-imaging system in consideration of case where exposure period includes vertical blanking period)

Note that the same or similar portions are denoted by the same or similar reference signs in the drawings referred to in the following description.

First Embodiment

<Outline of Re-Imaging System>

FIG. 1 is a diagram for describing an outline of a first embodiment of a re-imaging system including an information processing system to which the present technology is applied.

As illustrated in FIG. 1, the re-imaging system 10 is, for example, a system used for virtual production, and includes a video camera 11 and a video wall 12. A cameraperson 21 uses the video camera 11 to re-image the motorcycle 24, which is the subject, with a video 23 displayed on the video wall 12 installed in a studio 22 as the background.

<Example of Recaptured Video>

Figure 2:
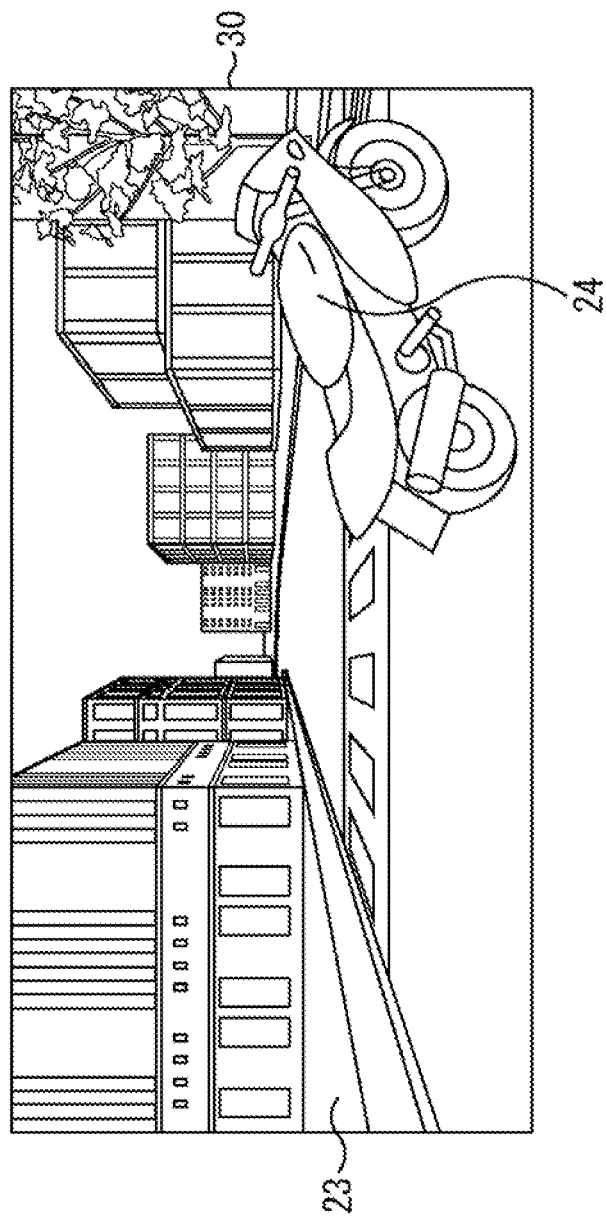
FIG. 2 is a diagram showing a video re-captured by the video camera in FIG. 1.

FIG. 2 is a diagram illustrating a video re-captured by the video camera 11 in FIG. 1.

As illustrated in FIG. 2, a video 30 re-captured by the video camera 11 is a video as if the motorcycle 24 existed at a place where the video 23 was captured. As described above, the cameraperson 21 performs re-imaging using a re-imaging system 10, so that the video 30 as if the motorcycle 24 existed at the place where the video 23 was captured can be captured by the studio 22.

<Configuration Example of Re-Imaging System>

Figure 3:
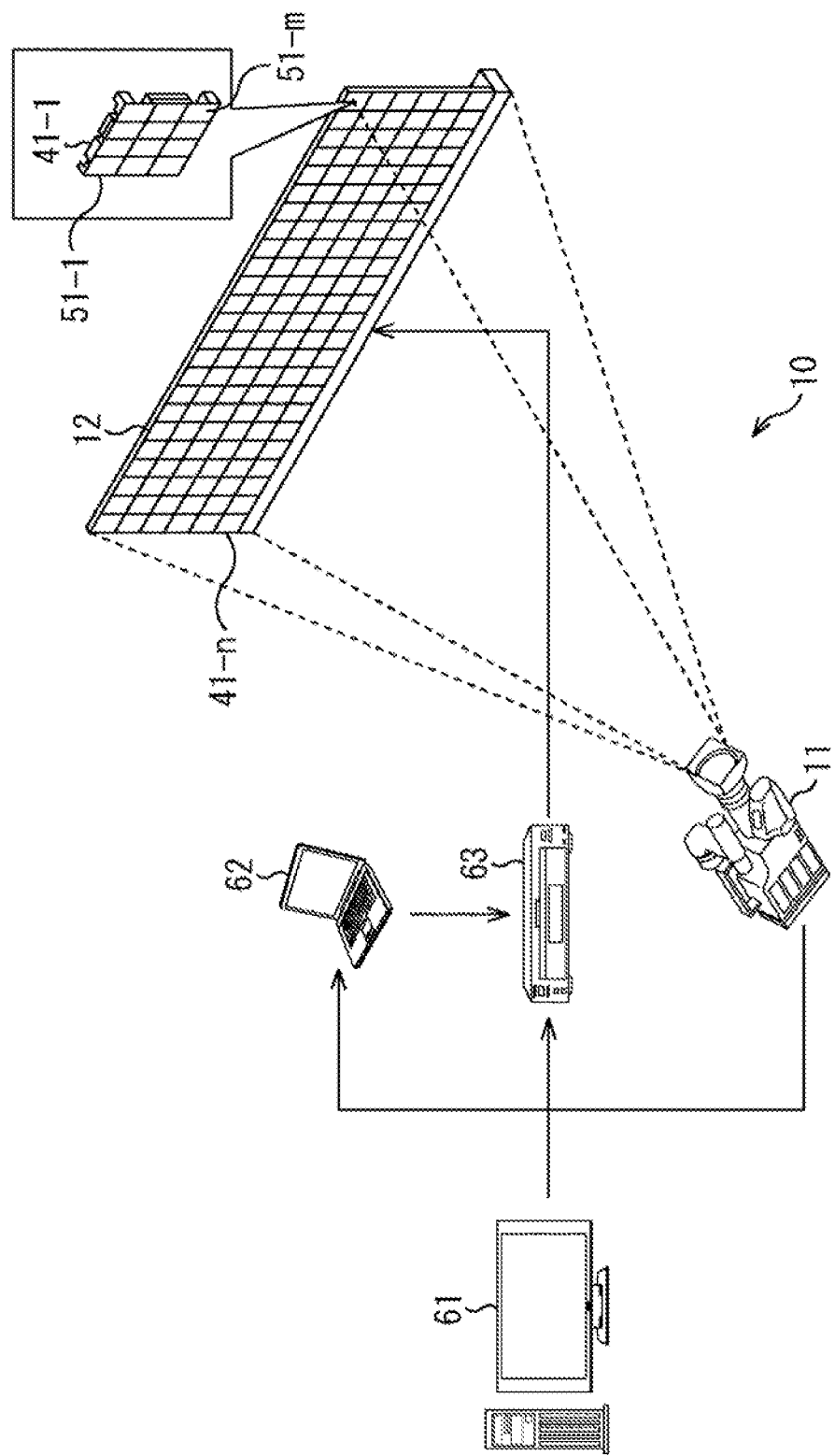
FIG. 3 is a diagram illustrating a configuration example of a re-imaging system in FIG. 1.

FIG. 3 is a diagram illustrating a configuration example of the re-imaging system 10.

As illustrated in FIG. 3, the re-imaging system 10 (information processing system) includes a video server 61, a personal computer (PC) 62, and a video wall controller 63 in addition to the video camera 11 and the video wall 12.

The video camera 11 is an imaging device that performs imaging by a rolling shutter system. Video camera 11 receives an input from the cameraperson 21, and sets an exposure time (opening angle) and the like. In addition, video camera 11 captures the video displayed on video wall 12 as the background with the set exposure time according to the imaging start instruction from the cameraperson 21. Note that, in the re-imaging system 10, a plurality of video cameras each similar to the video camera 11 may be used.

The video wall 12 (display section) is a large LED display in which n (n is a positive integer) display units (cabinets) 41-1 to 41-n are disposed in a tile shape. FIG. 3 illustrates a case where n is 6×24. Note that, hereinafter, in a case where it is not necessary to distinguish the display units 41-1 to 41-n individually, they are simply referred to as a display unit 41.

The display unit 41 includes m (m is a positive integer) LED arrays 51-1 to 51-m in which LEDs (not illustrated) corresponding to respective pixels are disposed in a matrix (two-dimensional array) in a tile shape. FIG. 3 illustrates a case where m is 4×3. Note that, hereinafter, in a case where it is not necessary to distinguish the LED arrays 51-1 to 51-m individually, they are simply referred to as an LED array 51.

Each display unit 41 of the video wall 12 is connected to a video wall controller 63. The video wall 12 displays a video corresponding to the video signal in units of frames on the basis of a video signal in units of frames and a display control signal for controlling display of the video wall 12 supplied from the video wall controller 63. Specifically, the video signal supplied to each display unit 41 is a video signal corresponding to the position of the display unit 41 on the video wall 12. Each display unit 41 displays the video based on the video signal according to the display control signal, whereby the video of one frame is displayed on the entire video wall 12.

The video server 61 includes, for example, a server computer or the like, and supplies a video signal in units of frames such as video content to the video wall controller 63. Instead of the video server 61, a video signal in units of frames may be provided from a recording medium such as a PC or a Blu-ray Disc (BD) (registered trademark) to the video wall controller 63.

The PC 62 (information processing system) is a general general-purpose computer. The PC 62 controls the video wall controller 63 by generating a control command for controlling the video wall controller 63 and transmitting the control command to the video wall controller 63.

For example, the PC 62 acquires the exposure time transmitted from the video camera 11. The PC 62 determines a refresh rate of the video wall 12 so that the exposure time corresponds to the light emission cycle of the LED of the video wall 12. Note that the refresh rate is the number of times the LED emits light in one second. The PC 62 controls the refresh rate by transmitting a refresh rate command, which is a control command representing the determined refresh rate, to the video wall controller 63.

The video wall controller 63 performs a predetermined signal process on the video signal in units of frames supplied from the video server 61. The video wall controller 63 divides the resultant video signal in units of frames into n pieces according to the position of each display unit 41 to transmit the divided video signal to each display unit 41. The video wall controller 63 also transmits a display control signal indicating a refresh rate or the like indicated by the refresh rate command to each display unit 41 on the basis of the refresh rate command supplied from the PC 62.

In the re-imaging system 10 configured as described above, the respective devices are subjected to frame synchronization by a Gen Lock signal. Therefore, for example, the exposure start time of each frame in the video camera 11 is synchronized with the display start time of each frame in the video wall 12.

Note that the video wall controller 63 and the video wall 12 may have an integrated configuration, and may be a display device in which they are integrated. Further, the PC 62, the video wall controller 63, and the video wall 12 may have an integrated configuration, and may be a display device in which they are integrated.

<Configuration Example of Video Camera>

Figure 4:
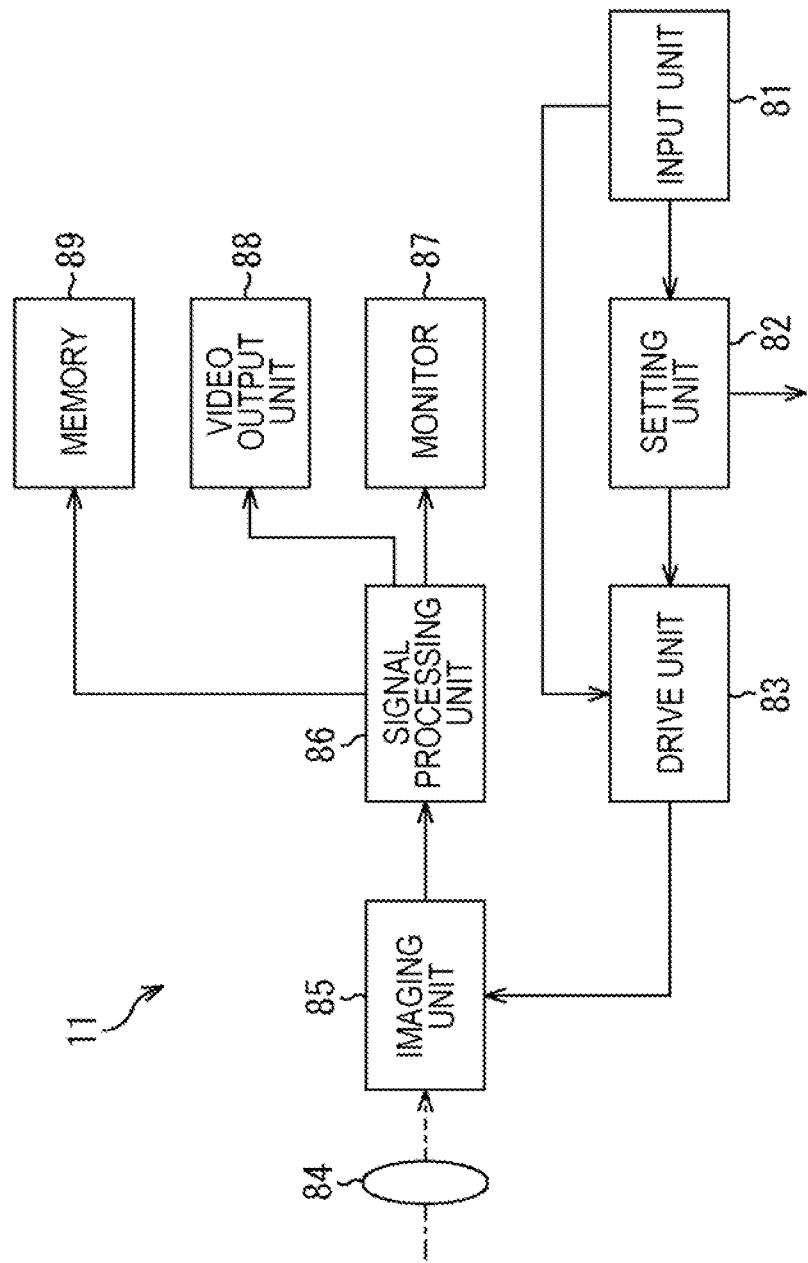
FIG. 4 is a block diagram illustrating a configuration example of the video camera in FIG. 3.

FIG. 4 is a block diagram illustrating a configuration example of the video camera 11 in FIG. 3.

The video camera 11 in FIG. 4 includes an input unit 81, a setting unit 82, a drive unit 83, an optical system 84, an imaging unit 85, a signal processing unit 86, a monitor 87, a video output unit 88, and a memory 89.

The input unit 81 receives an input from the cameraperson 21 and generates an input signal indicating the input content. For example, the cameraperson 21 operates the input unit 81 to input an appropriate exposure time in consideration of the restriction of the dynamic range when (the intensity of) light is converted into (the amount of) signal charges in the imaging unit 85. In this case, the input unit 81 generates an input signal indicating the exposure time and supplies the input signal to the setting unit 82. In a case where the cameraperson 21 operates the input unit 81 to input an imaging start instruction, the input unit 81 generates an input signal indicating imaging start and supplies the input signal to the drive unit 83.

On the basis of an input signal from the input unit 81, the setting unit 82 sets imaging information that is various types of information about imaging such as an exposure time indicated by the input signal. The setting unit 82 supplies the imaging information to the drive unit 83, and transmits the exposure time of the imaging information to the PC 62 via a wire such as a coaxial cable.

The drive unit 83 generates a drive signal that is a control signal for driving respective pixel units disposed in a matrix on the light receiving face of the imaging unit 85 on the basis of the imaging information from the setting unit 82, the imaging start instruction from the input unit 81, and the like to output the drive signal to the imaging unit 85.

The optical system 84 includes one or a plurality of lenses, guides light (incident light) from a subject or the like to the imaging unit 85, and forms an image on a light receiving face of the imaging unit 85.

The imaging unit 85 includes a complementary metal oxide semiconductor (CMOS) image sensor or the like. The imaging unit 85 drives each pixel unit according to a drive signal supplied from the drive unit 83, and performs imaging by a rolling shutter system. Specifically, in accordance with the drive signal supplied from the drive unit 83, the imaging unit 85 outputs an electric signal corresponding to the charge accumulated in each pixel unit in units of rows. Then, the imaging unit 85 starts accumulation of charges corresponding to light incident on each pixel unit via the optical system 84 in units of rows. In accordance with the drive signal supplied from the drive unit 83, the imaging unit 85 reads electric signals corresponding to the charges accumulated for the exposure time set by the setting unit 82 in units of rows and transfers the electric signals to the signal processing unit 86 in units of columns. As described above, the imaging unit 85 performs imaging with the exposure time set by the setting unit 82.

The signal processing unit 86 performs various types of signal processes on the electric signal according to the charge transferred from the imaging unit 85, and converts the electric signal into a video signal in units of frames of a predetermined digital video format. The video signal in units of frames is supplied to the monitor 87 and the video output unit 88, or supplied to the memory 89 and stored (recorded). The monitor 87 displays the video in units of frames on the basis of the video signal in units of frames supplied from the signal processing unit 86. The video output unit 88 outputs the video signal in units of frames supplied from the signal processing unit 86 to the outside of the video camera 11.

<Configuration Example of PC>

Figure 5:
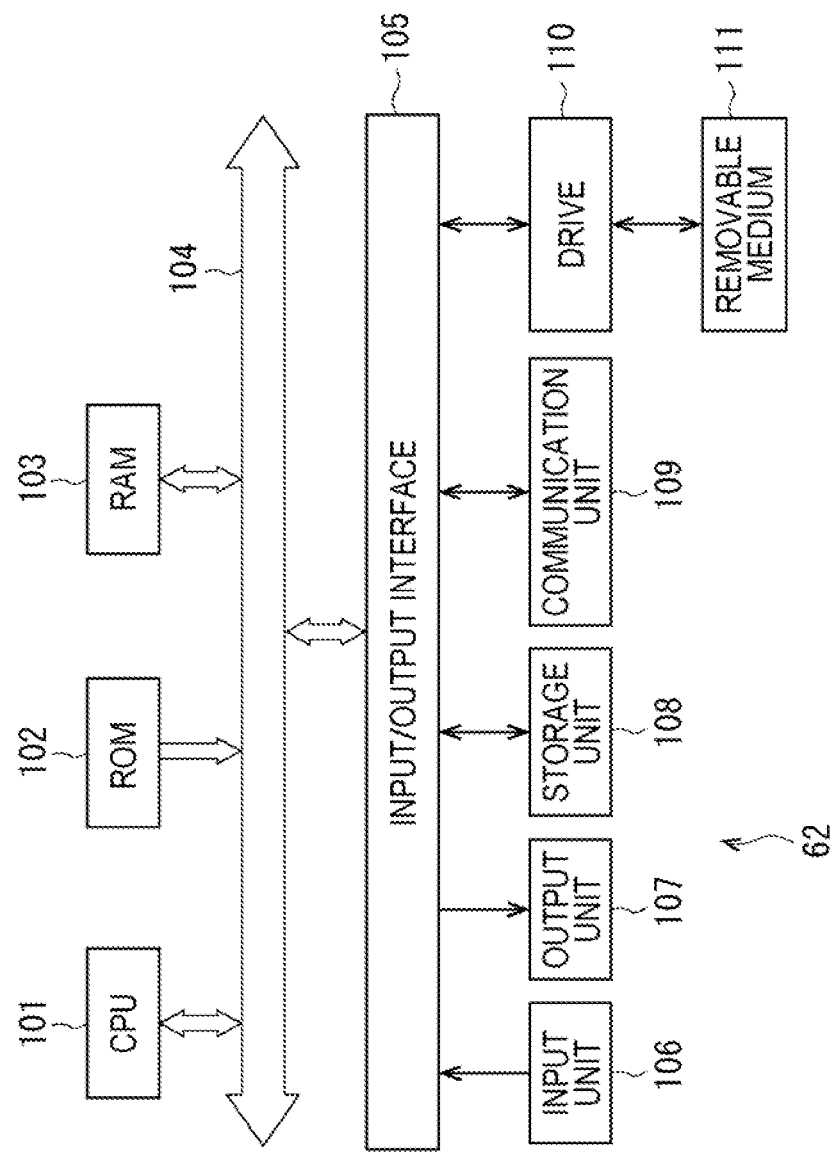
FIG. 5 is a block diagram illustrating a configuration example of hardware of the PC in FIG. 3.

FIG. 5 is a block diagram illustrating a hardware configuration example of the PC 62 in FIG. 3.

In the PC 62 of FIG. 5, a central processing unit (CPU) 101, a read only memory (ROM) 102, and a random access memory (RAM) 103 are mutually connected by a bus 104.

The bus 104 is further connected with an input/output interface 105. An input unit 106, an output unit 107, a storage unit 108, a communication unit 109, and a drive 110 are connected to the input/output interface 105.

The input unit 106 includes a keyboard, a mouse, a microphone and the like. The output unit 107 includes a display, a speaker and the like. The storage unit 108 includes a hard disk, a nonvolatile memory and the like. The communication unit 109 includes a network interface and the like. The drive 110 drives a removable medium 111 such as a magnetic disk, an optical disk, a magneto-optical disk, or a semiconductor memory.

In the PC 62 configured as described above, for example, the CPU 101 loads a program stored in the storage unit 108 into the RAM 103 via the input/output interface 105 and the bus 104 and executes the program, thereby performing various processes. For example, the CPU 101 performs refresh rate control process of controlling the communication unit 109 so as to generate a refresh rate command to transmit the refresh rate to the video wall controller 63.

The program executed by the PC 62 (CPU 101) can be provided by being recorded in the removable medium 111 as a package medium or the like, for example. Furthermore, the program may be provided via a wired or wireless transmission medium, such as a local area network, the Internet, or digital satellite broadcasting.

In the PC 62, the program can be installed in the storage unit 108 via the input/output interface 105 by attaching the removable medium 111 to the drive 110. Furthermore, the program can be received by a communication unit 109 via a wired or wireless transmission medium and installed on the storage unit 108. In addition, the program can be installed on the ROM 102 or the storage unit 108 in advance.

Note that the program executed by the PC 62 may be a program in which processing is performed in time series in the order described in the present specification, or may be a program in which processing is performed in parallel or at necessary timing such as when a call is made.

<Configuration Example of Refresh Rate Control Unit>

Figure 6:
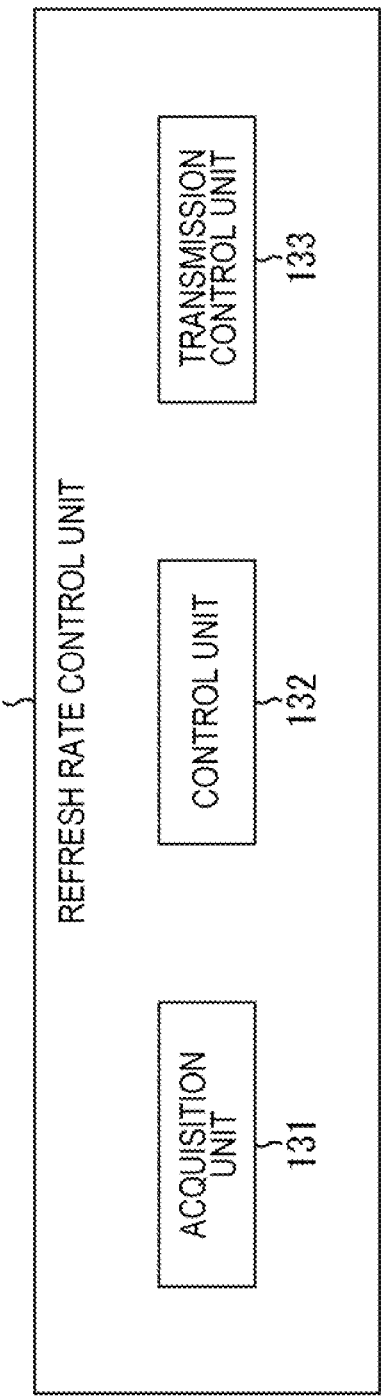
FIG. 6 is a block diagram illustrating a functional configuration example of a CPU in FIG. 5.

FIG. 6 is a block diagram illustrating a functional configuration example of the CPU 101 in a case where the CPU 101 in FIG. 5 performs the refresh rate control process.

In a case where performing the refresh rate control process, the CPU 101 functions as a refresh rate control unit 130 in FIG. 6. The refresh rate control unit 130 includes acquisition unit 131, a control unit 132, and a transmission control unit 133.

The acquisition unit 131 acquires the exposure time transmitted from the setting unit 82 of the video camera 11 and received via the communication unit 109. The acquisition unit 131 supplies the exposure time to the control unit 132.

The control unit 132 determines the refresh rate of the video wall 12 so that the exposure time supplied from the acquisition unit 131 corresponds to the light emission cycle of the LED of the video wall 12. The control unit 132 controls the refresh rate by generating a refresh rate command which is a control command (control signal) representing the refresh rate. The control unit 132 outputs the refresh rate command to the transmission control unit 133.

The transmission control unit 133 supplies the refresh rate command supplied from the control unit 132 to the communication unit 109, and instructs transmission of the refresh rate command to the video wall controller 63. As a result, the communication unit 109 transmits (outputs) the refresh rate command to the video wall controller 63 via a wire such as a local area network (LAN) cable.

<Configuration Example of Video Wall Controller>

Figure 7:
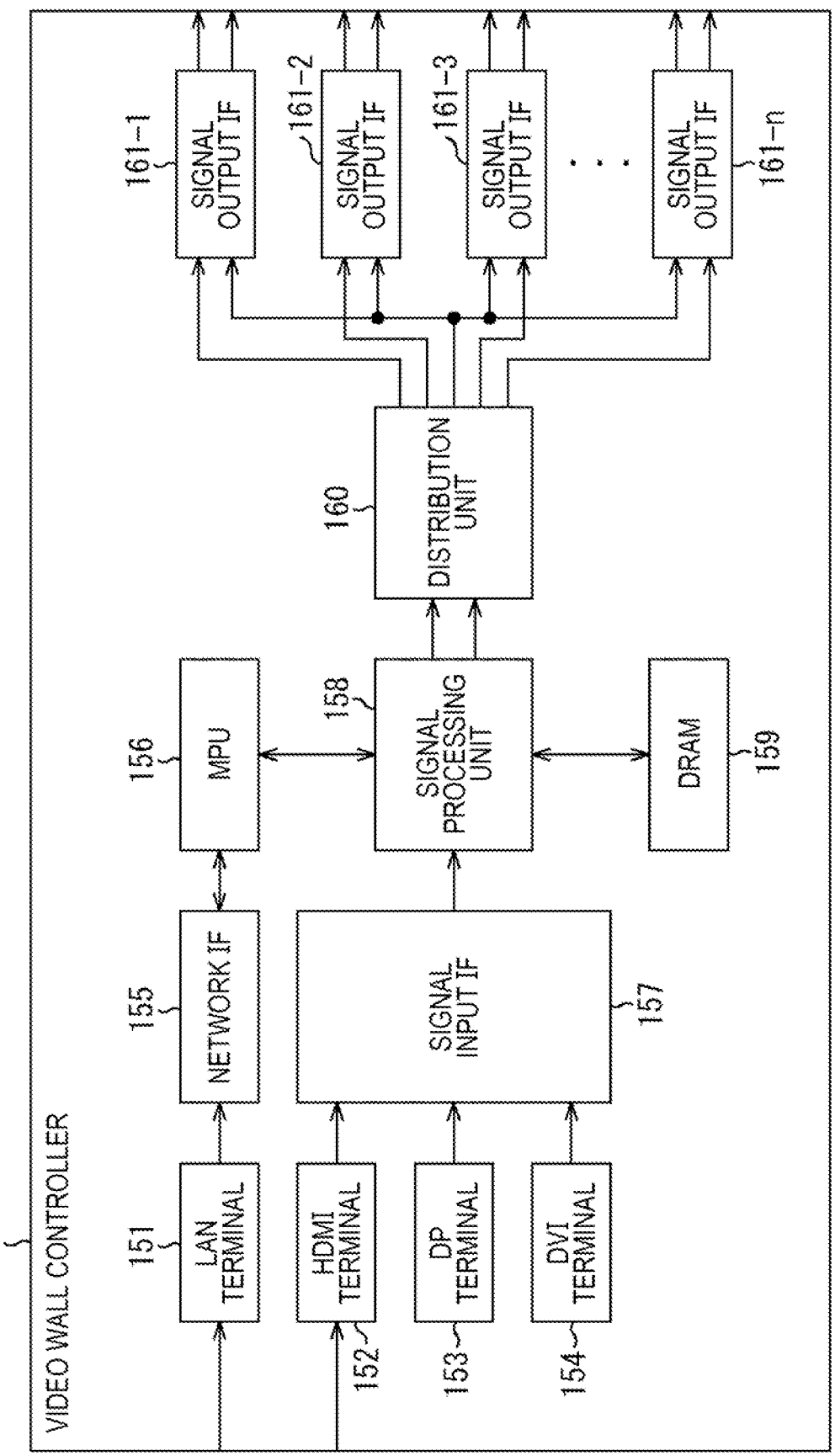
FIG. 7 is a block diagram illustrating a configuration example of a video wall controller.

FIG. 7 is a block diagram illustrating a configuration example of the video wall controller 63 of FIG. 3.

The video wall controller 63 includes a LAN terminal 151, a high definition multimedia interface (HDMI) (registered trademark) terminal 152, a display port (DP) terminal 153, a digital visual interface (DVI) terminal 154, a network interface (IF) 155, a micro processor unit (MPU) 156, a signal input IF 157, a signal processing unit 158, a dynamic random access memory (DRAM) 159, a distribution unit 160, and signal output IFs 161-1 to 161-n.

The LAN terminal 151 is a connection terminal of a LAN cable, and is connected to a LAN cable connected to the communication unit 109 of the PC 62. The LAN terminal 151 receives a control command such as a refresh rate command via the LAN cable, and supplies the control command to the MPU 156 via the network IF 155.

The MPU 156 generates a display control signal according to a refresh rate command supplied via the network IF 155. Further, the MPU 156 generates a video adjustment signal instructing adjustment of the video signal according to a video adjustment command which is a control command related to adjustment of the video signal supplied via the network IF 155. The MPU 156 supplies the display control signal and the adjustment signal to the signal processing unit 158.

The HDMI terminal 152, the DP terminal 153, and the DVI terminal 154 are all input terminals for a video signal. In the example of FIG. 7, the video server 61 and the HDMI terminal 152 are connected, and the video signal in units of frames supplied from the video server 61 is input to the HDMI terminal 152 as an input unit and acquired by the HDMI terminal 152. The video signal in units of frames input to the HDMI terminal 152 is supplied to the signal input IF 157.

Note that, in the example of FIG. 7, the video server 61 and the HDMI terminal 152 are connected, but since all of the HDMI terminal 152, the DP terminal 153, and the DVI terminal 154 have only different standards and basically have a similar function, any one thereof is selected and connected as necessary.

The signal input IF 157 converts the video signal in units of frames supplied from the HDMI terminal 152 into a video signal in units of frames in a predetermined video format, and supplies the video signal to the signal processing unit 158.

The signal processing unit 158 performs a signal process on necessary for the entire video wall 12 on the video signal in units of frames supplied via the signal input IF 157 on the basis of the video adjustment signal supplied from the MPU 156 while exchanging data with the DRAM 159 as necessary. Specifically, the signal processing unit 158 adjusts color temperature, contrast, brightness, and the like of the video signal on the basis of the video adjustment signal. The signal processing unit 158 supplies the adjusted video signal in units of frames and the display control signal supplied from the MPU 156 to the distribution unit 160.

The distribution unit 160 distributes the video signal in units of frames supplied from the signal processing unit 158 to the signal output IFs 161-1 to 161-n connected to the display units 41-1 to 41-n, respectively. Specifically, the distribution unit 160 (division unit) divides the video signal in units of frames into n pieces according to the positions of the respective display units 41, and supplies the divided video signal to any one of the signal output IFs 161-1 to 161-n connected to the display units 41. Note that, hereinafter, in a case where it is not necessary to distinguish the signal outputs IFs 161-1 to 161-n individually, they are simply referred to as a signal output IF 161. The distribution unit 160 supplies the display control signal supplied from the signal processing unit 158 to each signal output IF 161.

The signal output IF 161 (output unit) transmits the video signal in units of frames and the display control signal supplied from the distribution unit 160 to the display unit 41 connected thereto. The transmission medium for this transmission may be wired such as a LAN cable or may be wireless.

Note that, here, it is assumed that the control command is automatically transmitted from the PC 62, but may be transmitted in response to a request from the video wall controller 63.

<Detailed Configuration Example of Display Unit>

Figure 8:
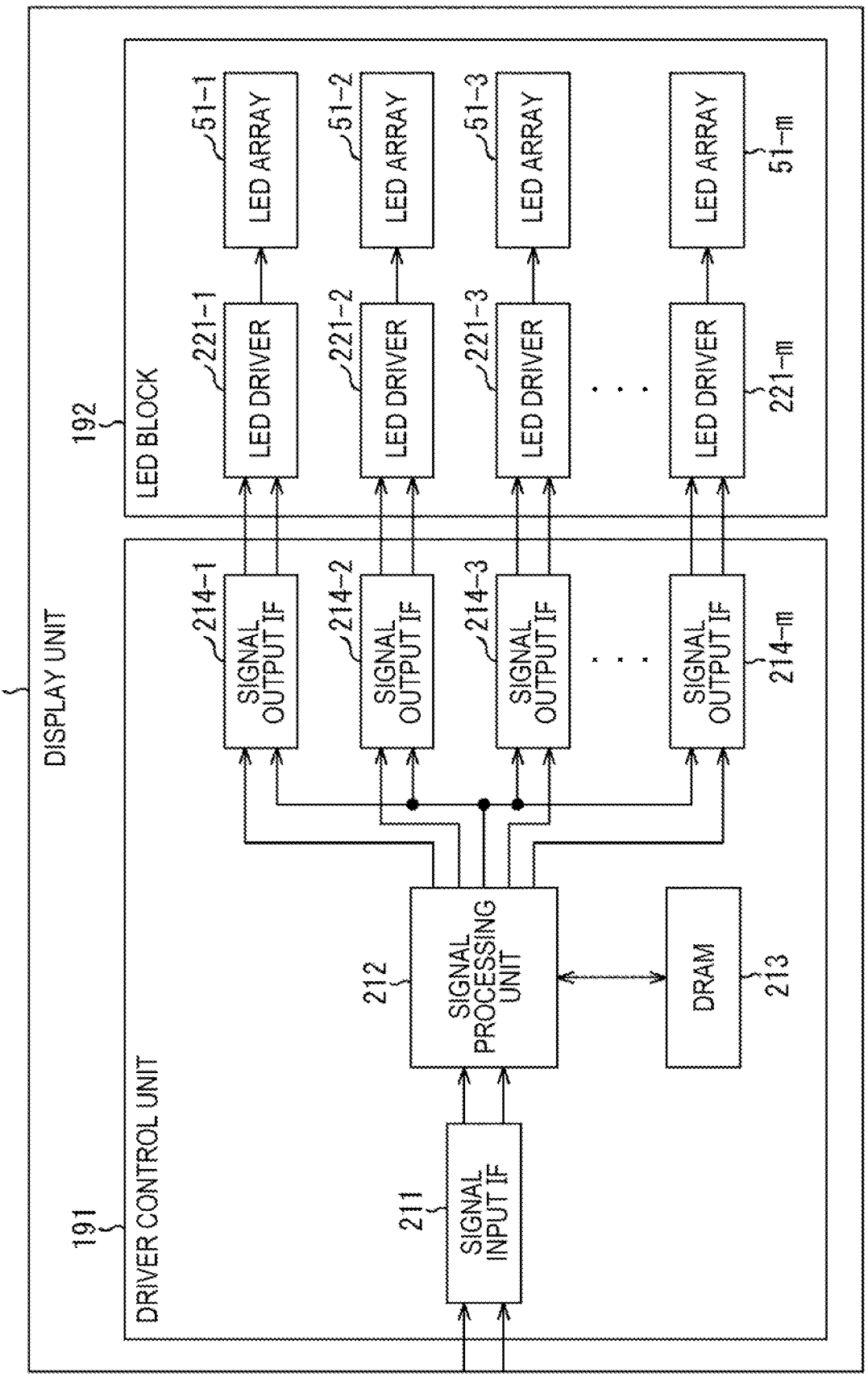
FIG. 8 is a block diagram illustrating a detailed configuration example of a display unit.

FIG. 8 is a block diagram illustrating a detailed configuration example of the display unit 41.

As illustrated in FIG. 8, the display unit 41 includes a driver control unit 191 and an LED block 192.

The driver control unit 191 includes a signal input IF 211, a signal processing unit 212, a DRAM 213, and signal output IFs 214-1 to 214-m.

The signal input IF 211 receives the video signal in units of frames and the display control signal transmitted from the video wall controller 63, and supplies the video signal and the display control signal to the signal processing unit 212.

While exchanging data with the DRAM 213 as necessary, the signal processing unit 212 individually performs signal process necessary for its own display unit 41 on the video signal in units of frames supplied from the signal input IF 211. Specifically, the signal processing unit 212 uses a color matrix look up table (LUT) or the like stored in the DRAM 213 to correct a color or luminance necessary for the display unit 41 thereof on the video signal in units of frames. The signal processing unit 212 divides the video signal in units of frames after the signal process into m pieces according to the positions of the respective LED arrays 51 on the display unit 41 thereof. For each LED array 51, the signal processing unit 212 generates, on the basis of the video signal in units of frames after the signal process, a display signal in units of frames for setting the light emission intensity of each LED constituting the LED array 51.

Signal output IFs 214-1 to 214-m respectively corresponding to the LED arrays 51-1 to 51-m are connected to the signal processing unit 212. Note that, hereinafter, in a case where it is not necessary to distinguish the signal outputs IFs 214-1 to 214-m individually, they are simply referred to as a signal output IF 214. The signal processing unit 212 supplies the display signal of each LED array 51 to the signal output IF 214 corresponding to the LED array 51. The signal processing unit 212 also supplies the display control signal supplied from the signal input IF 211 to each signal output IF 214.

The signal output IF 214 transmits the display signal and the display control signal supplied from the signal processing unit 212 to the LED block 192.

The LED block 192 includes LED drivers 221-1 to 221-m and LED arrays 51-1 to 51-m.

The LED drivers 221-1 to 221-m are connected to the signal output IFs 214-1 to 214-m of the driver control unit 191, respectively, and are connected to the LED arrays 51-1 to 51-m, respectively. Note that, hereinafter, in a case where it is not necessary to distinguish the LED drivers 221-1 to 221-m individually, they are simply referred to as an LED driver 221.

The LED driver 221 drives each LED 241 by performing pulse width modulation (PWM) control of light emission of each LED constituting the LED array 51 connected to the LED driver 221 on the basis of the display control signal and the display signal transmitted from the signal output IF 214 connected to the LED driver 221. Specifically, the LED driver 221 generates a PWM signal that is a digital signal so that each LED 241 of the LED array 51 emits light at an intensity based on the display signal corresponding to the LED 241 by a refresh rate indicated by the display control signal in one second, and supplies the PWM signal to the each LED 241. As a result, the LED array 51 displays the video corresponding to the position of the LED array 51 on the video wall 12 in the video corresponding to the video signal in units of frames output from the video server 61.

<Configuration Example of LED Array>

Figure 9:
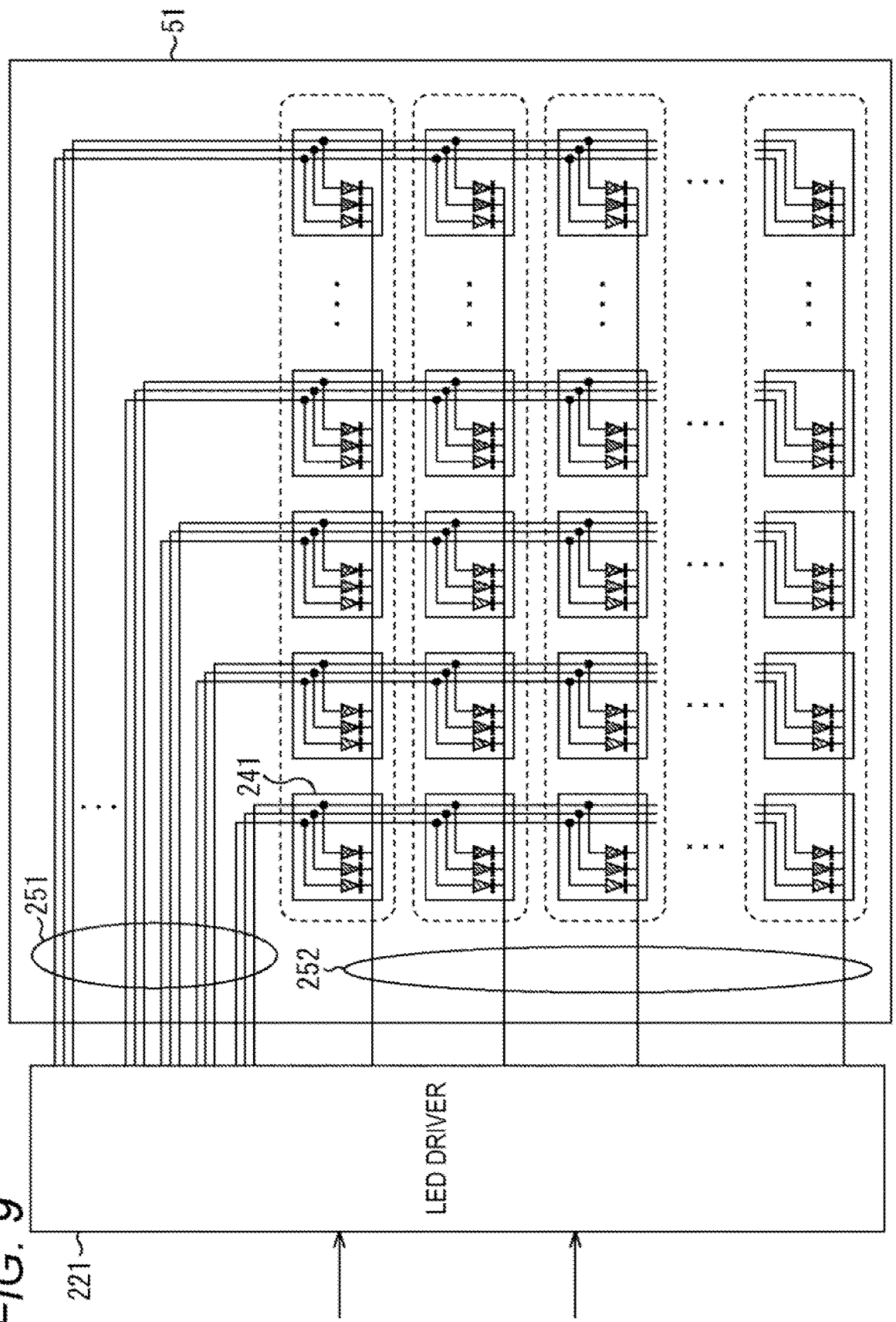
FIG. 9 is a diagram illustrating a configuration example of an LED array.

FIG. 9 is a diagram illustrating a configuration example of the LED array 51 of FIG. 8.

As illustrated in FIG. 9, light emission of the LED array 51 is controlled by a passive matrix driving system.

Specifically, the LED array 51 includes p x p (p is a positive number) LEDs 241, a luminance control line (Sig line) 251, and a row selection line (Scan line) 252. The LED 241 is a common cathode type LED. The p x p LEDs 241 are disposed in a matrix in which p LEDs are disposed in the row direction (vertical direction) and p LEDs are disposed in the column direction (lateral direction). In the example of FIG. 9, the number of LEDs 241 in the row direction and the number of LEDs in the column direction are the same p, but the number of LEDs 241 in the row direction and the number of LEDs in the column direction may be different.

The luminance control line 251 is provided for each column of the LEDs 241, and the same luminance control line 251 is connected to the LEDs 241 in each column. The row selection line 252 is provided for each row of the LEDs 241, and the same row selection line 252 is connected to the LEDs 241 in each row.

On the basis of the display control signal supplied from the signal output IF 214, the LED driver 221 controls the light emission timing of the LED 241 in each row so that the LEDs 241 emits light for each row in a light emission cycle corresponding to the refresh rate indicated by the display control signal.

Specifically, the LED driver 221 performs at least one of adjustment of the frequency of the reference clock or adjustment of the interval until light emission of the next row so that the LEDs 241 sequentially emit light in units of rows from the upper row and the light emission is performed at an interval corresponding to the refresh rate indicated by the display control signal. As a result, the LED driver 221 applies, at the light emission timing of the LED 241 of each row, a predetermined fixed potential to the row selection line 252 corresponding to the each row. Note that the predetermined fixed potential is generally a GND potential (0 V potential), but is not limited thereto.

The LED driver 221 also inputs, at the light emission timing of the LEDs 241 of each row, the PWM signal of each LED 241 of the each row to the luminance control line 251 corresponding to the column of the LED 241 on the basis of the display signal 1 in units of frames supplied from the signal output IF 214.

As described above, in the LED array 51, at the light emission timing of the LEDs 241 of each row, each LED 241 of the each row emits light of luminance based on the display signal of the LED 241. As a result, in the LED array 51, the video corresponding to the video signal is displayed in units of rows from the upper row, and this video is refreshed (updated) by the refresh rate in one second.

<Description of Light Emitting Operation of LED Array>

Figure 10:
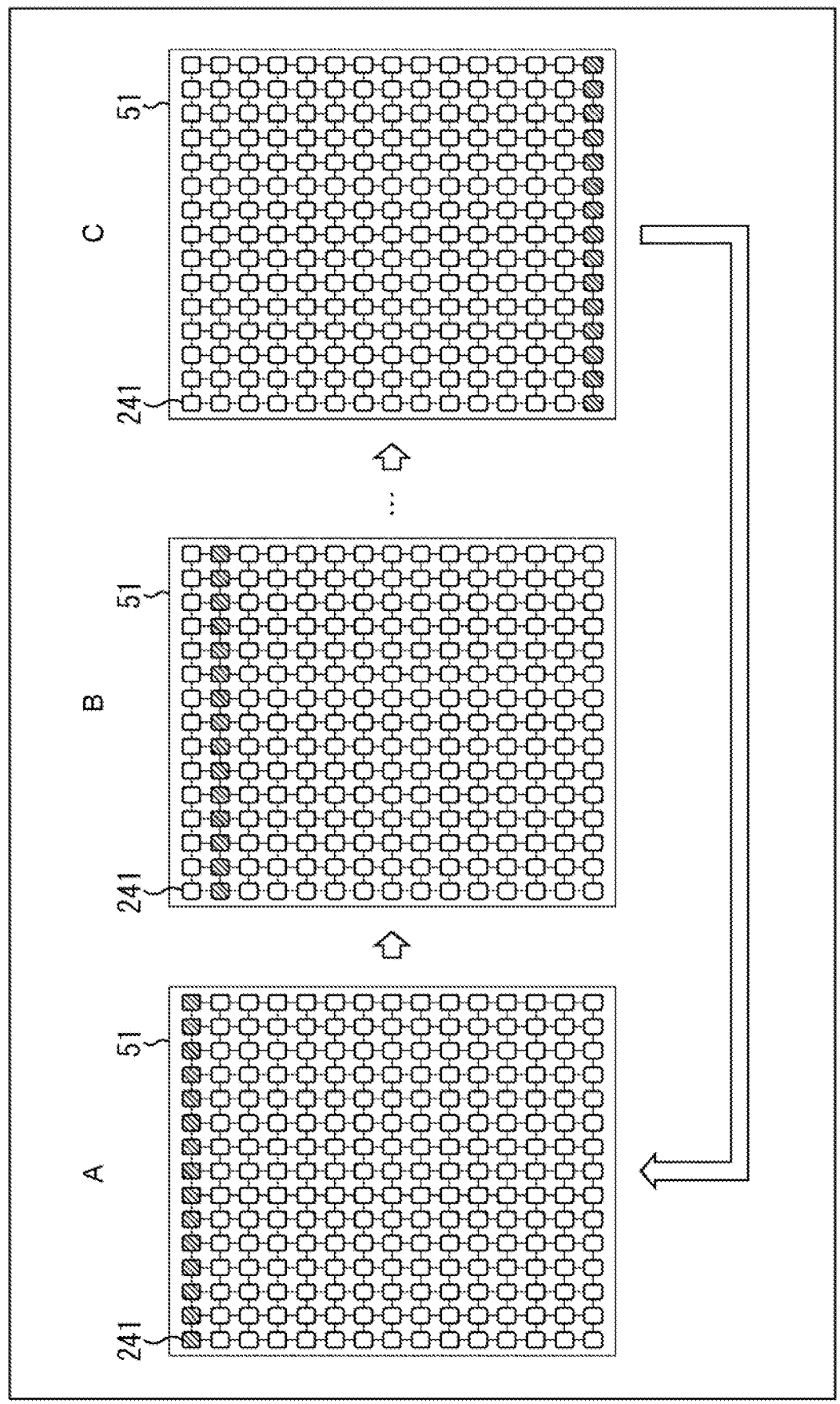
FIG. 10 is a diagram for describing a light emitting operation of the LED array.

FIG. 10 is a diagram for describing a light emitting operation of the LED array 51.

In the example of FIG. 10, the LED array 51 includes 15×15 LEDs 241.

As illustrated in A of FIG. 10, in the LED array 51, first, the LEDs 241 in the first row from the top emit light with luminance corresponding to the display signal under the control of the LED driver 221. Next, as illustrated in B of FIG. 10, under the control of the LED driver 221, the LEDs 241 in the second row from the top emit light with luminance corresponding to the display signal. Thereafter, similarly, the row of the LEDs 241 to be emitted sequentially descend, and as illustrated in C of FIG. 10, the LEDs 241 in the lowermost row emit light with luminance corresponding to the display signal under the control of the LED driver 221. As described above, the video corresponding to the position of the LED array 51 on the video wall 12 in the video corresponding to the video signal for one frame is displayed on the LED array 51. In the present specification, this is referred to as one scan.

After the first scan, as illustrated in A of FIG. 10, under the control of the LED driver 221, the LEDs 241 in the first row from the top again emit light with luminance corresponding to the display signal. Thereafter, light emission of the LEDs 241 in units of rows is similarly repeated, and scanning is performed by the refresh rate in one second. For example, in a case where the refresh rate indicated by the display control signal is 3840 Hz and the frame rate of the video signal is 60 p (60 frames/second in a progressive manner, that is, 60 Hz), the number of times of scanning in one frame section is 64 (=3840 Hz/60 Hz). Since the refresh rate is the number of times of scanning performed in one second, it can also be referred to as a scan speed.

<Description of Light Emission Cycle>

Figure 11:
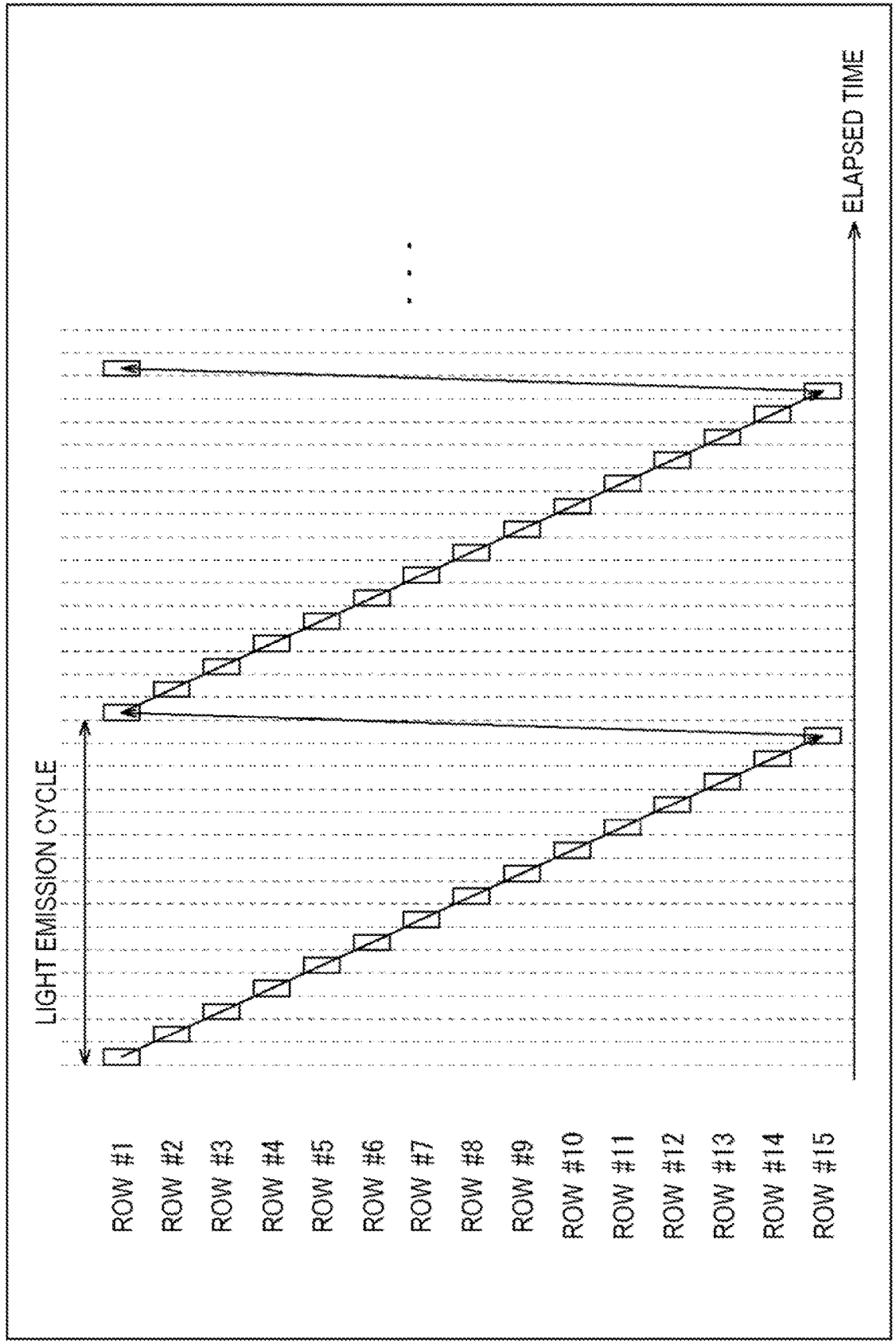
FIG. 11 is a diagram for describing a light emission cycle of the LED array.

FIG. 11 is a diagram for describing a light emission cycle of the LED array 51.

In the example of FIG. 11, the LED array 51 includes 15×15 LEDs 241. In the graph of FIG. 11, the horizontal axis represents the elapsed time from the start of display of the video wall 12, and the vertical axis represents the row of the LED array 51. In the graph of FIG. 11, the i-th row of the LED array 51 from the top is denoted as a row #i. A rectangle in the graph of FIG. 11 indicates that the LEDs 241 in the row corresponding to the position in the vertical direction emit light with luminance corresponding to the display signal at the elapsed time corresponding to the position in the lateral direction of the rectangle.

As illustrated in FIG. 11, in the LED array 51, light emission is performed in units of rows from the LEDs 241 in the upper row. In a case where the light emission of the LEDs 241 of all of the rows #1 to #15 ends, that is, when one scan ends, the next scan is started. The cycle of one scan is the light emission cycle of the LED 241 and is the reciprocal of the refresh rate. For example, in a case where the refresh rate is 3840 Hz, the light emission cycle is 1/3840 seconds.

<Description of Cause of Black Belt Occurrence>

Figure 12:
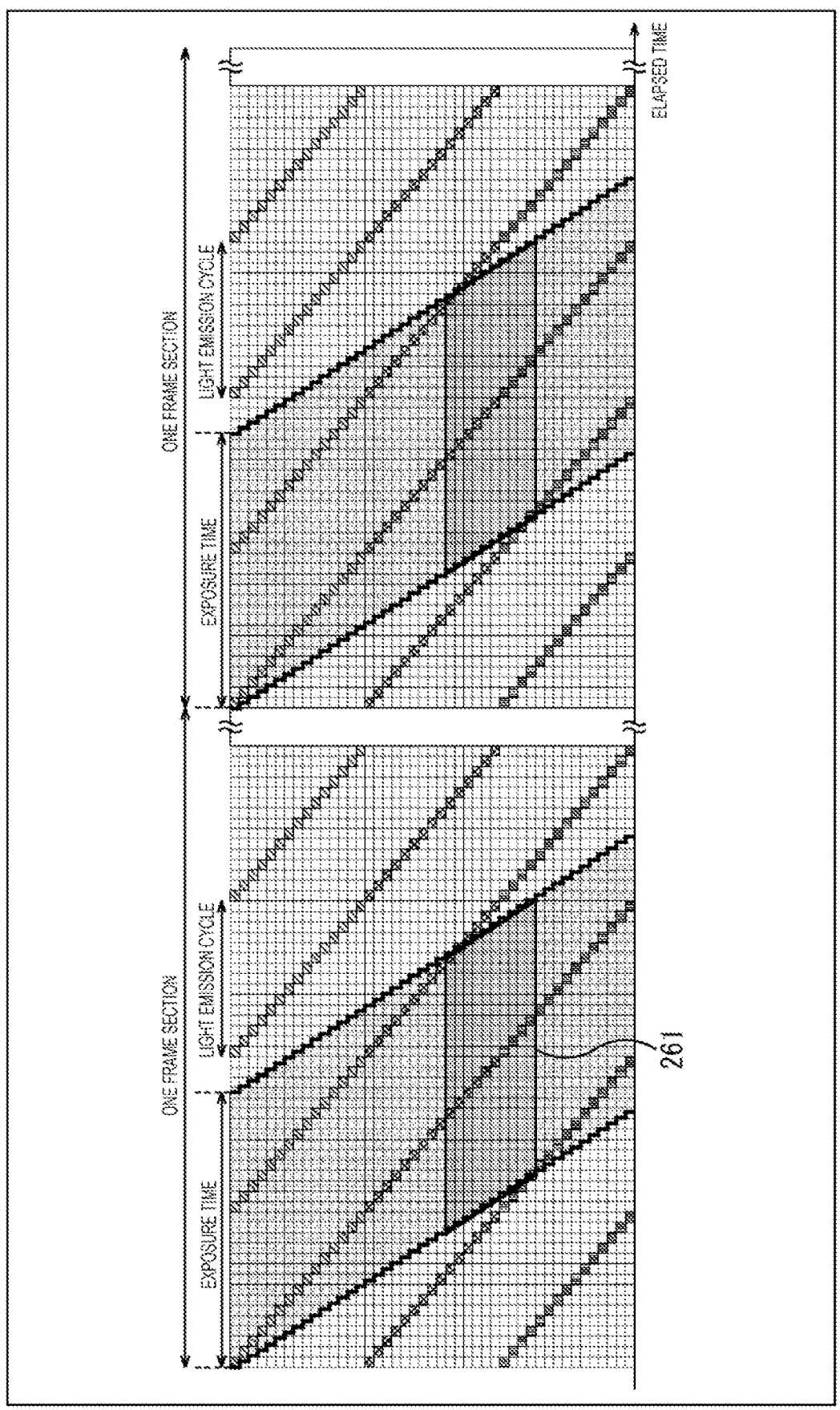
FIG. 12 is a diagram for describing a cause of occurrence of black belts.

FIG. 12 is a diagram illustrating a cause of occurrence of a black belt in a video re-captured by the re-imaging system in a case where the exposure time is not an integral multiple of the light emission cycle of the LED.

In FIG. 12, the horizontal axis represents the elapsed time from the start of display, the vertical axis represents the row of LEDs, and the upper position in the figure indicates that the position of the row of LEDs is higher. In the example of FIG. 12, the number of rows of LEDs constituting the LED array is 15, and three LED arrays disposed in the row direction (vertical direction) are illustrated. In FIG. 12, a patterned rectangle indicates that the LED in the row corresponding to the position in the vertical direction of the rectangle emits light at the elapsed time corresponding to the position in the lateral direction of the rectangle. The quadrangular pattern is different for each LED array including the LEDs in units of rows corresponding to the quadrangle. The fact is similar to that of FIG. 14 described later.

As illustrated in FIG. 12, first, the LEDs in the first row of each LED array from the top array emit light. Next, the LEDs in the second row of each LED array from the top array emit light. Thereafter, similarly, the LEDs emit light in units of rows from the upper row of each LED array, and when the LED in the last row emits light, each LED array ends the first scan. In a case where the first scan ends, each LED array starts the second scan.

Thereafter, each LED array repeats scanning in a similar manner, and each LED array performs scanning the number of times corresponding to the refresh rate within one frame section. In the example of FIG. 12, the refresh rate is four times the frame rate, and scanning is performed four times within one frame section. That is, in the example of FIG. 12, in a case where the frame rate is 60 p, the refresh rate is 240 Hz.

On the other hand, the video camera performs the rolling shutter type imaging in a predetermined exposure time. Therefore, the exposure by the light of the LEDS of each row is sequentially performed from the upper row, and the exposure start timing of each row is different. Note that since each device of the re-imaging system performs frame synchronization, the exposure start time and the display start time of one frame are synchronized.

In such a case, in a case where the exposure time of the video camera and the light emission cycle (scan cycle) of the LED do not correspond to each other, that is, in a case where the exposure time is not an integral multiple of the light emission cycle of the LED, the number of times of scanning (the number of times of light emission of the LED) in the exposure period is not uniform in each row. In the example of FIG. 12, the LED emits light only once during the exposure period in the row in which the exposure period is in the range of the rectangle 261, but the LED emits light twice during the exposure period in the row in which the exposure period is outside the range of the rectangle 261. Therefore, the luminance of the pixels in the row in which the exposure period is in the range of the rectangle 261 and which is re-imaged by the video camera is lower than the luminance of the pixels in the row in which the exposure period is outside the range of the rectangle 261. As a result, in the video re-captured by the video camera, the video of the row in which the exposure period is in the range of the rectangle 261 is the black belt.

<Example of Re-Captured Video in which Black Belt Occurs>

Figure 13:
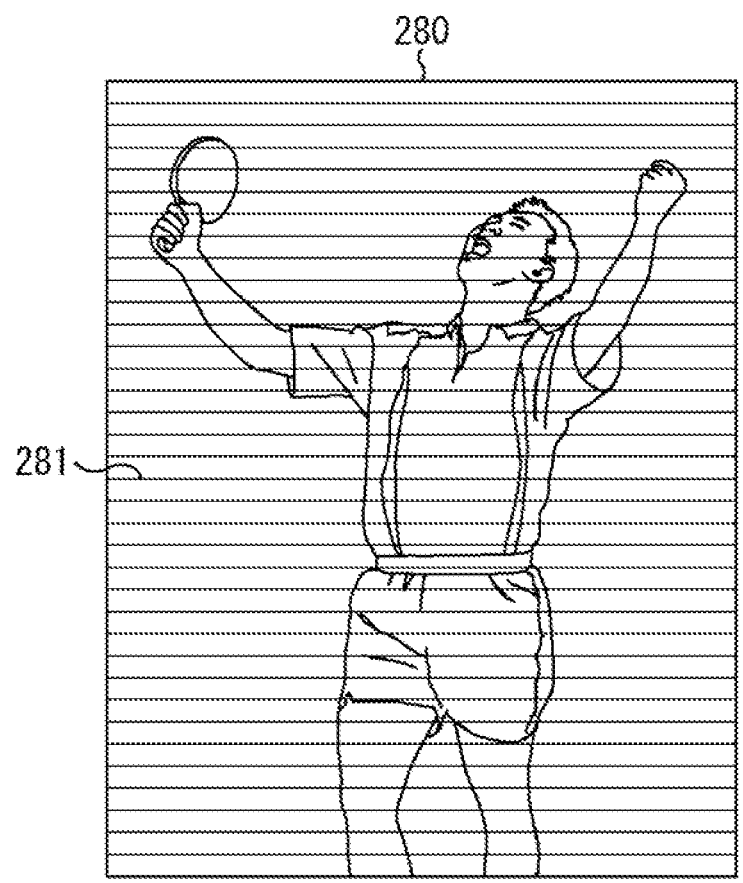
FIG. 13 is a view illustrating an example of a re-captured video in which a black belt has occurred.

FIG. 13 is a diagram illustrating an example of a re-captured video in which a black belt has occurred due to the cause described in FIG. 12.

In the example of FIG. 13, the refresh rate is 3840 Hz. In the example of FIG. 13, the video camera performs re-imaging with a person holding a table tennis racket as a subject and a video displayed on the video wall as a background. In a re-captured video 280 obtained as a result, the horizontally striped black belts 281 may occur as artifacts due to the cause described with reference to FIG. 12. In the virtual production, occurrence of the black belt 281 that does not exist at the imaging site in the re-captured video deteriorates the quality of the re-captured video.

<Description of Refresh Rate Control>

Figure 14:
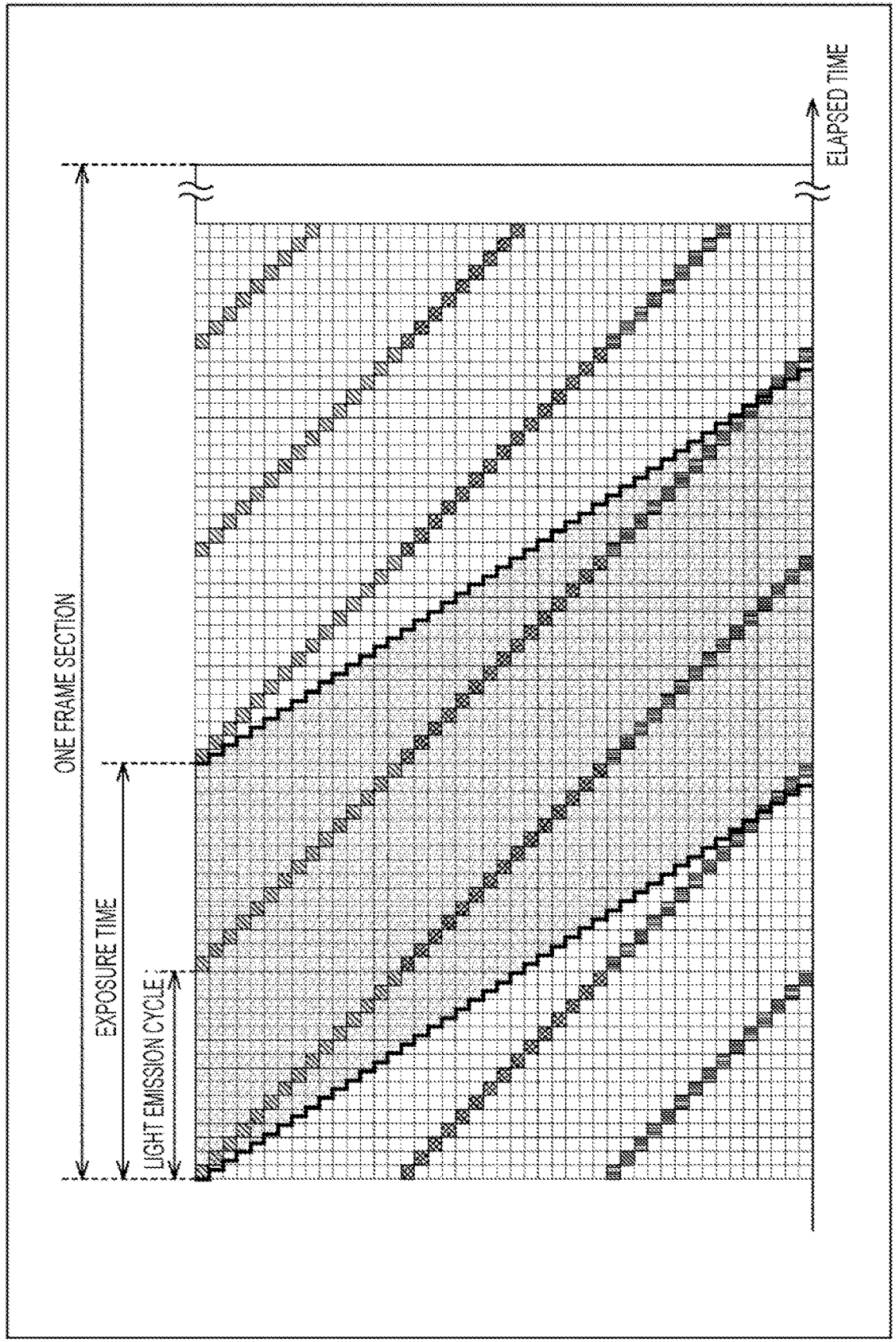
FIG. 14 is a diagram for describing a refresh rate control by a control unit.

FIG. 14 is a diagram illustrating control of the refresh rate by the control unit 132 in FIG. 6.

As illustrated in FIG. 14, the control unit 132 determines the refresh rate so that the exposure time of the video camera 11 and the light emission cycle correspond to each other. Specifically, for example, the control unit 132 synchronizes the exposure start time and the scan start time, and controls the refresh rate so that the exposure time is an integral multiple of the light emission cycle.

In the example of FIG. 14, the control unit 132 controls the refresh rate to be 4.6 times the frame rate so that the exposure time is twice the light emission cycle. As a result, the scan speed increases as compared with the case of FIG. 12, and the number of times of scanning in the exposure period is twice in all rows. As a result, in the video signal in units of frames re-captured by video camera 11, a row of pixels having low luminance does not occur, and a black belt does not occur.

In the example of FIG. 14, the refresh rate is controlled to increase as compared with the example of FIG. 12, but the refresh rate is only required to be controlled so that the exposure time and the light emission cycle correspond to each other, and may be controlled to decrease as compared with the example of FIG. 12.

<Description of Imaging Process>

Figure 15:
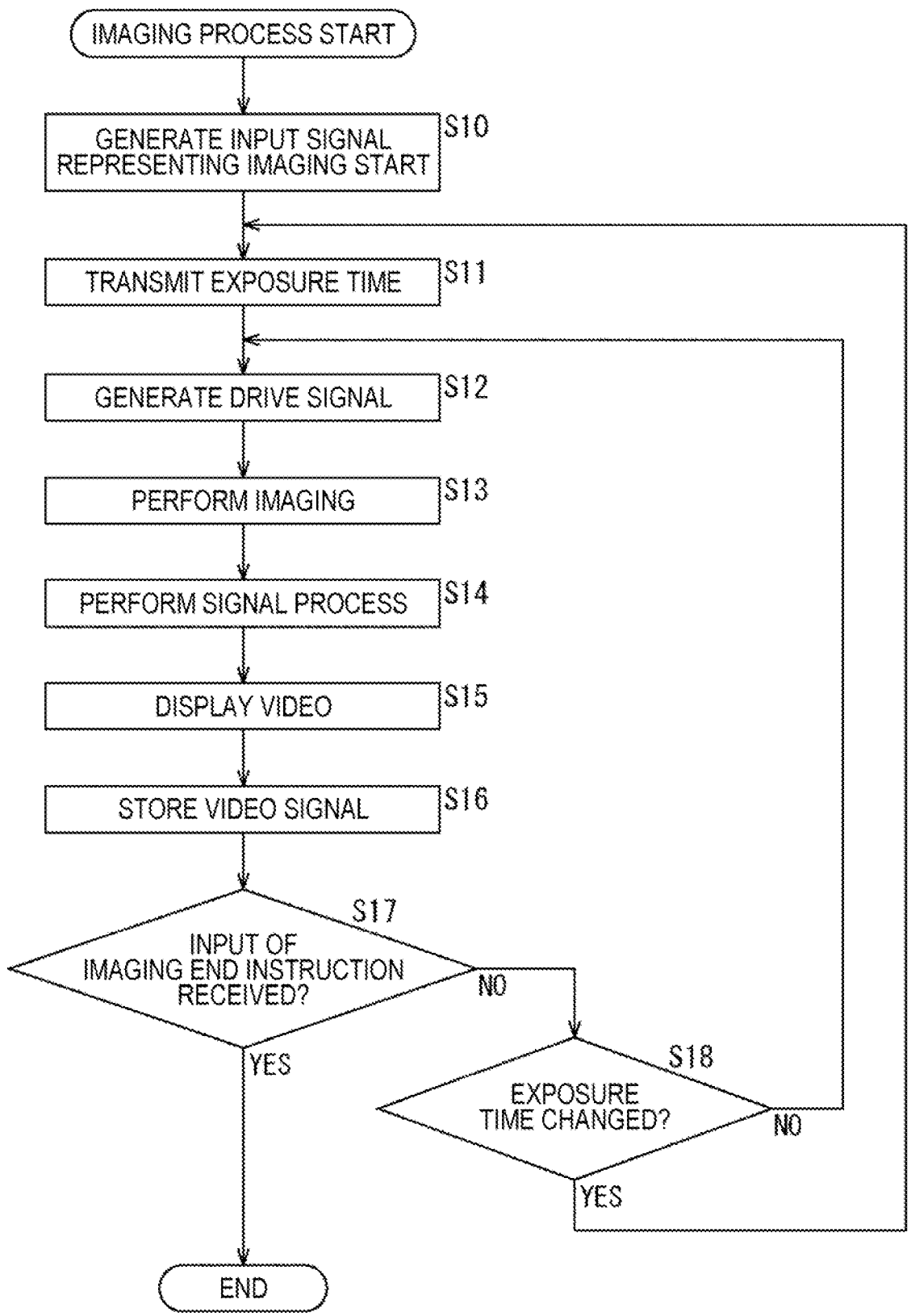
FIG. 15 is a flowchart illustrating an imaging process of the video camera in FIG. 4.

FIG. 15 is a flowchart illustrating an imaging process of the video camera 11. This imaging process is started, for example, when the cameraperson 21 operates the input unit 81 to input an imaging start instruction.

In step S10 of FIG. 15, the input unit 81 receives an input of an imaging start instruction from the cameraperson 21, generates an input signal indicating the imaging start, and supplies the input signal to the drive unit 83.

In step S11, the setting unit 82 transmits the exposure time among the set imaging information to the PC 62, and supplies the imaging information to the drive unit 83. The imaging information is input by the cameraperson 21 operating the input unit 81, and is set by the setting unit 82 on the basis of an input signal generated by the input unit 81 according to the input.

In step S12, the drive unit 83 generates a drive signal on the basis of the imaging information supplied from the setting unit 82 in step S11, and supplies the drive signal to the imaging unit 85.

In step S13, the imaging unit 85 performs imaging by the rolling shutter system according to the drive signal supplied from the drive unit 83 in step S12, and transfers the charge accumulated for the exposure time in each pixel unit to the signal processing unit 86.

In step S14, the signal processing unit 86 performs various types of signal process on the signal of the charge transferred from the imaging unit 85, and converts the signal into a video signal in units of frames of a predetermined digital video format.

In step S15, the signal processing unit 86 supplies the video signal in units of frames obtained as a result of the process in step S14 to the monitor 87 to display the video in units of frames corresponding to the video signal. At this time, the signal processing unit 86 also supplies the video signal in units of frames obtained as a result of the process in step S14 to the video output unit 88 as necessary, and causes the video output unit 88 to output the video signal to the outside of the video camera 11.

In step S16, the signal processing unit 86 supplies the video signal in units of frames obtained as a result of the process in step S14 to the memory 89, thereby storing the video signal in the memory 89.

In step S17, the input unit 81 determines whether or not an input of an imaging end instruction has been received from the cameraperson 21. In a case where it is determined in step S17 that the input of the imaging end instruction has not been received yet, the process proceeds to step S18.

In step S18, the setting unit 82 determines whether or not the exposure time has been changed. Specifically, the setting unit 82 determines whether or not an input signal indicating a new exposure time is supplied from the input unit 81. In a case where an input signal indicating a new exposure time is supplied from the input unit 81, the setting unit 82 determines that the exposure time has been changed in step S18. Then, the setting unit 82 sets the exposure time as a new exposure time, returns the process to step S11, and repeats the subsequent processing.

On the other hand, in a case where the input signal indicating the new exposure time is not supplied from the input unit 81, the setting unit 82 determines in step S18 that the exposure time is not changed. Then, the setting unit 82 returns the process to step S13 and repeats the subsequent processing.

In a case where it is determined in step S17 that the input of the imaging end instruction is received, the imaging process ends.

<Description of Refresh Rate Control Process>

Figure 16:
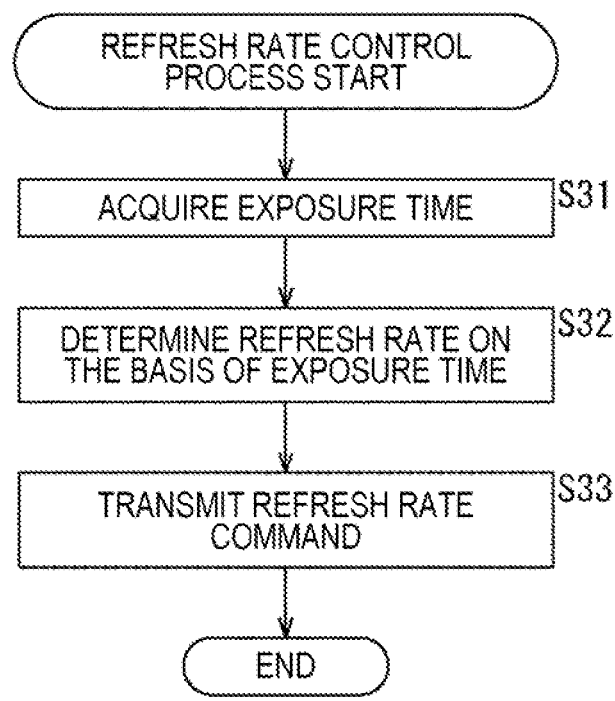
FIG. 16 is a flowchart for describing a refresh rate control process.

FIG. 16 is a flowchart illustrating a refresh rate control process of the refresh rate control unit 130 in FIG. 6. This refresh rate control process is started, for example, when the exposure time is transmitted from the setting unit 82 of the video camera 11 by the process in step S11 in FIG. 15.

In step S31 of FIG. 16, the acquisition unit 131 acquires the exposure time transmitted from the setting unit 82 and received via the communication unit 109, and supplies the exposure time to the control unit 132.

In step S32, the control unit 132 determines the refresh rate of the video wall 12 so that the exposure time and the light emission cycle of the LED 241 correspond to each other on the basis of the exposure time supplied from the acquisition unit 131 in step S31. The control unit 132 generates a refresh rate command indicating the refresh rate, and supplies the refresh rate command to the transmission control unit 133.

In step S33, the transmission control unit 133 supplies the refresh rate command supplied from the control unit 132 in step S32 to the communication unit 109, instructs transmission to the video wall controller 63, and causes the video wall controller 63 to transmit the refresh rate command. Then, the process ends.

<Description of Video Signal Process>

Figure 17:
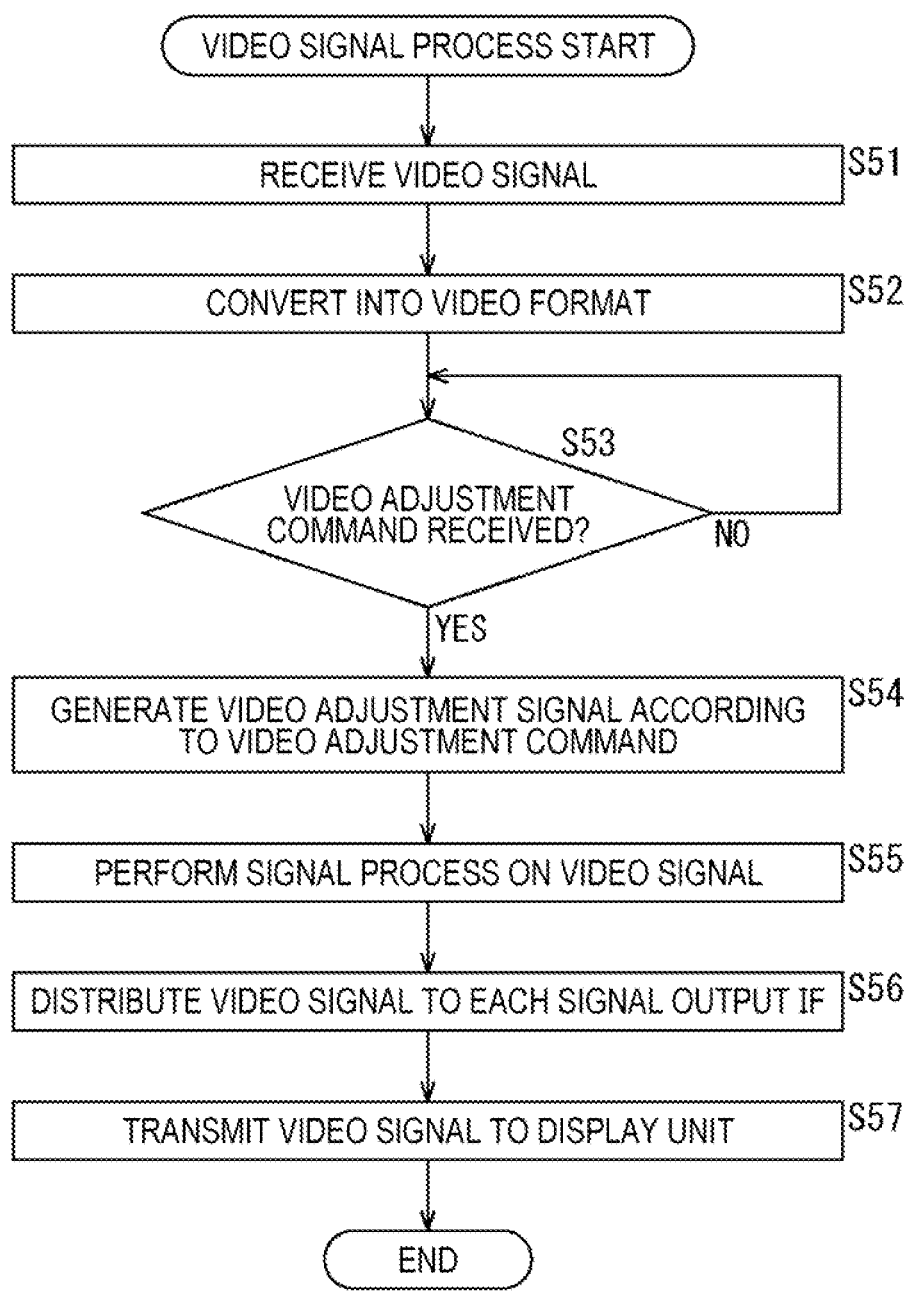
FIG. 17 is a flowchart illustrating a video signal process.

FIG. 17 is a flowchart illustrating a video signal process of the video wall controller 63. This video signal process is started, for example, when a video signal in units of frames is transmitted from the video server 61.

In step S51 of FIG. 17, the signal input IF 157 of the video wall controller 63 receives the video signal in units of frames transmitted from the video server 61 via the HDMI terminal 152.

In step S52, the signal input IF 157 converts the video signal in units of frames received in step S51 into a video signal in units of frames in a predetermined video format, and supplies the video signal to the signal processing unit 158.

In step S53, the MPU 156 determines whether or not the video adjustment command is received from the communication unit 109 of the PC 62 through the LAN terminal 151 and the network IF 155. In a case where determining that the video adjustment command is not received yet in step S53, the MPU 156 waits until the video adjustment command is received.

On the other hand, in a case where the MPU 156 determines that the video adjustment command is received in step S53, the process proceeds to step S54. In step S54, the MPU 156 generates a video adjustment signal according to the video adjustment command, and supplies the video adjustment signal to the signal processing unit 158.

In step S55, the signal processing unit 158 performs a signal process necessary for the entire video wall 12 on the video signal in units of frames on the basis of the video adjustment signal while exchanging data with the DRAM 159 as necessary. The signal processing unit 158 supplies the adjusted video signal in units of frames to the distribution unit 160.

In step S56, the distribution unit 160 distributes the video signal in units of frames supplied from the signal processing unit 158 in step S55 to each signal output IF 161.

In step S57, each of the signal output IFs 161 transmits the video signal in units of frames supplied from the distribution unit 160 in step S56 to the display unit 41 connected thereto. Then, the video signal process ends.

<Description of Display Control Signal Generation Process>

Figure 18:
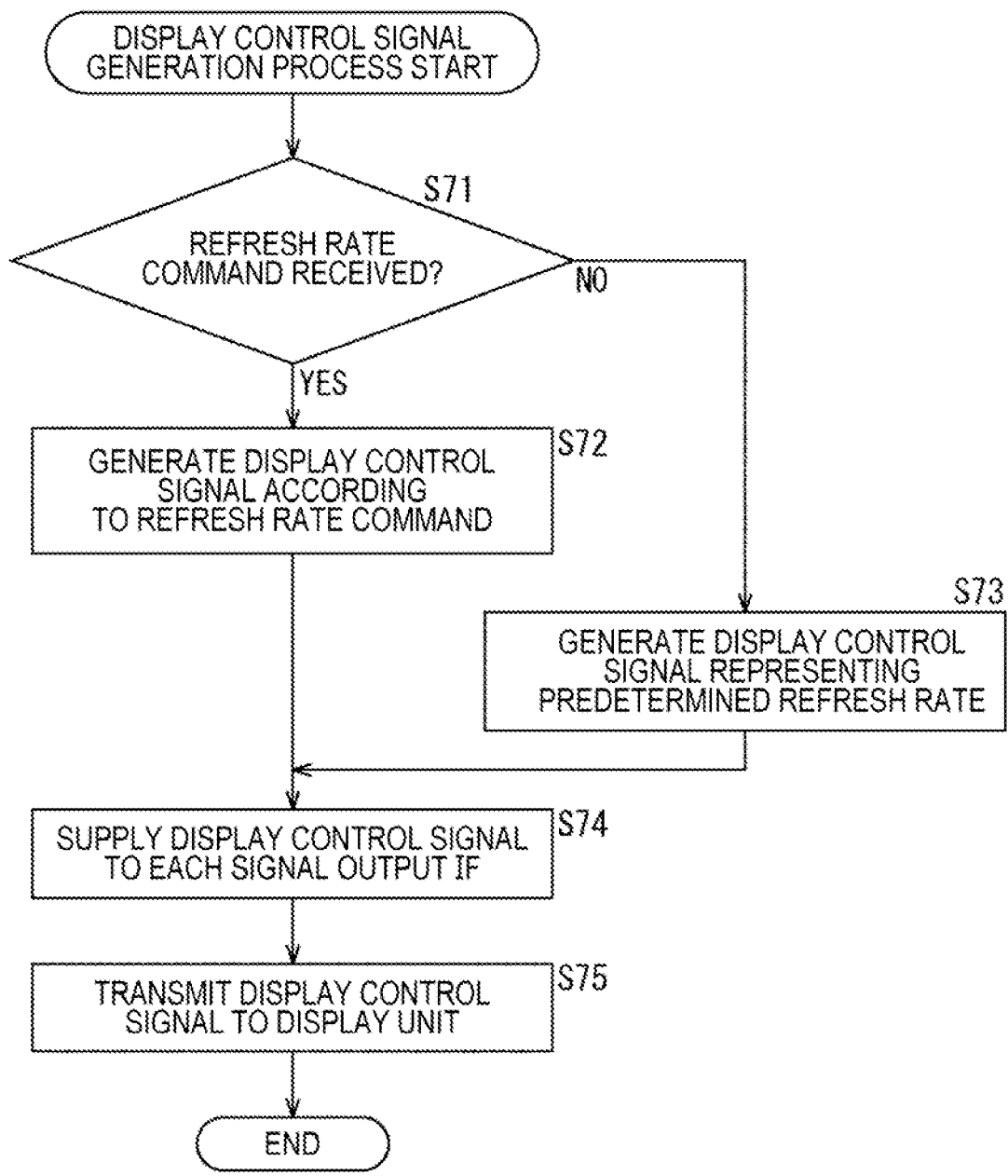
FIG. 18 is a flowchart illustrating a display control signal generation process.

FIG. 18 is a flowchart illustrating a display control signal generation process of the video wall controller 63. This display control signal generation process is started, for example, when a video signal in units of frames is transmitted from the video server 61.

In step S71 in FIG. 18, the MPU 156 determines whether or not a refresh rate command is received from the communication unit 109 of the PC 62 via the LAN terminal 151 and the network IF 155. In a case where it is determined in step S71 that the refresh rate command has been received, the MPU 156 advances the process to step S72.

In step S72, the MPU 156 generates a display control signal according to the received refresh rate command, and supplies the display control signal to the distribution unit 160 via the signal processing unit 158. Then, the process proceeds to step S74.

On the other hand, in a case where it is determined in step S71 that the refresh rate command has not been received yet, in step S73, the MPU 156 generates a display control signal indicating a predetermined refresh rate, and supplies the display control signal to the distribution unit 160 via the signal processing unit 158. Then, the process proceeds to step S74.

In step S74, the distribution unit 160 supplies the display control signal to each signal output IF 161. In step S75, each signal output IF 161 transmits the display control signal supplied from the distribution unit 160 in step S74 to the display unit 41 connected thereto. Then, the display control signal generation process ends.

<Description of Display Process>

Figure 19:
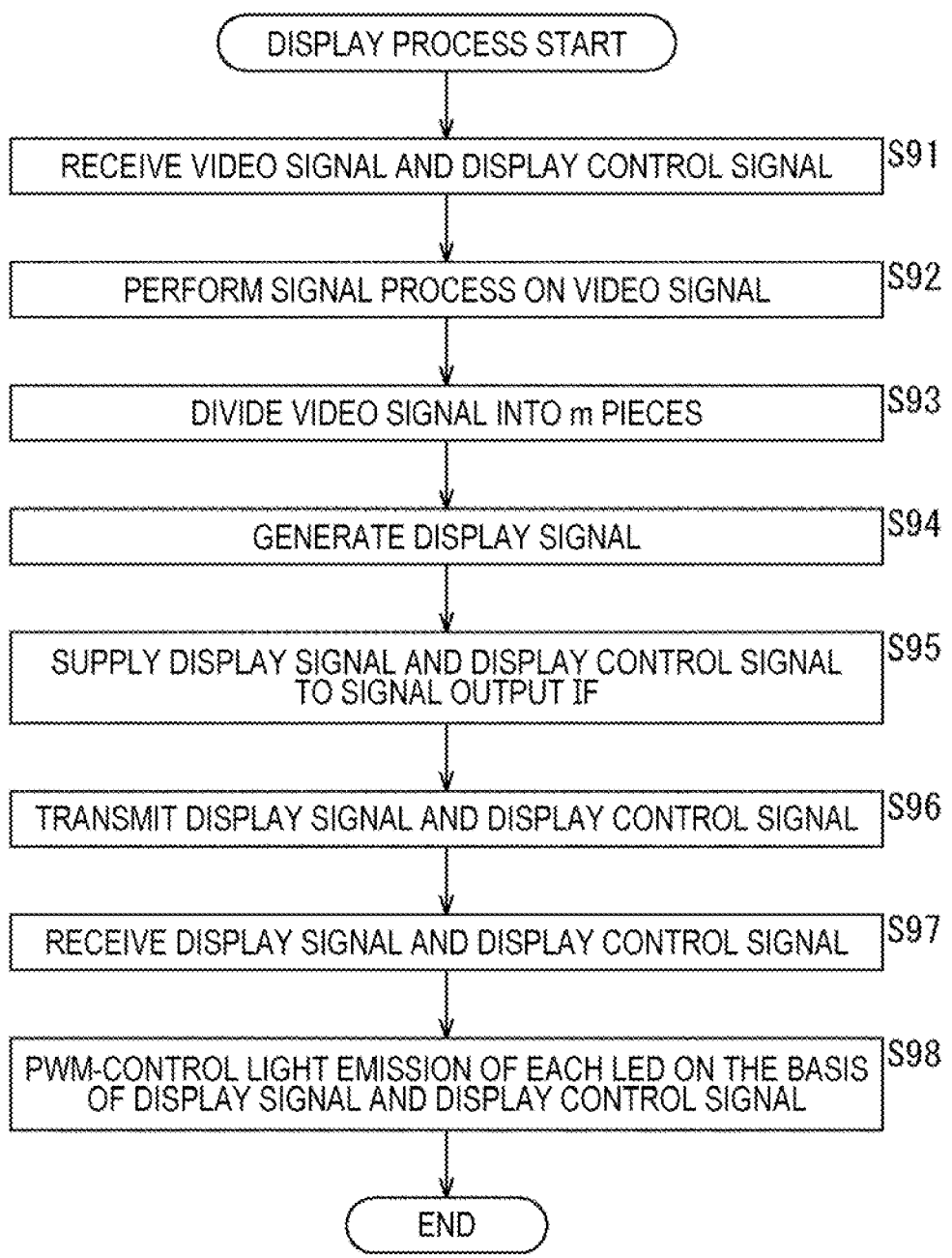
FIG. 19 is a flowchart illustrating a display process.

FIG. 19 is a flowchart illustrating a display process of each display unit 41. This display process is started, for example, when a video signal is transmitted by the process in step S57 in FIG. 17 and a display control signal is transmitted by the process in step S75 in FIG. 18.

In step S91 of FIG. 19, the signal input IF 211 receives the video signal in units of frames and the display control signal transmitted from the video wall controller 63, and supplies the video signal and the display control signal to the signal processing unit 212.

In step S92, while exchanging data with the DRAM 213 as necessary, the signal processing unit 212 individually performs a signal process necessary for the display unit 41 of its own on the video signal in units of frames supplied from the signal input IF 211 in step S91.

In step S93, the signal processing unit 212 divides the video signal in units of frames after the signal process into m pieces according to the position of each LED array 51 on its own display unit 41. In step S94, the signal processing unit 212 generates, for each LED array 51, a display signal in units of frames of each LED constituting the LED array 51 on the basis of the video signal in units of frames after the signal process.

In step S95, the signal processing unit 212 supplies the display signal of each LED array 51 to the signal output IF 214 corresponding to the LED array 51, and supplies the display control signal supplied from the signal input IF 211 in the processing of step S91 to each signal output IF 214.

In step S96, each signal output IF 214 transmits the video signal and the display control signal to the LED driver 221 connected thereto.

In step S97, each LED driver 221 receives the display signal and the display control signal transmitted from the signal output IF 214 connected thereto. In step S98, each LED driver 221 drives the LED 241 by PWM controlling the light emission of the LED 241 constituting the LED array 51 connected thereto on the basis of the display signal and the display control signal. As a result, the video corresponding to the position of the LED array 51 on the video wall 12 in the video corresponding to the video signal in units of frames output from the video server 61 is displayed on each LED array 51.

As described above, in the re-imaging system 10, the PC 62 controls the refresh rate of the video wall 12 so that the exposure time of the video camera 11 that images the video wall 12 corresponds to the light emission cycle of the LED 241. Therefore, it is possible to prevent the black belt from occurring in a case where the video wall 12 is re-imaged.

In addition, since the PC 62 acquires the exposure time and controls the refresh rate on the basis of the exposure time, even in a case where the exposure time changes, the refresh rate can be easily controlled on the basis of the exposure time after the change, and it is possible to prevent the black belt from occurring.

<Description of an Example of Re-Imaging System>

Figure 20:
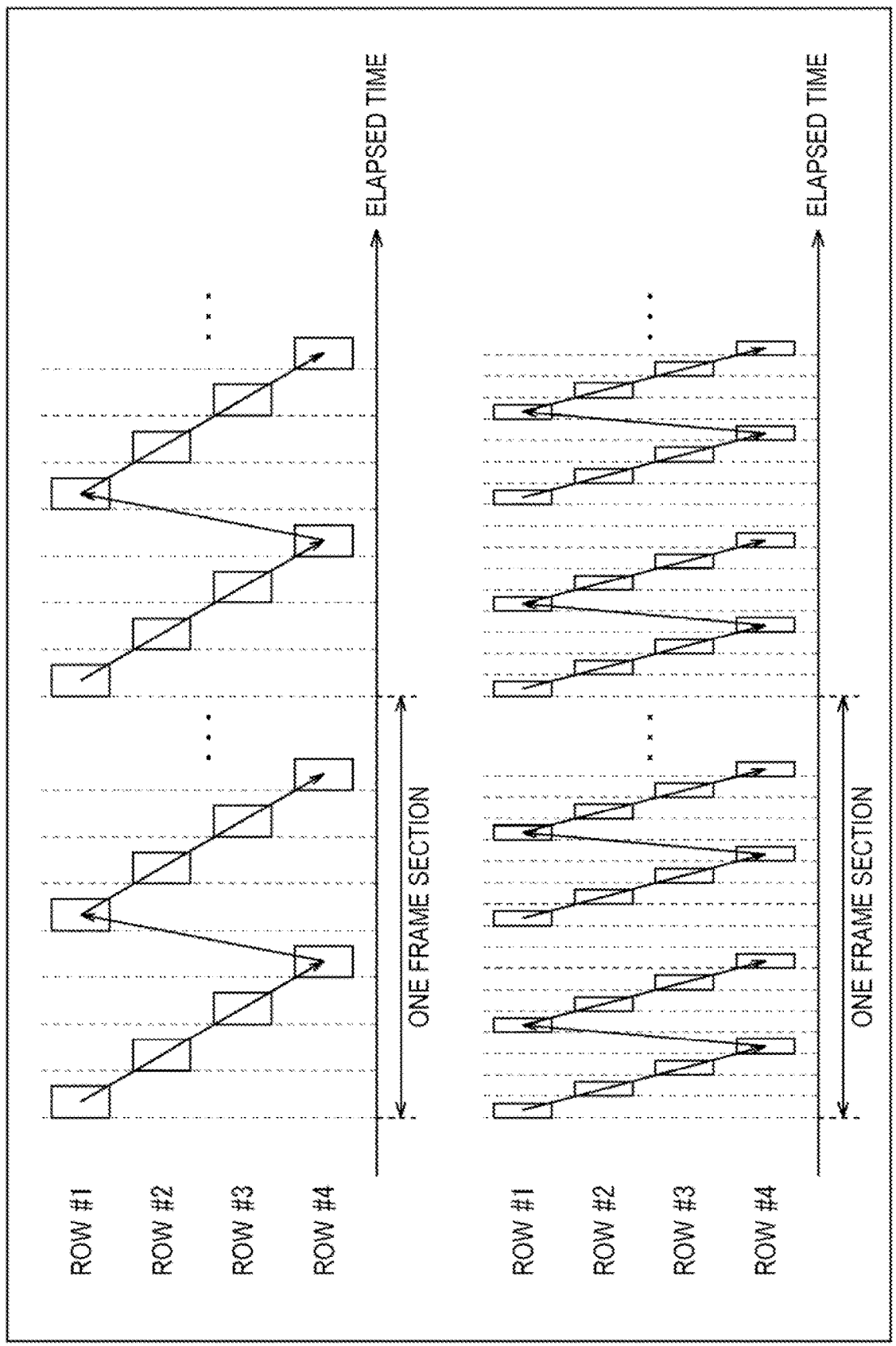
FIG. 20 is a diagram for describing an example of a re-imaging system for reducing visibility of black belts by a conventional method.

FIG. 20 is a diagram for describing an example of a re-imaging system that reduces the visibility of black belts by a conventional method.

In the example of FIG. 20, the number of rows of LEDs constituting the LED array is 4. In the graph of FIG. 20, the horizontal axis represents the elapsed time from the start of display of the video wall, and the vertical axis represents the row of the LED array. In the graph of FIG. 20, the i-th row from the top of the LED array is denoted as a row #i. The rectangle in the graph of FIG. 20 indicates that the LEDs in the row corresponding to the position in the vertical direction emit light at the elapsed time corresponding to the position in the lateral direction of the rectangle.

The re-imaging system that reduces the visibility of the black belt by the conventional method reduces the light emission cycle of the LED, that is, increases the refresh rate, thereby reducing the visibility of the black belt. Specifically, for example, the re-imaging system doubles the refresh rate illustrated in the upper part of FIG. 20 as illustrated in the lower part of FIG. 20.

As a result, even in a case where the exposure time of the video camera and the light emission cycle of the LEDs do not correspond to each other, and the number of times of light emission of the LEDs within the exposure period in each row is not uniform, it is possible to suppress nonuniformity of luminance in each row.

For example, in a case where the number of times of scanning in one frame section is 64, when the difference in the number of times of light emission between a certain row and another row is-1 times, the luminance of the certain row is reduced by $1/64$ (about 1.56%), compared with the luminance of another row. On the other hand, in a case where the refresh rate is doubled and the number of times of scanning in one frame section is 128, when the difference in the number of times of light emission between a certain row and other rows is −1, the luminance of the certain row is reduced by only $1/128$ (about 0.78%), compared with the luminance of another row. As described above, by increasing the refresh rate, nonuniformity of luminance in each row is suppressed.

Figure 21:
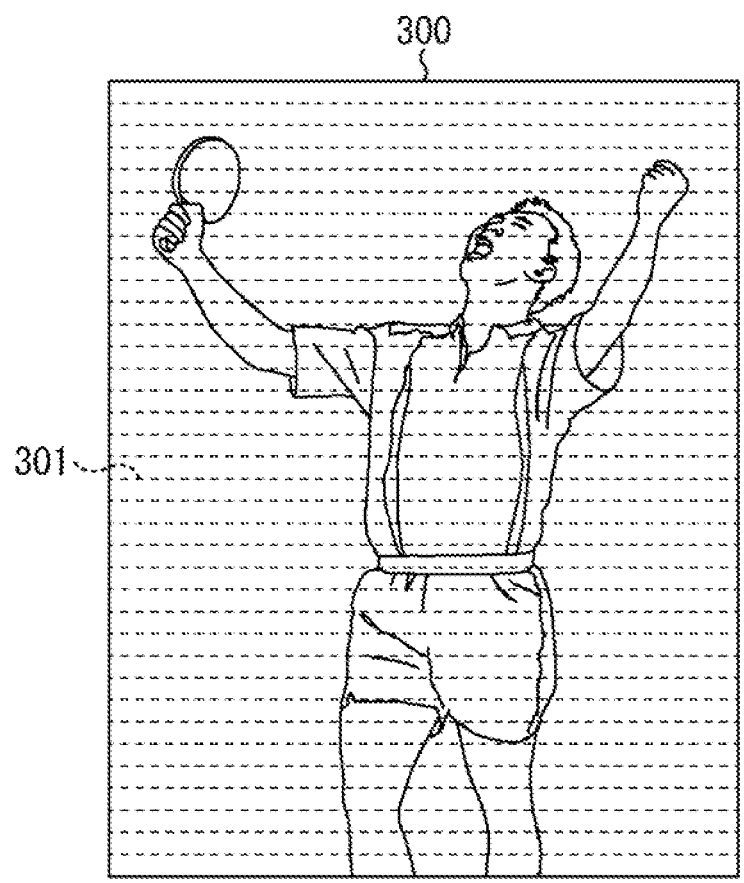
FIG. 21 is a view illustrating an example of a re-captured video in which the visibility of black belts is reduced.

FIG. 21 is a diagram illustrating an example of a re-captured video in which the visibility of black belts is reduced by the re-imaging system described in FIG. 20.

In the example of FIG. 21, the refresh rate is 7680 Hz, and the subject and the background similar to those in FIG. 13 are re-imaged.

As shown in FIG. 21, even in the re-captured video 300 in which the refresh rate is 7680 Hz, which is twice as high as 3840 Hz, horizontal striped black belts 301 are generated, but black belts 301 are less visible than black belts 281 in the re-captured video 280 in FIG. 13 in which the refresh rate is 3840 Hz.

However, in the conventional method, although the visibility of the black belt decreases, the black belt does not disappear. In addition, in order to increase the refresh rate while maintaining the display gradation accuracy of the LED, it is necessary to increase the frequency of the reference clock used for PWM control of the LED driver or to reduce the number of rows of LEDs to be caused to emit light in one scan.

Specifically, in the PWM control, since the control signal is generated by integrating the reference clock with the counter, for example, it is necessary to increase the frequency of the reference clock in order to maintain the display gradation accuracy of the LEDs and increase the refresh rate.

The frequency f [Hz] of the reference clock is expressed by the following Formula (1) using a refresh rate RR [Hz], a display gradation accuracy t [bit], and the number L [row] of rows of LEDs to be caused to emit light in one scan.

$$f = RR \times 2^t \times L \quad (1)$$

For example, in a case where the refresh rate is 3840 Hz, the display gradation accuracy is 12 bits, and the number of rows of LEDs to be caused to emit light in one scan is 16, the frequency of the reference clock is about 251.7 MHz. On the other hand, when the refresh rate is 7680 Hz, which is twice as high as 3840 Hz, the frequency of the reference clock is about 503.3 MHz, which is twice as high as that when the refresh rate is 3840 Hz. As described above, when the frequency (operating frequency) of the reference clock of the LED driver increases, the cost increases due to the power consumption of the LED driver, the change in the manufacturing process of the LED driver, and the like.

On the other hand, in a case where the refresh rate is increased while maintaining the frequency of the reference clock, it is necessary to reduce the number of rows of LEDs to be caused to emit light in one scan, as shown in the above-described Formula (1). In order to reduce the number of rows of LEDs to be caused to emit light in one scan, it is necessary to increase the number of LED drivers. For example, in a case where the number of rows of LEDs to be caused to emit light in one scan is reduced to ½ in order to double the refresh rate, it is necessary to double the number of LED drivers. This leads to an increase in cost and a shortage of the component mounting area on the substrate. In addition, as the number of LED drivers increases, the dark power also increases. The dark power is power consumed even when the LED is not emitting light, and is power consumed mainly by the LED driver, a control circuit for driving the LED driver, a power supply circuit, and the like.

Note that, as indicated by the above-described Formula (1), by lowering the display gradation accuracy, so-called gray scale, it is possible to increase the refresh rate while maintaining the frequency of the reference clock and the number of rows of LEDs to be caused to emit light in one scan. For example, the refresh rate can be doubled by reducing the display gradation accuracy by one bit. However, when the display gradation accuracy decreases, the quality of the re-captured video decreases. The degradation of the display gradation accuracy can be suppressed by slightly increasing the frequency of the reference clock, but the quality of the re-captured video is degraded in either case.

On the other hand, in the re-imaging system 10, it is possible to prevent the black belt from occurring only by controlling the refresh rate on the basis of the exposure time. Therefore, a significant increase in manufacturing cost and a decrease in display gradation accuracy do not occur.

Note that the refresh rate control unit 130 may not control the refresh rate, but the user may control the refresh rate. In this case, the exposure time is not transmitted from video camera 11, and the user determines a refresh rate so that the exposure time corresponds to the light emission cycle of the LED 241, and inputs the refresh rate to the PC 62 using the input unit 106. Then, the PC 62 generates a display control signal indicating the refresh rate or the like input by the user.

In the re-imaging system 10, the exposure time is transmitted from the video camera 11 to the PC 62, but the user may operate the input unit 106 to input the exposure time of the video camera 11, and the refresh rate control unit 130 may acquire the exposure time.

In the re-imaging system 10, the PC 62 controls the refresh rate on the basis of the exposure time, but the video camera 11 may transmit the exposure time to the video wall controller 63 or the video wall 12, and at least part of the video wall controller 63 or the video wall 12 may function as the refresh rate control unit 130.

In the re-imaging system 10, the refresh rate is controlled so that the exposure time of the video camera 11 is an integral multiple of the light emission cycle of the LED 241, but at this time, it may be actually necessary to control a vertical blanking period of each frame on the basis of the exposure time. Hereinafter, as a second embodiment, a re-imaging system that controls the vertical blanking period will be described.

Second Embodiment

<Configuration Example of Re-Imaging System>

Figure 22:
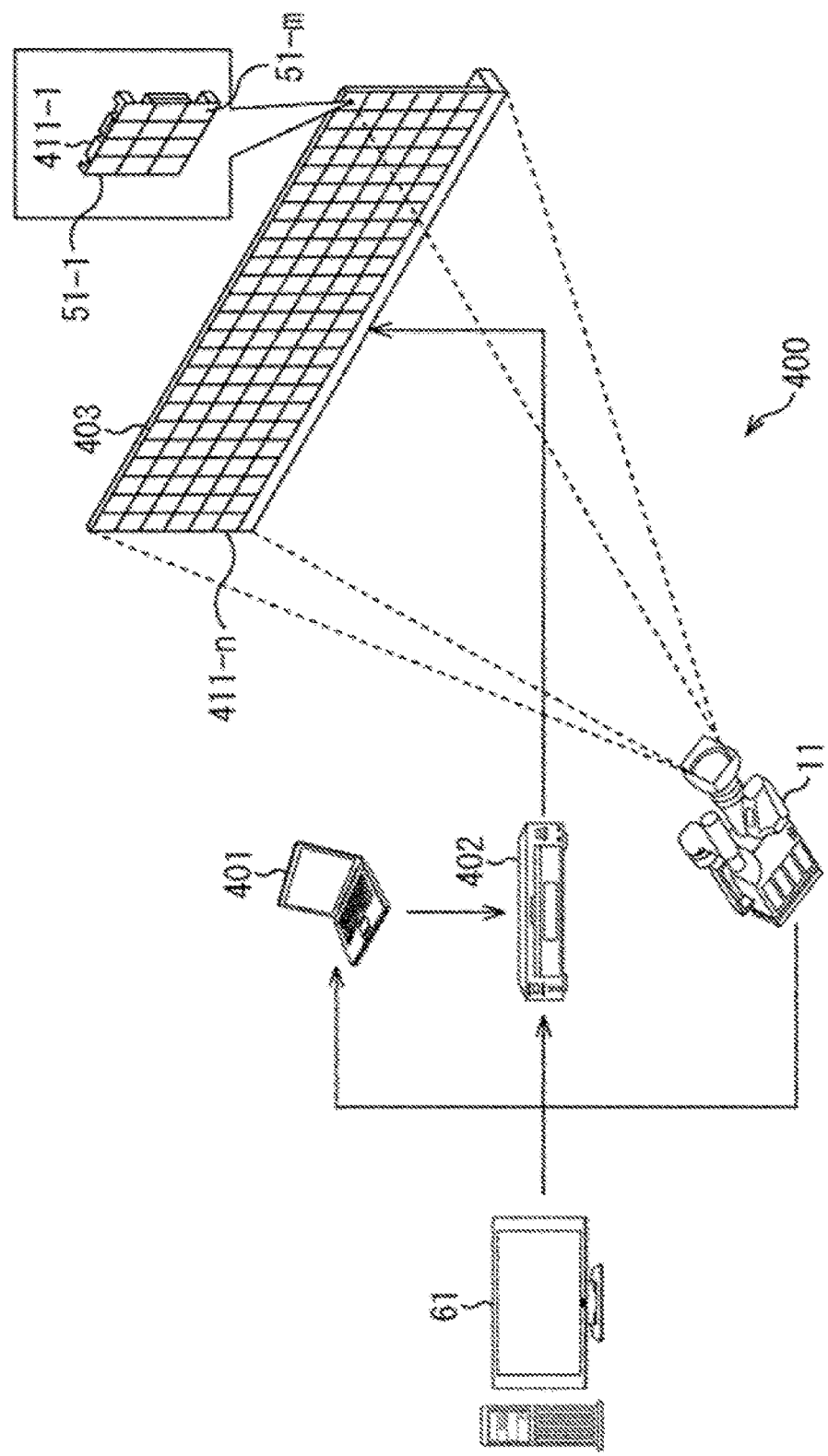
FIG. 22 is a diagram illustrating a configuration example of the second embodiment of a re-imaging system to which the present technology is applied.

FIG. 22 is a diagram illustrating a configuration example of the second embodiment of a re-imaging system including an information processing system to which the present technology is applied.

In a re-imaging system 400 of FIG. 22, components corresponding to those of the re-imaging system 10 of FIG. 3 are denoted by the same reference numeral. Therefore, description of the components will be appropriately omitted, and description will be given focusing on a component different from that of the re-imaging system 10.

The re-imaging system 400 in FIG. 22 is different from the re-imaging system 10 in that the PC 62, the video wall controller 63, and the video wall 12 are replaced with a PC 401, a video wall controller 402, and a video wall 403, and other components are configured in the similar manner as those of the re-imaging system 10.

Specifically, the PC 401 (information processing system) is a general general-purpose computer. The PC 401 controls video wall controller 402 by generating a control command for controlling the video wall controller 402 and transmitting the control command to the video wall controller 402.

For example, the PC 401 performs a refresh rate control process as in the PC 62 in FIG. 3. In addition, the PC 401 determines the vertical blanking period of the video displayed on the video wall 403 so that the exposure time is an integral multiple of the light emission cycle (subframe) of the LED 241. Specifically, the PC 401 controls the vertical blanking period by transmitting a vertical blanking period command, which is a control command representing the vertical blanking period, to the video wall controller 402 on the basis of the refresh rate determined by the refresh rate control process.

The video wall controller 402 is configured as in the video wall controller 63 in FIG. 7, but information represented by a display control signal is different. Specifically, as in the video wall controller 63, the video wall controller 402 performs a predetermined signal process on the video signal in units of frames supplied from the video server 61, divides the video signal, and transmits the divided video signal to each display unit 411. The video wall controller 402 transmits, to each display unit 411, a display control signal indicating the refresh rate indicated by the refresh rate command supplied from the PC 401, the vertical blanking period indicated by the vertical blanking period command, and the like.

The video wall 403 (display section) is a large LED display in which n display units 411-1 to 411-*n* are disposed in a tile shape. FIG. 22 illustrates a case where n is 6×24. Note that, hereinafter, in a case where it is not necessary to distinguish the display units 411-1 to 411-*n* individually, they are simply referred to as a display unit 411.

The display unit 411 includes m LED arrays 51 disposed in a tile shape. Each display unit 411 of the video wall 403 is connected to the video wall controller 402. The video wall 403 displays a video corresponding to the video signal in units of frames on the basis of the video signal in units of frames and the display control signal supplied from the video wall controller 402. Specifically, the video signal supplied to each display unit 411 is a video signal corresponding to the position of the display unit 411 on the video wall 403. Each display unit 411 displays the video based on the video signal according to the display control signal, whereby the video of one frame is displayed on the entire video wall 403.

In the re-imaging system 400 configured as described above, as in the re-imaging system 10, the respective devices are frame-synchronized by the genlock signal.

Note that the video wall controller 402 and the video wall 403 may have an integrated configuration, or may be a display device in which they are integrated. In addition, the PC 401, the video wall controller 402, and the video wall 403 may have an integrated configuration, or may be a display device in which they are integrated.

<Configuration Example of Vertical Blanking Control Unit>

The hardware configuration of the PC 401 in FIG. 22 is similar to the hardware configuration of the PC 62 in FIG. 5, and thus the description thereof is omitted.

Figure 23:
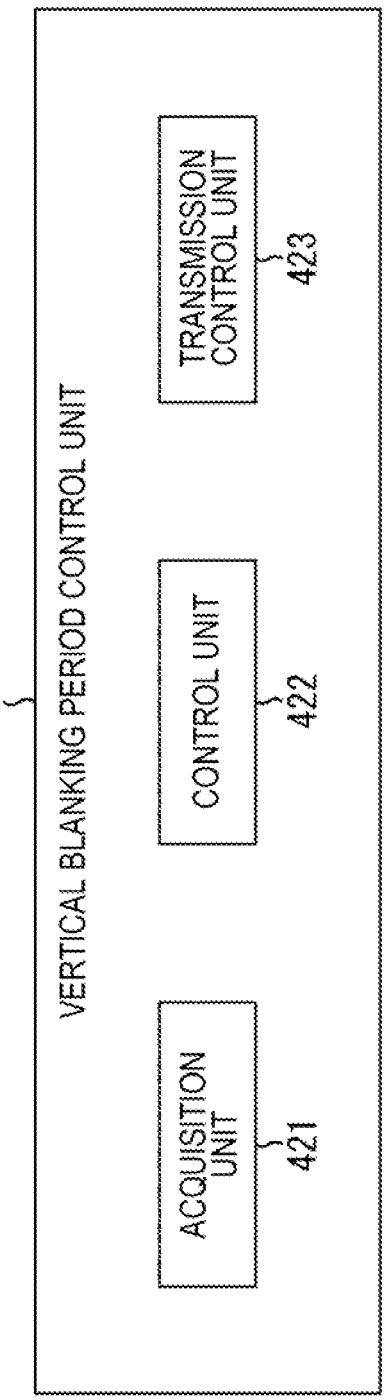
FIG. 23 is a block diagram illustrating a configuration example of a vertical blanking period control unit.

FIG. 23 is a block diagram illustrating a functional configuration example of the CPU of the PC 401 in FIG. 22 in a case where the CPU performs the vertical blanking period control process for controlling the vertical blanking period.

The CPU of the PC 401 functions as a vertical blanking period control unit 420 in FIG. 23 in a case where performing the vertical blanking period control process. The vertical blanking period control unit 420 includes an acquisition unit 421, a control unit 422, and a transmission control unit 423.

The acquisition unit 421 acquires a refresh rate determined by the refresh rate control process and supplies the refresh rate to the control unit 422.

The control unit 422 determines the vertical blanking period on the basis of the refresh rate supplied from the acquisition unit 421. The control unit 422 controls the vertical blanking period by generating a vertical blanking period command indicating the vertical blanking period. The control unit 422 outputs the vertical blanking period command to the transmission control unit 423.

The transmission control unit 423 supplies the vertical blanking period command supplied from the control unit 422 to the communication unit of the PC 401, and instructs transmission of the vertical blanking period command to the video wall controller 402. As a result, the communication unit transmits (outputs) the vertical blanking period command to the video wall controller 402 via a wire such as a LAN cable.

<Detailed Configuration Example of Display Unit>

Figure 24:
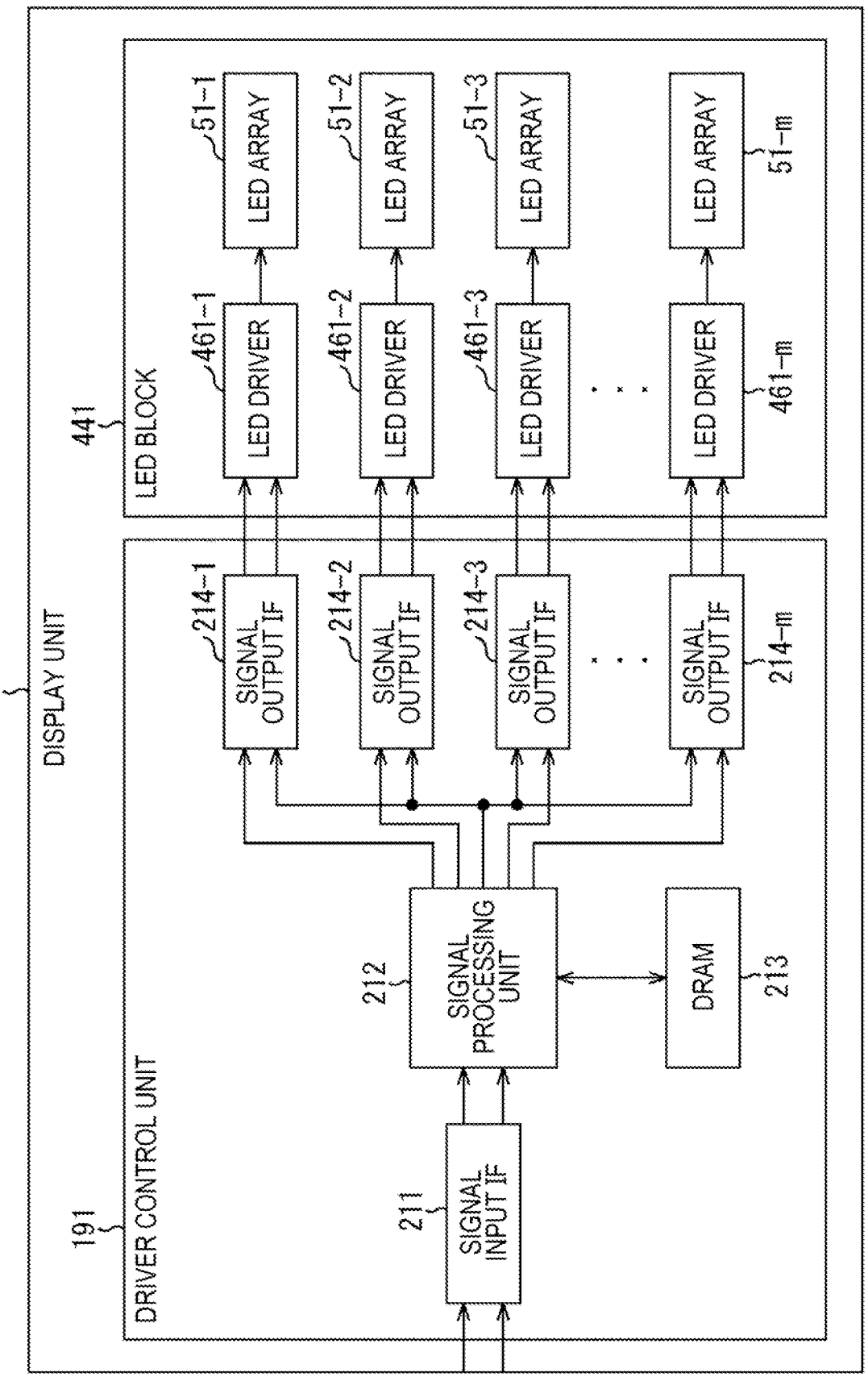
FIG. 24 is a block diagram illustrating a detailed configuration example of the display unit in FIG. 22.

FIG. 24 is a block diagram illustrating a detailed configuration example of the display unit 411 in FIG. 22.

In the display unit 411 of FIG. 24, components corresponding to those of the display unit 41 of FIG. 8 are denoted by the same reference numerals. Therefore, description of the components will be appropriately omitted, and description will be given focusing on a portion different from the display unit 41.

The display unit 411 of FIG. 24 is different from the display unit 41 in that an LED block 441 is provided instead of the LED block 192, and other components are configured in the similar manner as those of the display unit 41.

The LED block 441 is different from the LED block 192 in that LED drivers 221-1 to 221-*m* are provided instead of the LED drivers 461-1 to 461-*m*, and other components are configured in the similar manner as those of the LED block 192.

The LED drivers 461-1 to 461-*m* are connected to the signal output IFs 214-1 to 214-*m* of the driver control unit 191, respectively, and are connected to the LED arrays 51-1 to 51-*m*, respectively. Note that, hereinafter, in a case where it is not necessary to distinguish the LED drivers 461-1 to 461-*m* individually, they are simply referred to as an LED driver 461.

The LED driver 461 drives each LED 241 by performing PWM control on the light emission of each LED 241 constituting the LED array 51 connected thereto on the basis of the display control signal and the display signal transmitted from the signal output IF 214 connected thereto.

Specifically, the LED driver 461 generates the PWM signal so that each LED 241 of the LED array 51 emits light at an intensity based on the display signal corresponding to the LED 241 by a refresh rate indicated by the display control signal in one second. The LED driver 461 supplies the PWM signal to each LED 241. As a result, the LED array 51 displays the video corresponding to the position of the LED array 51 on the video wall 403 in the video corresponding to the video signal in units of frames output from the video server 61. The LED driver 461 also controls the vertical blanking period on the basis of a display control signal so that the vertical blanking period represented by the display control signal is provided for each frame.

<Description of Vertical Blanking Period>

Figure 25:
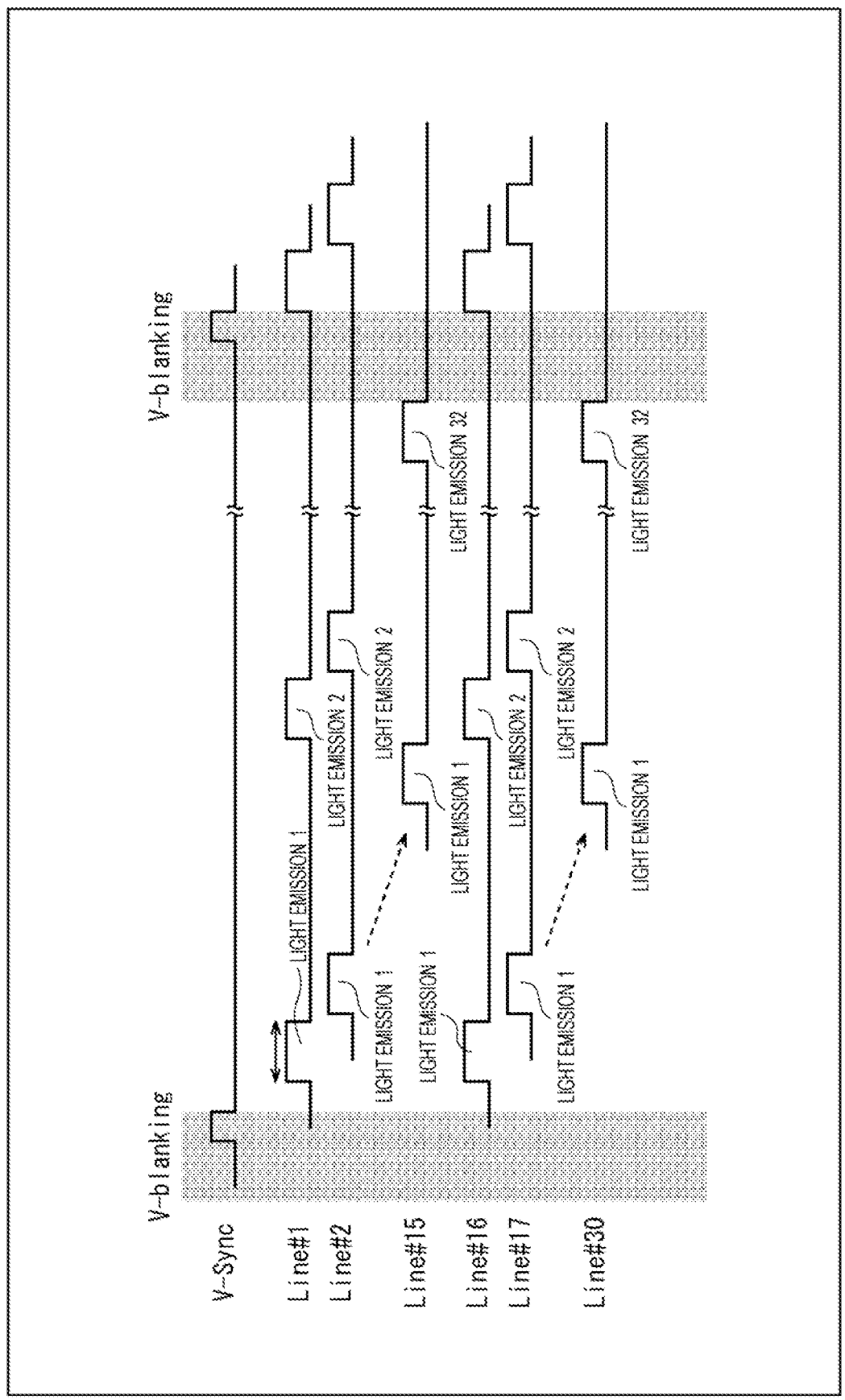
FIG. 25 is a diagram for describing a vertical blanking period.

FIG. 25 is a diagram illustrating a vertical blanking period of a video displayed on the video wall 403.

In FIG. 25, the horizontal axis represents the light emission time. The top row represents a vertical synchronization signal (V-Sync) of a video displayed on the video wall 403.

The second and subsequent rows from the top represent the light emission timings of each row of the LEDs 241 of 30 rows from the top of the video wall 403, and in FIG. 25, the i-th row from the top is represented as Line #i. In the example of FIG. 25, the number of rows of the LEDs 241 constituting the LED array 51 is 15, and the number of times of scanning in one frame section is 32. The fact is similar to that of FIG. 27 described later.

As illustrated in FIG. 25, a vertical blanking period (V-blanking) in which the light emission of all the LEDs 241 is stopped after the end of the entire scanning is provided between the vertical synchronization signals, that is, in one frame section.

Specifically, first, in synchronization with the vertical synchronization signal, each LED driver 461 generates a PWM signal corresponding to a display signal (for example, image data of values from 0 to 2048) of each LED 241 for each row in order from the LED 241 in the uppermost row of the LED array 51 connected thereto, and supplies the PWM signal to each LED 241. As a result, in each LED array 51, light emission is started in order from the LED 241 in the uppermost row. In the example of FIG. 25, light emission is simultaneously started from LEDs 241 in the first and 16th row from the top of video wall 12. When the light emission of the LEDs 241 in the lowermost row (in the example of FIG. 25, the 15th row and the 30th row from the top of the video wall 12) of each LED array 51 ends, that is, when one scanning ends, scanning is performed again. Thereafter, scanning is similarly performed 32 times in the case of the example of FIG. 25. That is, the LED driver 461 generates the PWM signal having the same PWM width for each LED 241 32 times. Thereafter, until a vertical synchronization signal of the next frame is generated, a vertical blanking period is started, and light emission of all the LEDs 241 is stopped.

<Description of Cause of Black Belt Occurrence>

Figure 26:
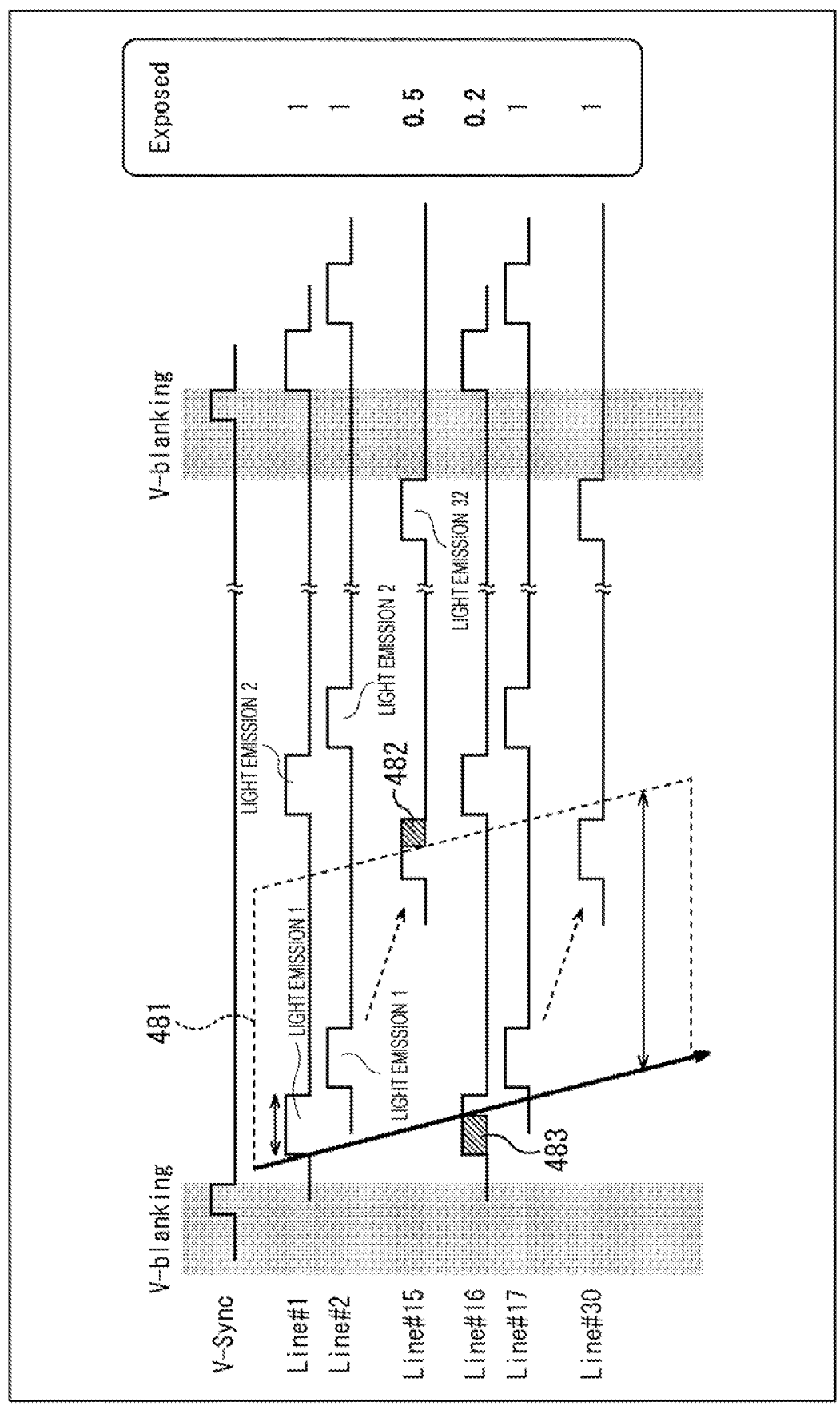
FIG. 26 is a diagram for describing a cause of occurrence of black belts.

FIG. 26 is a diagram illustrating a cause of occurrence of a black belt in a video re-captured by the re-imaging system in a case where the exposure time is not an integral multiple of the light emission cycle of the LED.

In FIG. 26, the horizontal axis represents the light emission time. The top row represents the vertical synchronization signal of the video displayed on the video wall. The second and subsequent rows from the top represent the light emission timings of each row of the LEDs for 30 rows from the top of the video wall, and in FIG. 26, the i-th row from the top is represented as Line #i. In the example of FIG. 26, the number of rows of the LEDs constituting the LED array is 15, and the number of times of scanning in one frame section is 32.

Since scanning is similar to the case of FIG. 25, description thereof is omitted. The video camera performs the rolling shutter type imaging with a predetermined exposure time. Therefore, the exposure by the light of the LEDs of each row is sequentially performed from the upper row, and the exposure start timing of each row is different. Note that since each device of the re-imaging system performs frame synchronization, the exposure start time and the display start time of one frame are synchronized.

In such a case, in a case where the exposure time of the video camera and the light emission cycle of the LED do not correspond to each other, the light emission period in the exposure period may not be uniform in respective rows. In the example of FIG. 26, in the first row and the second row from the top, the entire period of the first light emission is included in the exposure period 481. However, in the 15th row from the top, a period 482 that is ½ (0.5) times the entire period of the first light emission is not included in the exposure period 481. In the row of the 16th line from the top, a period 483 that is 0.8 times the entire period of the first light emission is not included in the exposure period 481.

Therefore, the luminance of the pixels in the 15th row and the 16th row from the top re-imaged by the video camera is lower than the luminance of the pixels in the first row and the second row from the top. For example, the luminance of the pixels in the 15th row from the top is 0.5 when the luminance of the pixels in the first or second row from the top is 1, and the luminance of the pixels in the 16th row from the top is 0.2 when the luminance of the pixels in the first or second row from the top is 1. As a result, in the video re-captured by the video camera, the video in each of the 15th row and the 16th row from the top become black belts. Since the similar situation periodically occurs in the subsequent rows, brightness and darkness periodically appear in the video re-captured by the video camera.

<Description of Control by PC>

Figure 27:
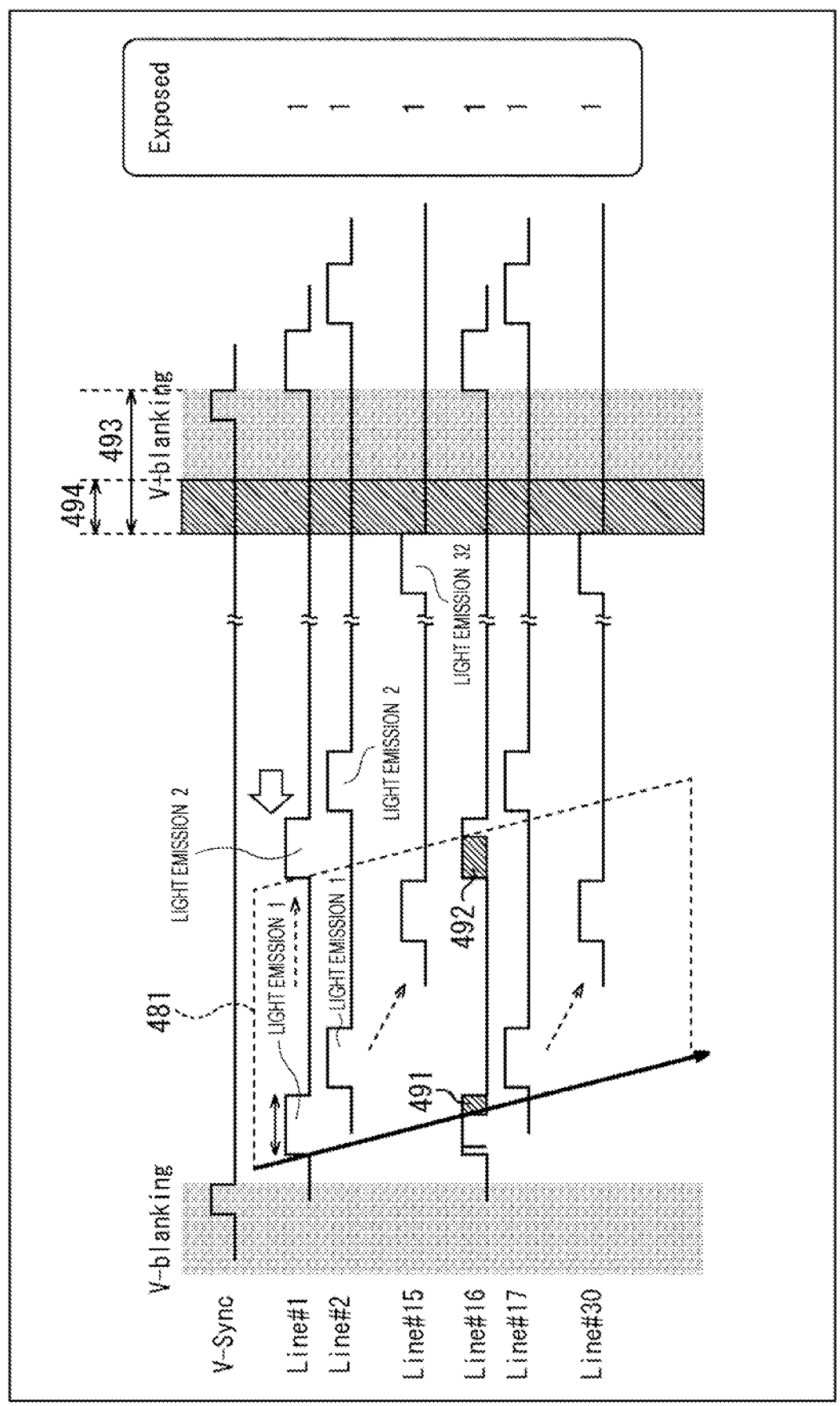
FIG. 27 is a diagram for describing control by the PC of FIG. 22.

FIG. 27 is a diagram for describing control by the PC 401.

As illustrated in FIG. 27, the control unit 132 of the PC 401 determines the refresh rate so that the exposure time of the video camera 11 and the light emission cycle correspond to each other. Specifically, for example, the control unit 132 synchronizes the exposure start time and the scan start time, and controls the refresh rate so that the exposure time is an integral multiple of the light emission cycle.

In the example of FIG. 27, the control unit 132 determines the refresh rate so that the exposure time is one time the light emission cycle. As a result, the scan speed is faster than that in the case of FIG. 26, and the number of times of scanning in the exposure period is 1 in all rows. For example, in the 15th row from the top, the entire period of the first light emission is included in the exposure period 481. In the row of the 16th row from the top, the exposure period 481 includes a partial period 491 of the entire period of the first light emission and a partial period 492 of the entire period of the second light emission. The sum of the period 491 and the period 492 is the entire period of one light emission. Therefore, the luminance of the pixels in all the rows re-imaged by the video camera 11 is the same. As a result, a row of pixels having low luminance does not occur and a black belt does not occur in the video in units of frames re-captured by the video camera 11.

Note that in a case where the PWM width is small in the 16th row from the top, sufficient luminance can be obtained only by the exposure by the second light emission.

As described above, in a case where the black belt is prevented from occurring by increasing the scan speed as compared with the case of FIG. 26, the end time of the last 32th scan is earlier as compared with the case of FIG. 26. Therefore, a period 493 from the end of the last scan to the start of display of the next frame is lengthened by the period 494, compared with the case of FIG. 26 and the vertical blanking period is required to be lengthened by the period 494. That is, it is necessary to control the vertical blanking period on the basis of the refresh rate.

Therefore, on the basis of the refresh rate, the control unit 422 in FIG. 23 calculates a period from when scanning is performed the number of times of scanning within one frame section corresponding to the refresh rate to when display of the next frame is started, and determines the period as a vertical blanking period. In a case where the vertical blanking period is long, the luminance may be dark.

Note that the distance (time) in the lateral direction of the inclination of the exposure period 481 represents a curtain speed which is a time from the start of the exposure of the first row to the start of the exposure of the last row. The curtain speed varies depending on characteristics and an angle of view of an imaging unit of the video camera 11.

In the example of FIG. 27, the refresh rate is controlled to increase as compared with the example of FIG. 26, but the refresh rate is only required to be controlled so that the exposure time and the light emission cycle correspond to each other, and may be controlled to decrease as compared with the example of FIG. 26.

<Description of Vertical Blanking Period Control Process>

Figure 28:
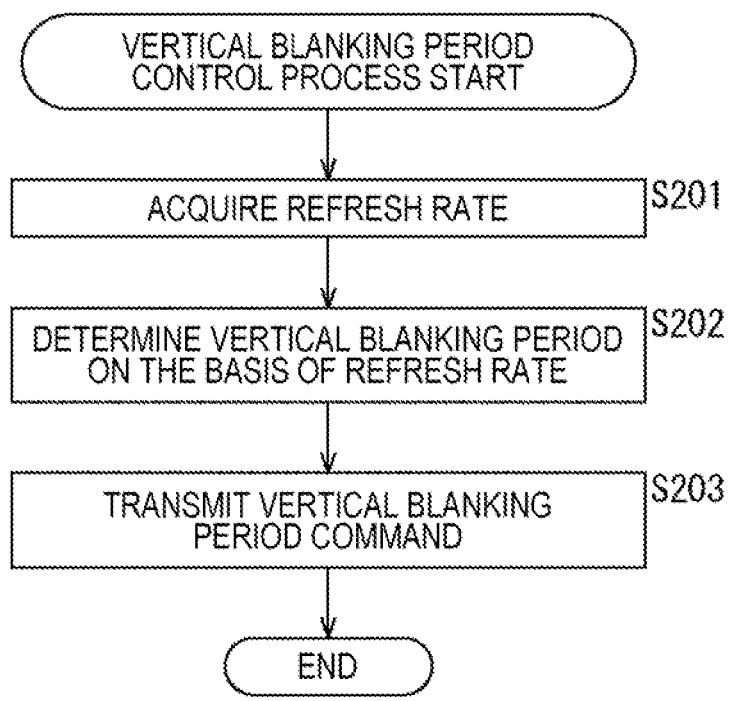
FIG. 28 is a flowchart illustrating a vertical blanking period control process.

FIG. 28 is a flowchart illustrating a vertical blanking period control process of the vertical blanking period control unit 420 in FIG. 23. This vertical blanking period control process is started, for example, when the control unit 132 of the refresh rate control unit 130 determines the refresh rate.

In step S201 of FIG. 28, the acquisition unit 421 acquires the refresh rate from the control unit 132 and supplies the refresh rate to the control unit 422.

In step S202, on the basis of the refresh rate supplied from the acquisition unit 421 in step S201, the control unit 422 calculates a period from when scanning is performed the number of times of scanning within one frame section corresponding to the refresh rate to when display of the next frame is started, and determines the period as a vertical blanking period. The control unit 422 generates a vertical blanking period command indicating the vertical blanking period, and supplies the vertical blanking period command to the transmission control unit 423.

In step S203, the transmission control unit 423 supplies the vertical blanking period command supplied from the control unit 422 in step S202 to the communication unit 109, instructs transmission to the video wall controller 402, and causes the video wall controller 402 to transmit the vertical blanking period command. Then, the process ends.

As described above, the re-imaging system 400 controls the vertical blanking period of the video displayed on the video wall 403 on the basis of the exposure time. Specifically, the re-imaging system 400 determines the refresh rate on the basis of the exposure time so that the exposure time is an integral multiple of the light emission cycle, and controls the vertical blanking period on the basis of the refresh rate. Therefore, it is possible to prevent the black belt from occurring in a case where the video wall 403 is re-imaged.

In the first embodiment and the second embodiment described above, the exposure period is within the display period of the video of one frame, but the exposure period may be across the display period of the video of two frames depending on the exposure time. That is, the exposure period may include a vertical blanking period. In this case, the black belt may occur due to the number of vertical blanking periods included in the exposure period being different depending on the row. Hereinafter, as the third embodiment, a re-imaging system for preventing such a black belt from occurring will be described.

Third Embodiment

<Configuration Example of Re-Imaging System>

Figure 29:
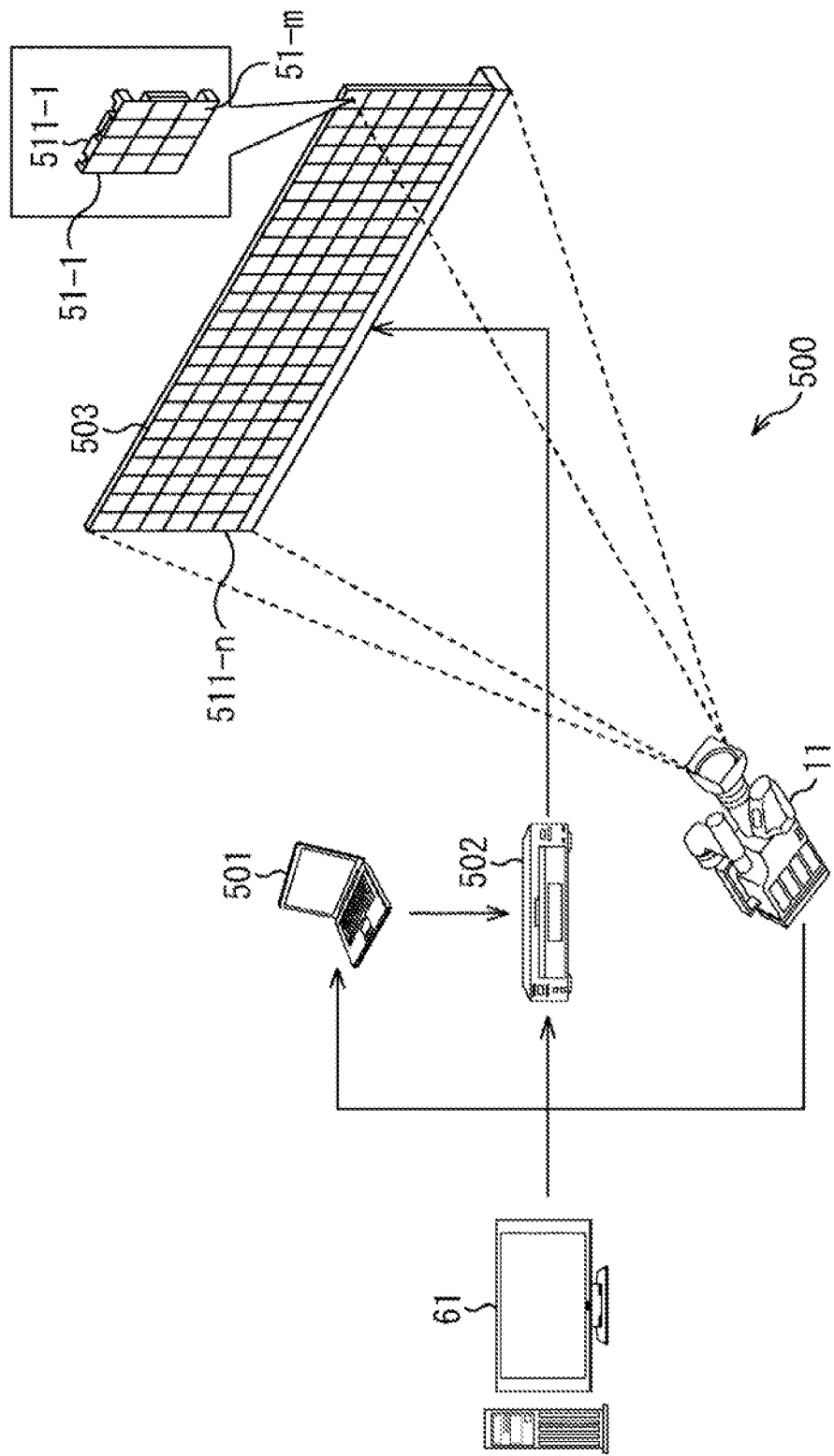
FIG. 29 is a diagram illustrating a configuration example of the third embodiment of a re-imaging system to which the present technology is applied.

FIG. 29 is a diagram illustrating a configuration example of the third embodiment of a re-imaging system including an information processing system to which the present technology is applied.

In the re-imaging system 500 of FIG. 29, components corresponding to those of the re-imaging system 10 of FIG. 3 are denoted by the same reference numeral. Therefore, description of the components will be appropriately omitted, and description will be given focusing on a component different from that of the re-imaging system 10.

A re-imaging system 500 in FIG. 29 is different from the re-imaging system 10 in that the PC 62, the video wall controller 63, and the video wall 12 are replaced with a PC 501, a video wall controller 502, and a video wall 503, and other components are configured in the similar manner as those of the re-imaging system 10.

Specifically, the PC 501 (information processing system) is a general general-purpose computer. The PC 501 controls video wall controller 502 by generating a control command for controlling the video wall controller 502 and transmitting the control command to the video wall controller 502.

For example, the PC 501 controls the vertical blanking period by setting a control mode for controlling the vertical blanking period of the video displayed on the video wall 503 on the basis of the exposure time of the video camera 11 and the curtain speed to transmit a control mode command indicating the control mode to the video wall controller 502. The curtain speed of the video camera 11 is input by the user, for example.

The video wall controller 502 is configured as in the video wall controller 63 in FIG. 7, but information represented by a display control signal is different. Specifically, as in the video wall controller 63, the video wall controller 502 performs a predetermined signal process on the video signal in units of frames supplied from the video server 61, divides the video signal, and transmits the divided video signal to each display unit 511. The video wall controller 502 also transmits a display control signal indicating a control mode or the like indicated by the control mode command supplied from the PC 501 to each display unit 511.

The video wall 503 (display section) is a large LED display in which n display units 511-1 to 511-$n$ are disposed in a tile shape. FIG. 29 illustrates a case where n is 6×24. Note that, hereinafter, in a case where it is not necessary to distinguish the display units 511-1 to 511-$n$ individually, they are simply referred to as a display unit 511.

The display unit 511 includes m LED arrays 51 disposed in a tile shape. Each display unit 511 of the video wall 503 is connected to a video wall controller 502. The video wall 503 displays a video corresponding to the video signal in units of frames on the basis of the video signal in units of frames and the display control signal supplied from the video wall controller 502. Specifically, the video signal supplied to each display unit 511 is a video signal corresponding to the position of the display unit 511 on the video wall 503. Each display unit 511 displays the video based on the video signal according to the display control signal, whereby the video of one frame is displayed on the entire video wall 503.

In the re-imaging system 500 configured as described above, as in the re-imaging system 10, the respective devices are frame-synchronized by the genlock signal.

Note that the video wall controller 502 and the video wall 503 may have an integrated configuration, or may be a display device in which they are integrated. In addition, the PC 501, the video wall controller 502, and the video wall 503 may have an integrated configuration, or may be a display device in which they are integrated.

<Configuration Example of Vertical Blanking Control Unit>

The hardware configuration of the PC 501 in FIG. 29 is similar to the hardware configuration of the PC 62 in FIG. 5, and thus the description thereof is omitted.

Figure 30:
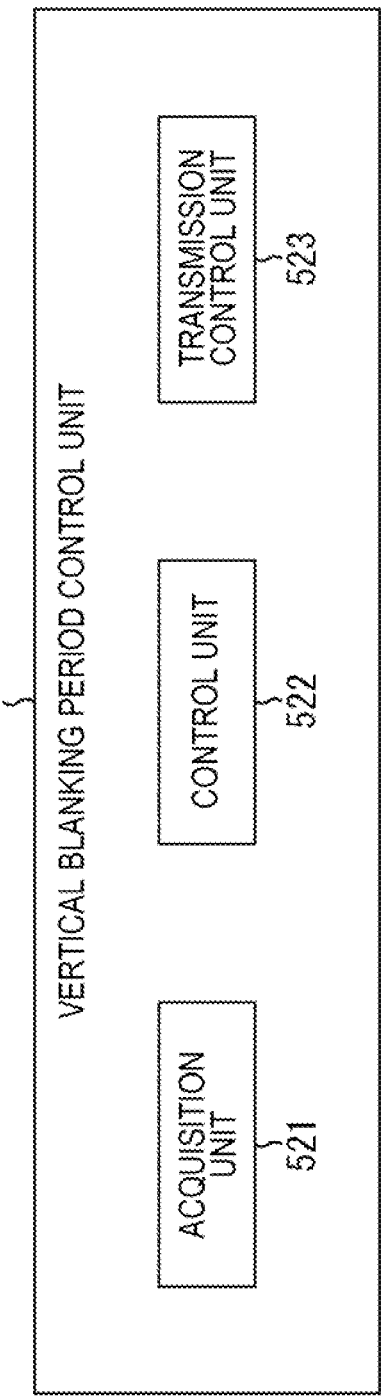
FIG. 30 is a block diagram illustrating a configuration example of a vertical blanking period control unit.

FIG. 30 is a block diagram illustrating a functional configuration example of the CPU of the PC 501 in FIG. 29 in a case where the CPU performs the vertical blanking period control process for controlling the vertical blanking period.

The CPU of the PC 501 functions as a vertical blanking period control unit 520 in FIG. 30 in a case where performing the vertical blanking period control process. The vertical blanking period control unit 520 includes an acquisition unit 521, a control unit 522, and a transmission control unit 523.

Acquisition unit 521 acquires the exposure time transmitted from the setting unit 82 of the video camera 11 and received through the communication unit of the PC 501. The acquisition unit 521 supplies the exposure time to the control unit 522.

The control unit 522 sets the control mode of the vertical blanking period on the basis of the exposure time supplied from the acquisition unit 521 and the curtain speed of the video camera 11. The control unit 522 controls the vertical blanking period by generating a control mode command indicating the control mode. The control unit 522 outputs the control mode command to the transmission control unit 523.

The transmission control unit 523 supplies the control mode command supplied from the control unit 522 to the communication unit of the PC 501, and instructs transmission of the control mode command to the video wall controller 502. As a result, the communication unit transmits (outputs) the control mode command to the video wall controller 502 via a wire such as a LAN cable.

<Detailed Configuration Example of Display Unit>

Figure 31:
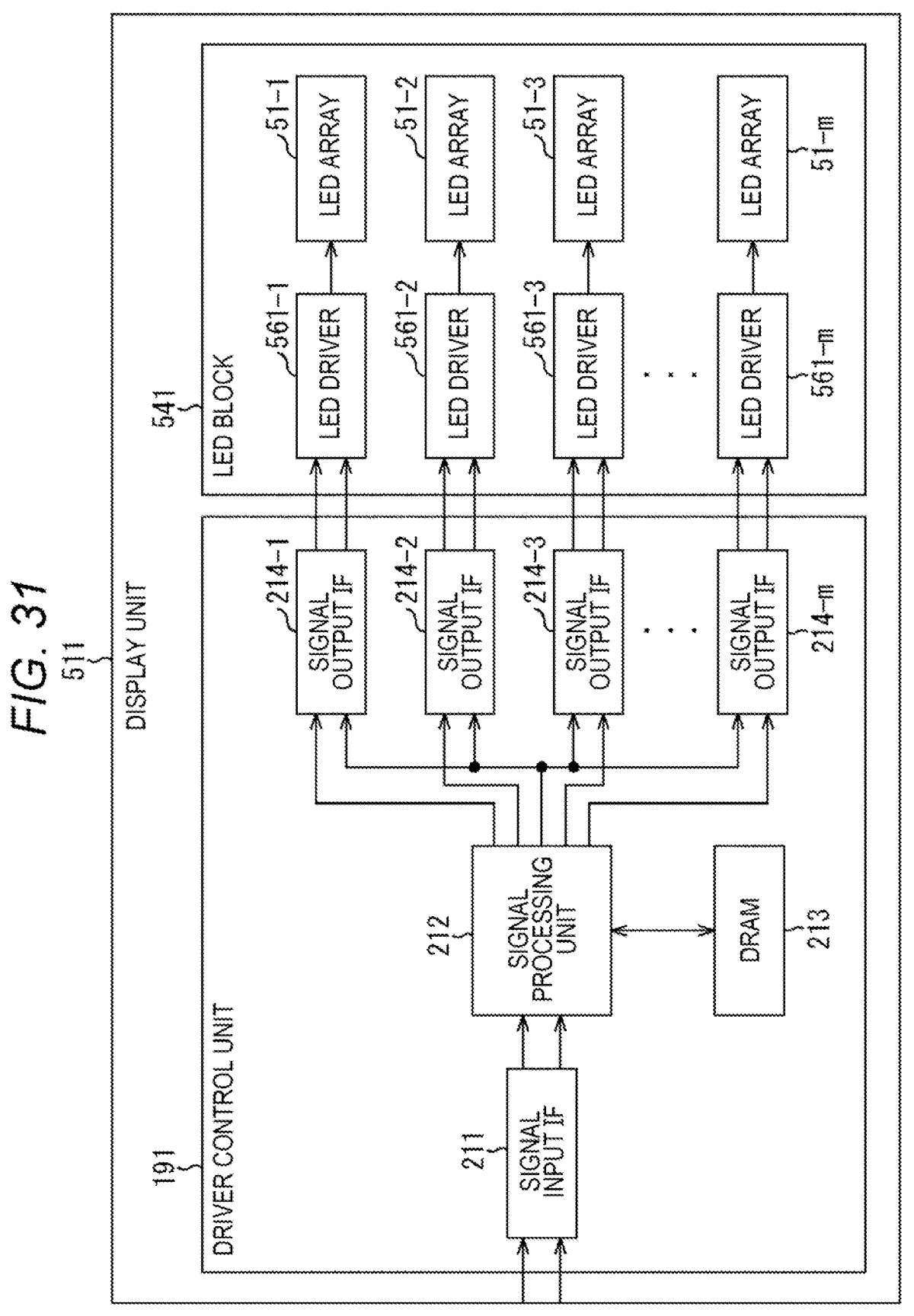

FIG. 31 is a block diagram illustrating a detailed configuration example of the display unit 511 in FIG. 29.

In the display unit 511 of FIG. 31, components corresponding to those of the display unit 41 of FIG. 8 are denoted by the same reference numerals. Therefore, description of the components will be appropriately omitted, and description will be given focusing on a portion different from the display unit 41.

The display unit 511 of FIG. 31 is different from the display unit 41 in that an LED block 541 is provided instead of the LED block 192, and other components are configured in the similar manner as those of the display unit 41.

The LED block 541 is different from the LED block 192 in that LED drivers 221-1 to 221-m are provided instead of the LED drivers 561-1 to 561-m, and other components are configured in the similar manner as those of the LED block 192 except for this point.

The LED drivers 561-1 to 561-m are connected to the signal output IFs 214-1 to 214-m of the driver control unit 191, respectively, and are connected to the LED arrays 51-1 to 51-m, respectively. Note that, hereinafter, in a case where it is not necessary to distinguish the LED drivers 561-1 to 561-m individually, they are simply referred to as an LED driver 561.

The LED driver 561 drives each LED 241 by performing PWM control on the light emission of each LED 241 constituting the LED array 51 connected thereto on the basis of the display control signal and the display signal transmitted from the signal output IF 214 connected thereto.

Specifically, the LED driver 561 controls the light emission start timing of each frame on the basis of the control mode indicated by the display control signal. The LED driver 561 generates a PWM signal so that each LED 241 of the LED array 51 emits light by a predetermined refresh rate in one second with an intensity based on the display signal corresponding to the LED 241, and supplies the PWM signal to each LED 241. As a result, the LED array 51 displays the video corresponding to the position of the LED array 51 on the video wall 503 in the video corresponding to the video signal in units of frames output from the video server 61.

<Description of Vertical Blanking Period>

Figure 32:
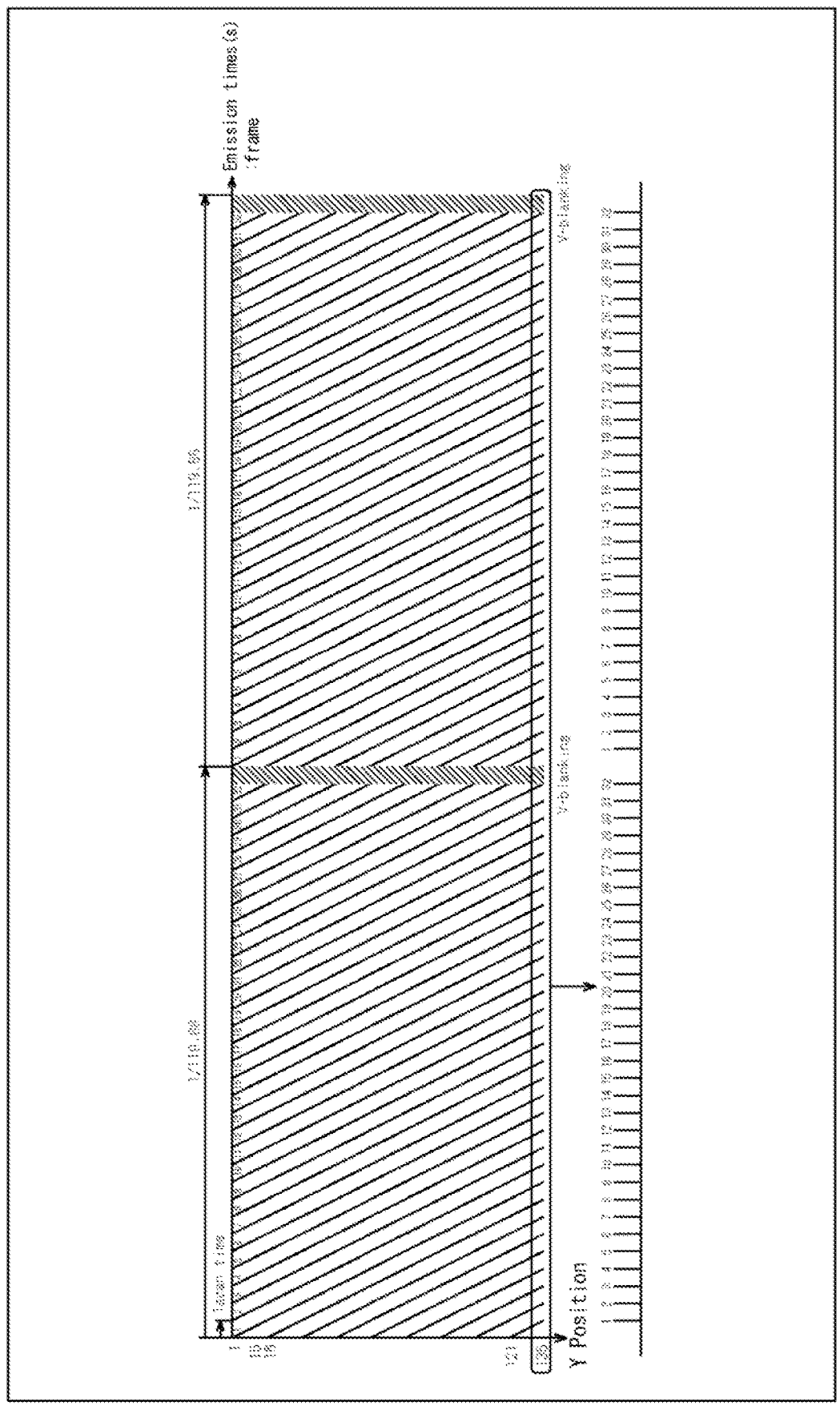
FIG. 32 is a diagram for describing a vertical blanking period.

FIG. 32 is a diagram illustrating a vertical blanking period of a video displayed on the video wall 503.

The upper diagram in FIG. 32 illustrates the light emission timing of the LEDs 241 in each of the first to 135 rows from the top of the video wall 503. In the upper diagram of FIG. 32, the horizontal axis represents the light emission time, and the vertical axis represents each row of the LEDs 241. In the example of FIG. 32, the frame rate of the video wall 503 is 120 Hz, and one frame interval is 1/119.88 seconds. The number of rows of the LEDs 241 constituting the LED array 51 is 15. In the lower diagram of FIG. 32, the light emission timing of the LEDs 241 in the 135th row is indicated by lines.

As illustrated in the upper diagram of FIG. 32, in one frame section, a vertical blanking period (V-blanking) is provided after the end of all scans. In the upper diagram of FIG. 32, the interval between the oblique lines connecting the light emission timings of respective rows is the time of one scan.

<Description of Exposure Time and Vertical Blanking Period>

Figure 33:
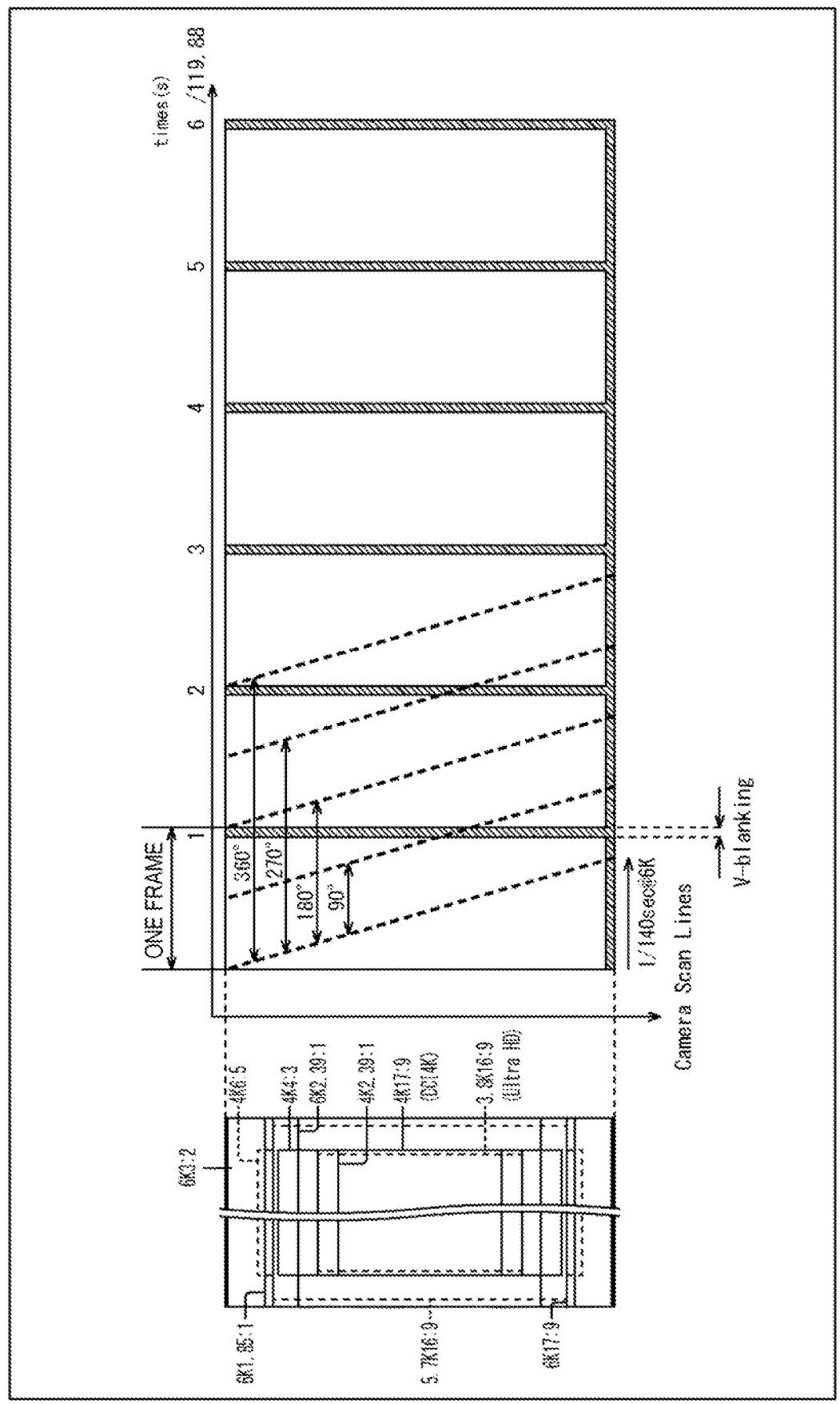
FIG. 33 is a diagram for describing an exposure time and a vertical blanking period.

FIG. 33 is a diagram for describing an exposure time and a vertical blanking period.

The left diagram in FIG. 33 illustrates a light receiving face of the imaging unit 85 of the video camera 11. The right diagram in FIG. 33 is a diagram illustrating a video displayed on the video wall 503 corresponding to the pixels of each row on the light receiving face of the imaging unit 85. The horizontal axis of the diagram on the right side of FIG. 33 represents the display time of the video, and the vertical axis represents the number of rows from the top of the rows of the pixels on the light receiving face of the imaging unit 85 corresponding to the video displayed at the display time. In the example of FIG. 33, the frame rate of the video wall 503 is 120 Hz, and the frame rate of the video camera 11 is 60 Hz.

In the example of FIG. 33, as illustrated in the right diagram of FIG. 33, in a case where the exposure time, that is, the opening angle is 360 degrees, exposure is performed with light corresponding to the video for two frames displayed on the video wall 503. In a case where the opening angle is 270 degrees, exposure is performed with light corresponding to the video for 1.5 frames, and in a case where the opening angle is 180 degrees, exposure is performed with light corresponding to the video for 1 frame. In a case where the opening angle is 90 degrees, exposure is performed with light corresponding to the video for 0.5 frames.

Here, since the opening angle is an angle in the range of 0 degrees to 360 degrees, the video corresponding to the light used for the exposure of the video camera 11 can be the video for 0 to 2 frames. That is, the exposure period may include a vertical blanking period from zero to two times.

<Description of Cause of Black Belt Occurrence>

Figure 34:
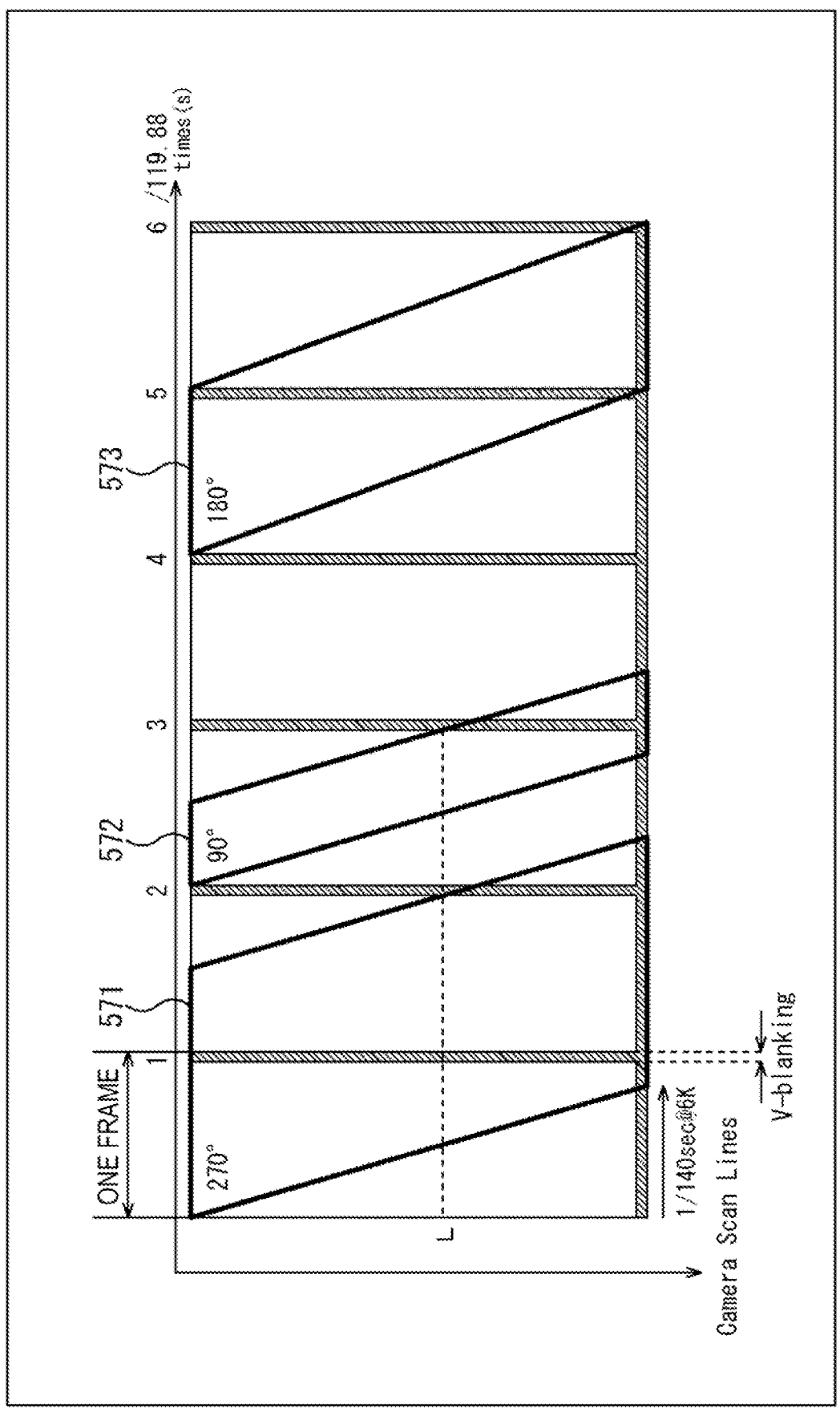
FIG. 34 is a diagram for describing a cause of occurrence of black belts.

FIG. 34 is a diagram illustrating a cause of occurrence of a black belt in a video re-captured by the re-imaging system in a case where the vertical blanking period is not controlled.

In FIG. 34, the horizontal axis represents the display time of the video, and the vertical axis represents the number of rows from the top of the rows of the pixels on the light receiving face of the imaging unit corresponding to the video displayed at the display time. In the example of FIG. 34, the frame rate of the video wall is 120 Hz, and the frame rate of the video camera is 60 Hz.

In the example of FIG. 34, in a case where the opening angle is 270 degrees, the vertical blanking period is included once in the exposure period 571 in the upper rows relative to the L-th row of the light receiving face of the imaging unit, but the vertical blanking period is included twice in the exposure period 571 in the lower rows relative to the L-th row. In a case where the opening angle is 90 degrees, the vertical blanking period is not included in the exposure period 571 in the upper rows relative to the L-th row of the light receiving face of the imaging unit 85, but the vertical blanking period is included once in the exposure period 571 in the lower rows relative to the L-th row.

Here, light emission is not performed in the vertical blanking period. Therefore, in a case where the opening angle is 270 degrees or 90 degrees, the luminance of the pixels in the lower rows relative to the L-th row re-imaged by the video camera is lower than the luminance of the pixels in the upper rows relative to the L-th row. As a result, in the video re-captured by the video camera, the video in the lower rows relative to the L-th row is a black belt.

Note that in a case where the opening angle is 270 degrees or 90 degrees, the number of vertical blankings included in the exposure period 571 or 572 always varies depending on the row even if the light emission start timing is shifted. As a result, a black belt is generated in the video re-captured by the video camera.

On the other hand, in a case where the opening angle is 180 degrees, the vertical blanking period is included once in the exposure period 571 in all rows of the light receiving face of the imaging unit. Although not illustrated, in a case where the opening angle is 360 degrees, the vertical blanking period is included twice in the exposure period 571 in all rows of the light receiving face of the imaging unit 85. Therefore, in a case where the opening angle is 180 degrees or 360 degrees, a black belt does not occur.

<Description of Control Mode>

Figure 35:
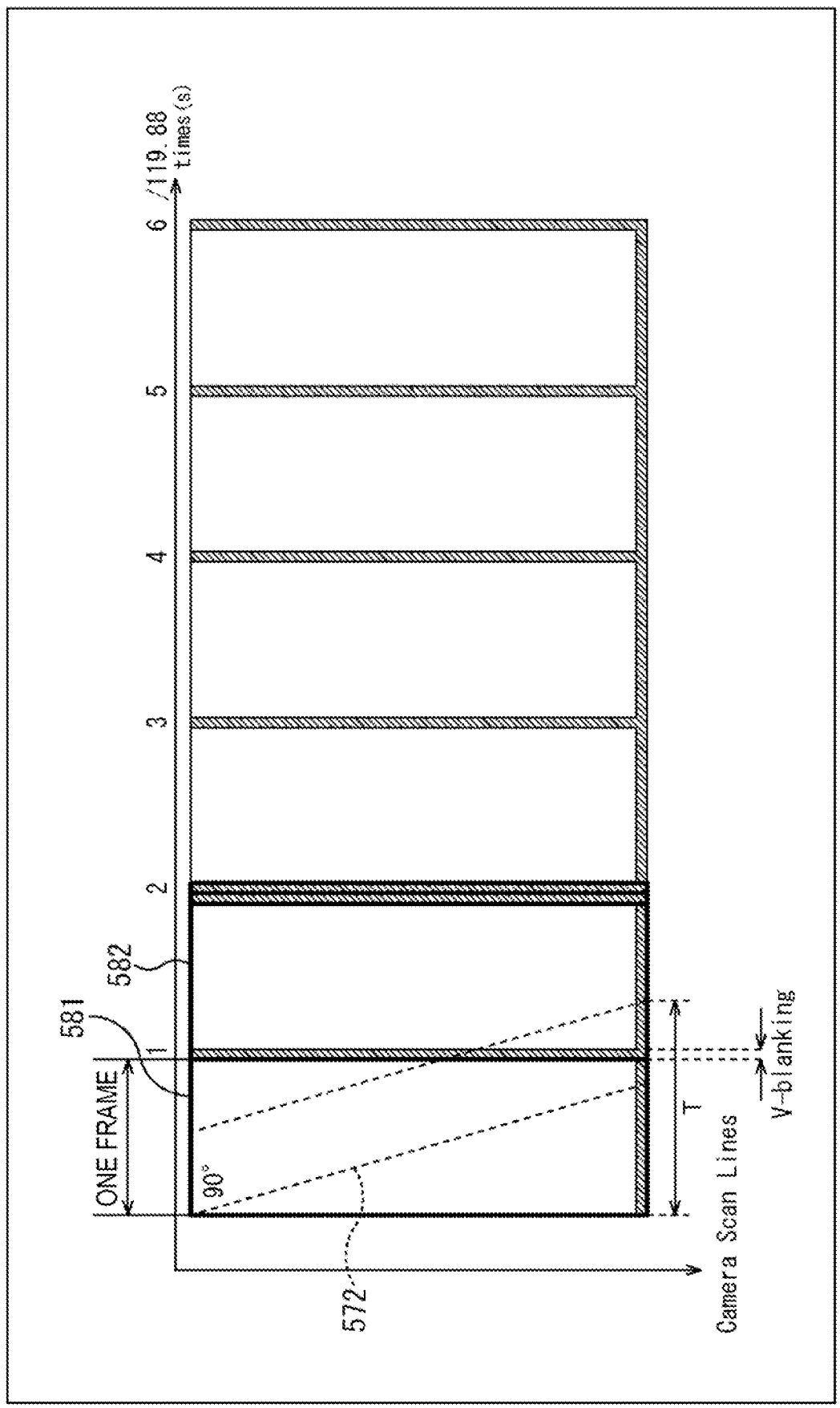
FIG. 35 is a diagram for describing a control mode.
Figure 36:
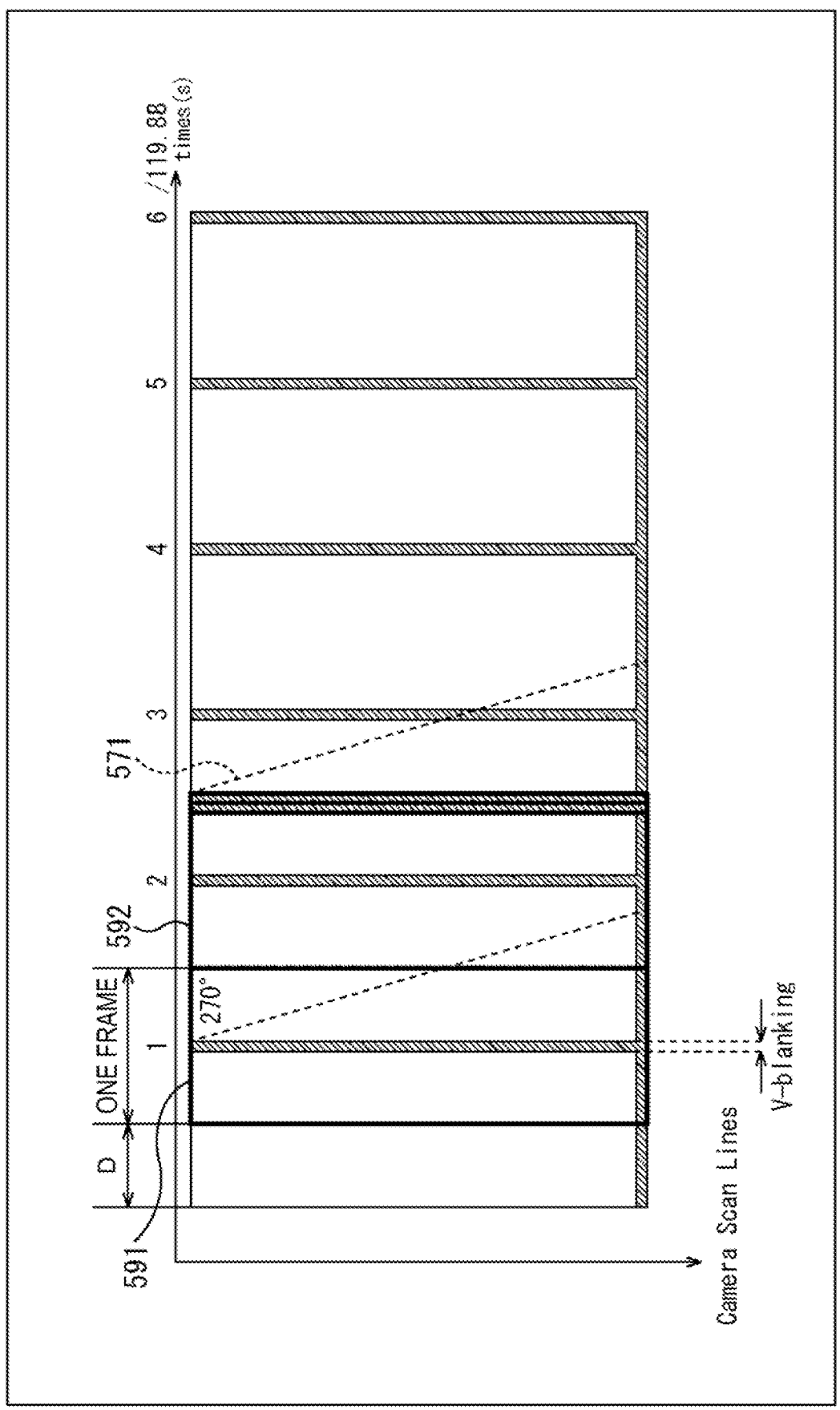
FIG. 36 is a diagram for describing a control mode.

FIGS. 35 and 36 are diagrams for describing a control mode.

In FIGS. 35 and 36, the horizontal axis represents the display time of the video, and the vertical axis represents the number of rows from the top of the rows of the pixels on the light receiving face of the imaging unit 85 exposed with the light corresponding to the video displayed at the display time. In the examples of FIGS. 35 and 36, the frame rate of the video wall 503 is 120 Hz, and the frame rate of the video camera 11 is 60 Hz.

As illustrated in FIG. 35, for example, in a case where the opening angle is 90 degrees, the exposure period of some rows of the imaging unit 85 is across no vertical blanking period, and the exposure period of the remaining rows is across one vertical blanking period, the control unit 522 sets the control mode to a first mode in which the vertical blanking period of the even frame is not included in the exposure period of all the rows of the imaging unit 85.

In a case where the control mode is set to the first mode, the LED driver 561 advances the light emission start timing (video display start time) of the even frame (second frame) that is the next frame after one odd frame (first frame) of the adjacent frames, thereby deleting the vertical blanking period of the odd frame. As a result, the display period 581 of the odd frame is shortened by the vertical blanking period, and the display period 582 of the even frame is extended by the vertical blanking period.

As described above, in a case where the vertical blanking period of the odd-numbered frame is deleted, the vertical blanking period is not included in the period T from the start of the exposure of the first row from the top of the imaging unit 85 to the end of the exposure of the last row (the shutter is released), that is, the period of the sum of the curtain speed and the exposure time. Therefore, the vertical blanking period is not included in the exposure period of all the rows of the imaging unit 85. As a result, in the video signal in units of frames re-captured by video camera 11, a row of pixels having low luminance does not occur, and a black belt does not occur.

On the other hand, as illustrated in FIG. 36, for example, in a case where the opening angle is 270 degrees, the exposure period of some rows of the imaging unit 85 is across one vertical blanking period, and the exposure period of the remaining rows is across two vertical blanking periods, the control unit 522 sets the control mode to a second mode in which the vertical blanking periods of even frame is included in the exposure period of all the rows of the imaging unit 85.

In a case where the control mode is set to the second mode, the LED driver 561 deletes the vertical blanking period of the odd frame as in the case of the first mode. As a result, the display period 591 of the odd frame is shortened by the vertical blanking period, and the display period 592 of the even frame is extended by the vertical blanking period. Then, the light emission start time (display start time) of all the frames is changed to be delayed by the time D so that the vertical blanking period of the even frame is included in the exposure periods 571 of all the rows of the imaging unit 85.

As a result, the vertical blanking period of the even frame is included in the exposure period 571 of all the rows of the imaging unit 85. As a result, in the video signal in units of frames re-captured by video camera 11, a row of pixels having low luminance does not occur, and a black belt does not occur.

Note that the light emission start time of all the frames can be shifted by, for example, one frame section. For example, in a case where the frame rate is 120 Hz, the light emission start time of all the frames can be shifted to $\frac{1}{120}$ seconds.

On the basis of the curtain speed and the exposure time, the control unit 522 determines whether only the exposure period of some rows of the imaging unit 85 is across one vertical blanking period or two vertical blanking periods. Then, in a case where it is determined that only the exposure period of some rows is across one vertical blanking period, the control unit 522 sets the control mode to the first mode. In a case where it is determined that only the exposure period of some rows is across the two vertical blanking periods, the control unit 522 sets the control mode to the second mode.

<Description of Vertical Blanking Period Control Process>

Figure 37:
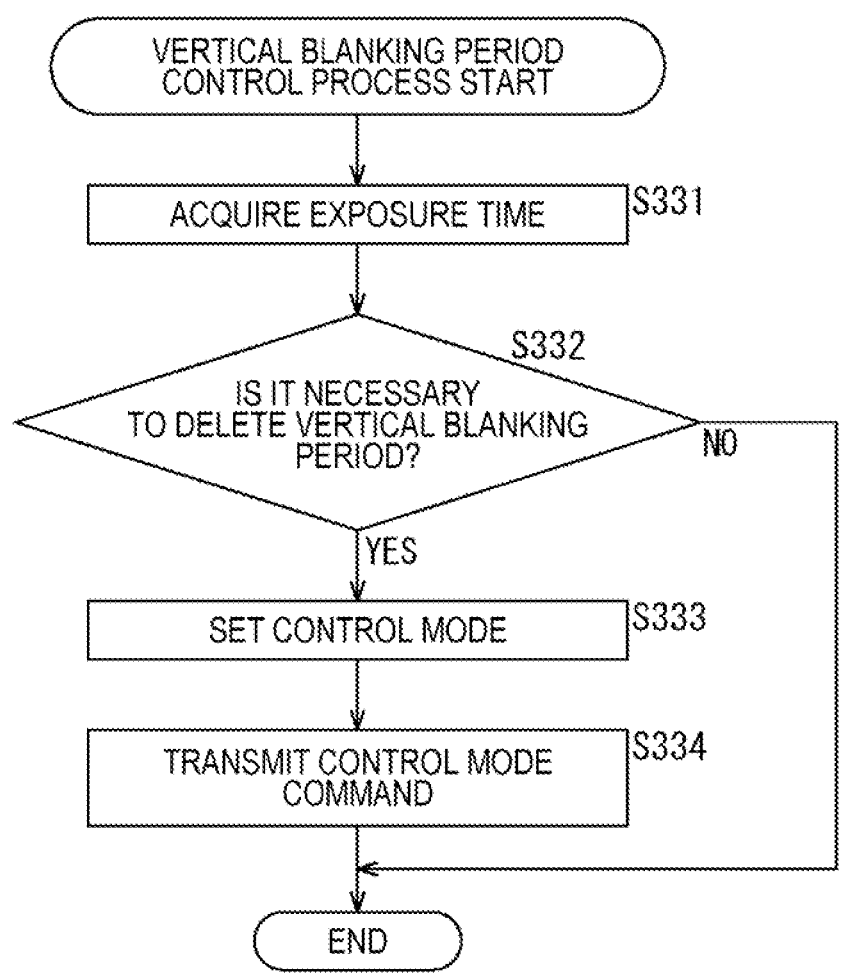
FIG. 37 is a flowchart illustrating a vertical blanking period control process.

FIG. 37 is a flowchart illustrating a vertical blanking period control process of the vertical blanking period control unit 520 in FIG. 30. This vertical blanking period control process is started, for example, when an exposure time is transmitted from the setting unit 82 of the video camera 11.

In step S331 of FIG. 37, the acquisition unit 521 acquires the exposure time transmitted from the setting unit 82 and received via the communication unit of the PC 501, and supplies the exposure time to the control unit 522.

In step S332, the control unit 522 determines whether or not it is necessary to delete the vertical blanking period on the basis of the exposure time supplied from the acquisition unit 521 by the process in step S331 and the curtain speed of the video camera 11. Specifically, the control unit 522 determines whether or not the vertical blanking periods included in the exposure period of all the rows of the imaging unit 85 are the same on the basis of the exposure time and the curtain speed. In a case where it is determined that the vertical blanking periods included in the exposure period of all the rows are not the same, the control unit 522 determines that it is necessary to delete the vertical blanking period and advances the process to step S33.

In step S333, the control unit 522 sets the control mode on the basis of the exposure time and the curtain speed. Specifically, on the basis of the exposure time and the curtain speed, the control unit 522 determines whether or not the exposure period of some rows of the imaging unit 85 is across no vertical blanking period, and the exposure period of the remaining rows is across one vertical blanking period. In a case where it is determined that the exposure period of some rows is across no vertical blanking period and the exposure period of the remaining rows is across one vertical blanking period, the control unit 522 sets the control mode to the first mode. On the other hand, in a case where it is determined that the exposure period of some rows is across no vertical blanking period and the exposure period of the remaining rows is not across one vertical blanking period, that is, in a case where the exposure period of some rows is across one vertical blanking period and the exposure period of the remaining rows is across two vertical blanking periods, the control unit 522 sets the control mode to the second mode.

The control unit 522 controls the vertical blanking period by generating a control mode command representing the set control mode. The control unit 522 outputs the control mode command to the transmission control unit 523.

In step S334, the transmission control unit 523 supplies the control mode command supplied from the control unit 522 in step S333 to the communication unit of the PC 501, instructs transmission to the video wall controller 502, and causes the video wall controller 502 to transmit the control mode command. Then, the process ends.

On the other hand, in step S332, in a case where the control unit 522 determines that the vertical blanking periods included in the exposure period of all the rows are the same, the processing ends.

As described above, the re-imaging system 500 controls the vertical blanking period of the video displayed on the video wall 503 on the basis of the exposure time. Therefore, it is possible to prevent the black belt from occurring in a case where the video wall 503 is re-imaged.

Note that, although re-imaging system 500 does not perform the refresh rate control process, it may perform the refresh rate control process. In this case, the refresh rate control process varies depending on whether or not the vertical blanking period is included in the exposure period. The refresh rate control process will be described below.

<Description of Refresh Rate Control Process>

Figure 38:
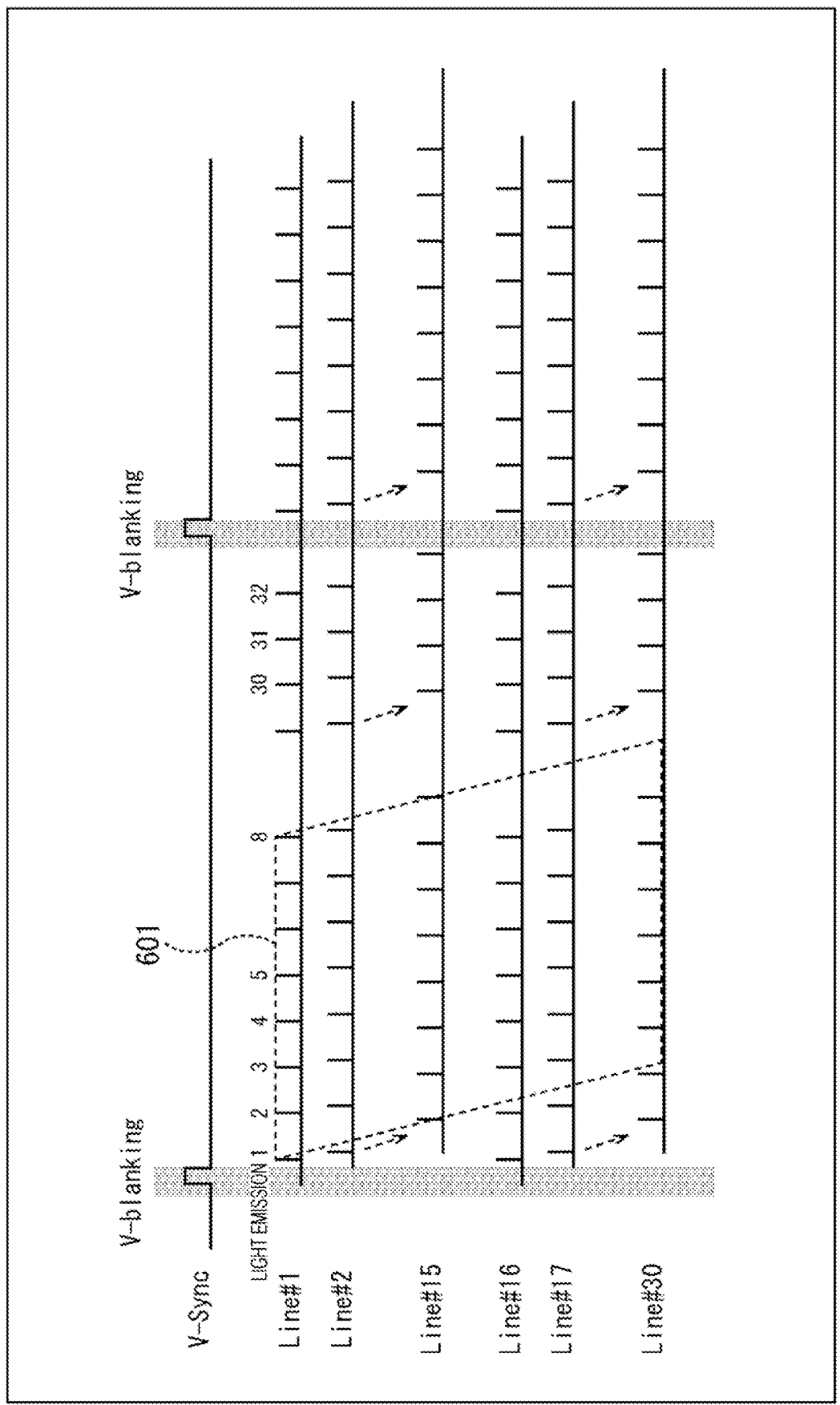
FIG. 38 is a diagram for describing a refresh rate control process.
Figure 39:
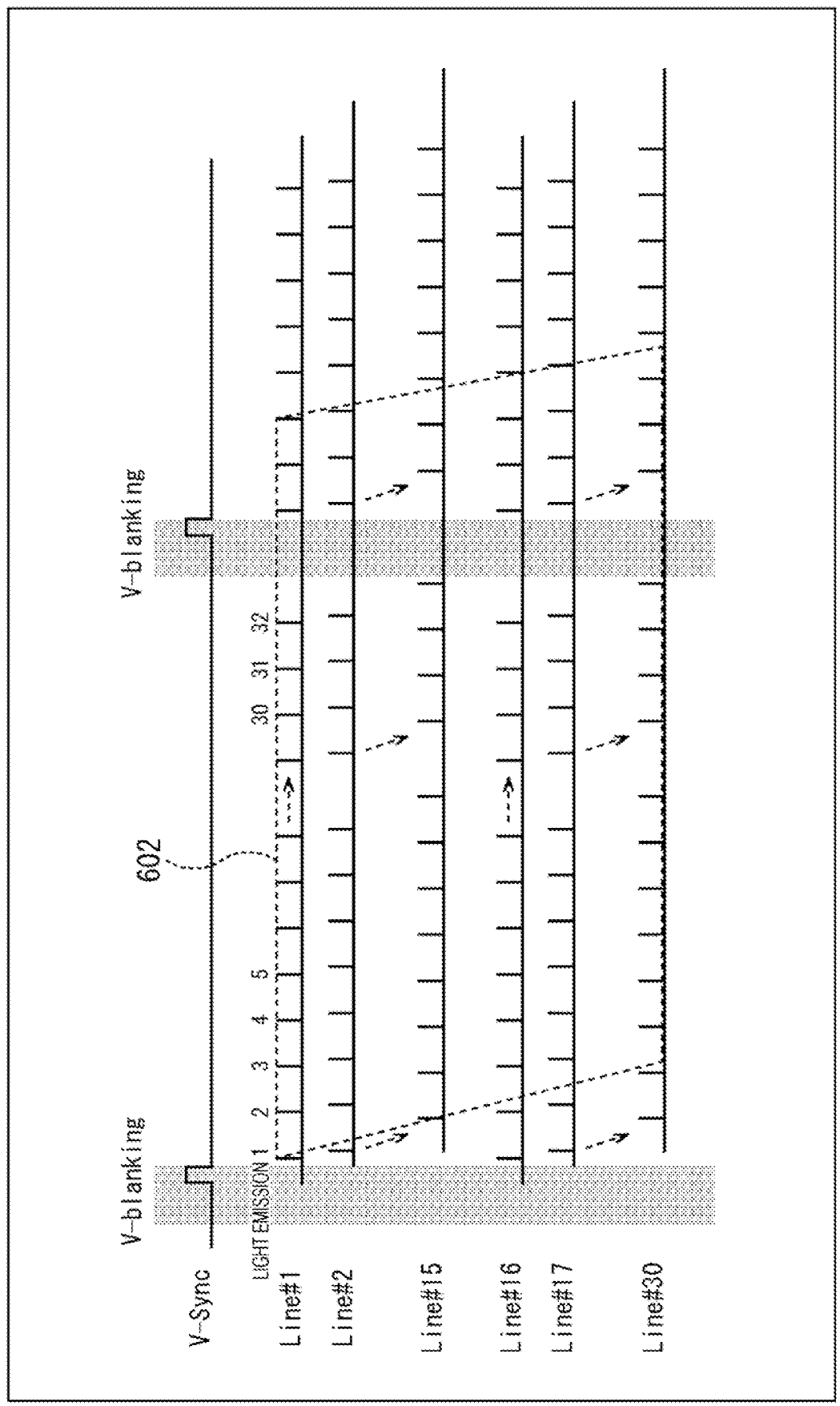
FIG. 39 is a diagram for describing a refresh rate control process.

FIGS. 38 and 39 are diagrams for describing the refresh rate control process in a case where the re-imaging system 500 performs the refresh rate control process.

In FIGS. 38 and 39, the horizontal axis represents the light emission time. The top row represents a vertical synchronization signal of a video displayed on the video wall 503. The second and subsequent rows from the top represent the light emission timing of each row of the LEDs 241 for 30 rows from the top of the video wall 503, and the i-th row from the top is denoted as Line #i in FIGS. 38 and 39. In FIGS. 38 and 39, the number of rows of the LEDs 241 constituting the LED array 51 is 15.

In a case where the vertical blanking period is not included in the exposure period 601 after the vertical blanking control process, as illustrated in FIG. 38, the PC 501 (control unit) determines the refresh rate so that the exposure time is an integral multiple of the light emission cycle of the LED 241. In the example of FIG. 38, the exposure time is 7 times the light emission cycle.

On the other hand, in a case where the vertical blanking period is included once in the exposure period 602 after the vertical blanking control process, as illustrated in FIG. 39, the PC 501 determines the refresh rate so that the exposure time is the sum of an integral multiple (N times) of the light emission cycle of the LED 241 and one vertical blanking period. In the example of FIG. 38, the exposure time is the sum of 34 times the light emission cycle and one vertical blanking period, and the number of times of scanning in one frame section is 32.

Note that, although not illustrated, in a case where the vertical blanking period is included twice in the exposure period, the refresh rate is determined so that the exposure time is the sum of an integral multiple of the light emission cycle of the LED 241 and two vertical blanking periods.

In a case where the PC 501 performs the refresh rate control process as described above, the vertical blanking period may be further controlled on the basis of the refresh rate as in the second embodiment.

<Description of Control of Vertical Blanking Period Based on Refresh Rate>

Figure 40:
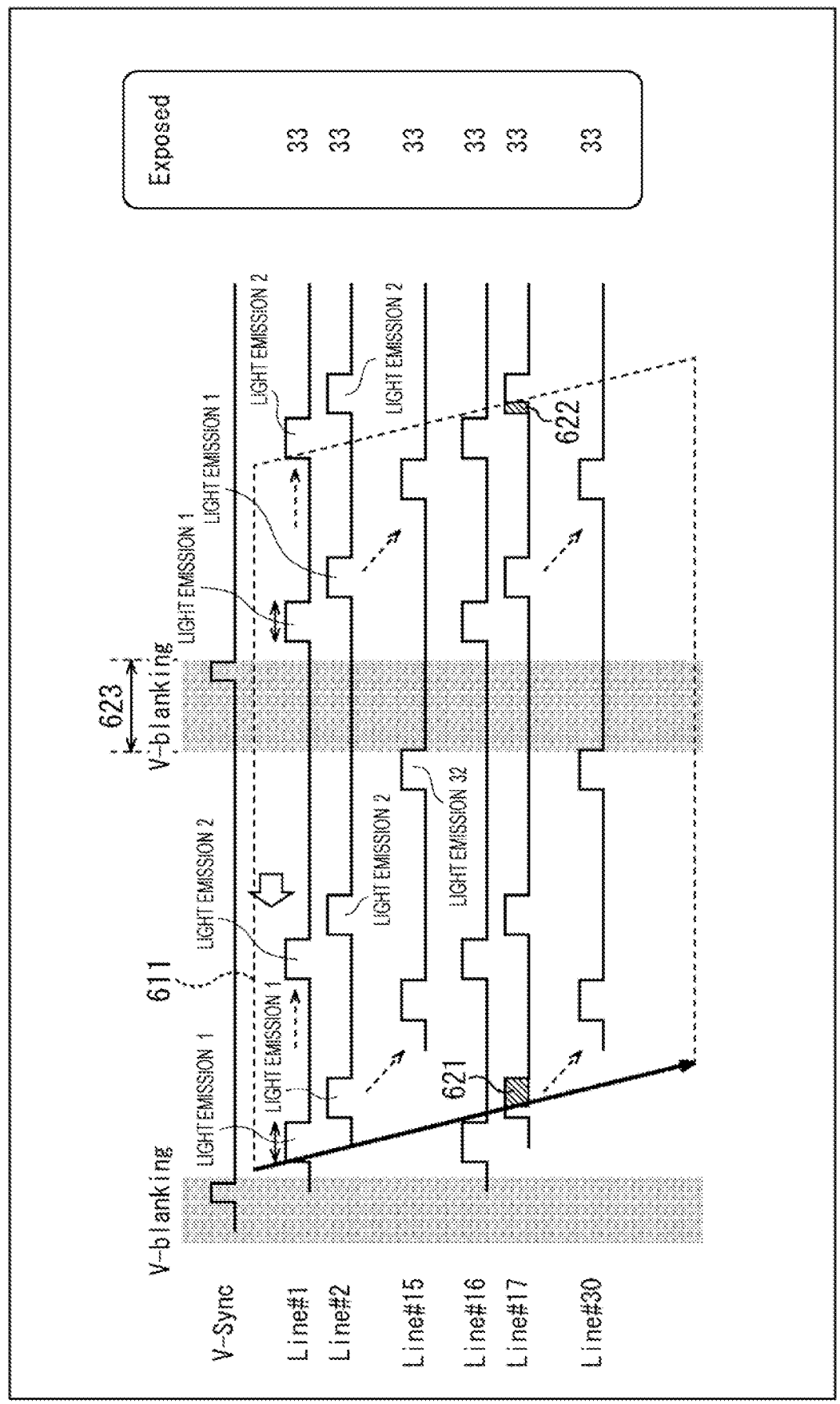
FIG. 40 is a diagram for describing control of a vertical blanking period.

FIG. 40 is a diagram for describing control of the vertical blanking period based on the refresh rate by the PC 501 in this case.

In FIG. 40, the horizontal axis represents the light emission time. The top row represents a vertical synchronization signal of a video displayed on the video wall 503. The second and subsequent rows from the top represent the light emission timing of each row of the LEDs 241 of 30 rows from the top of the video wall 503, and in FIG. 40, the i-th row from the top is represented as Line #i. In the example of FIG. 40, the number of rows of the LEDs 241 constituting the LED array 51 is 15.

As illustrated in FIG. 40, in a case where one vertical blanking period is included in the exposure period 611, the PC 501 controls the vertical blanking period so that the exposure period is the sum of an integral multiple of the light emission cycle of the LED 241 and one vertical blanking period.

Specifically, first, the PC 501 determines the refresh rate so that the exposure period is the sum of an integral multiple of the light emission cycle of the LED 241 and one vertical blanking period.

In the example of FIG. 40, the PC 501 determines the refresh rate so that the exposure time is the sum of 33 times the light emission cycle and one vertical blanking period. As a result, the number of times of scanning in the exposure period is 33 times in all rows. For example, in the 17th row from the top, a partial period 621 of the entire period of the first light emission and a partial period 622 of the entire period of the last light emission are included in the exposure period 611. The sum of the period 621 and the period 622 is the entire period of one light emission. Therefore, the luminance of the pixels in all the rows re-imaged by the video camera 11 is the same. As a result, a row of pixels having low luminance does not occur and a black belt does not occur in the video in units of frames re-captured by the video camera 11.

Next, the PC 501 calculates a period 623 from the end of the last scan in one frame section to the start of display (light emission) of the next frame on the basis of the determined refresh rate, and determines the period 623 as a vertical blanking period, thereby controlling vertical blanking.

On the other hand, although not illustrated, in a case where the vertical blanking period is not included in the exposure period, the vertical blanking period is controlled so that the exposure period is an integral multiple of the light emission cycle of the LED 241, as in the second embodiment. Specifically, the PC 401 controls the vertical blanking on the basis of the refresh rate determined so that the exposure period is an integral multiple of the light emission cycle of the LED 241.

In the re-imaging system 500, the maximum value of the number of times of the vertical blanking period included in the exposure period is 2, but the number of times is not limited to 2. Even in a case where the maximum value of the number of times of the vertical blanking period included in the exposure period is two or more, it is possible to prevent the black belt from occurring by performing the same processing as in the case of two times.

In the re-imaging system 400 (500), the exposure time is transmitted from the video camera 11 to the PC 401 (501), but the user may operate the input unit of the PC 401 (501) to input the exposure time of the video camera 11, and the refresh rate control unit 130 (vertical blanking period control unit 520) may acquire the exposure time.

In the re-imaging system 400 (500), the PC 401 (501) controls the refresh rate and the vertical blanking period, but the video camera 11 may transmit the exposure time to the video wall controller 402 (502) and the video wall 403 (503), and at least part of the video wall controller 402 (502) and the video wall 403 (503) may function as the refresh rate control unit 130 and the vertical blanking period control unit 420 (520).

In the first to third embodiments, the PC 62 (401, 501) exchanges signals with the video camera 11 via a wire such as a coaxial cable, but may exchange signals by wireless communication. Similarly, the PC 62 (401, 501) exchanges signals with the video wall controller 63 (402, 502) via a wire such as a LAN cable, but may exchange signals by wireless communication.

The above-described series of processes can be executed by hardware or software.

The re-imaging system 10 (400, 500) may include a plurality of video wall controllers 63 (402, 502), and each video wall controller 63 (402, 502) may divide and control the video wall 12 (403, 503). In a case where the video wall 12 (403, 503) includes one display unit 41 (411, 511), the video wall controller 63 (402, 502) may not be provided. In this case, the video signal in units of frames output from the video server 61 and the control command output from the PC 62 (401, 501) are directly input to the video wall 12 (403, 503).

In the present specification, the system means a set of a plurality of components (device, module (part), processing, and the like), and it does not matter whether or not all the components are in the same housing. Therefore, any of a plurality of devices housed in separate housings and connected via a network, one device in which a plurality of modules is housed in one housing, and a processing unit that performs a plurality of processes is the system.

An embodiment of the present technology is not limited to the above-described embodiment, and various modifications can be made without departing from the scope of the present technology.

For example, it is possible to adopt a mode obtained by combining all or some of the plurality of embodiments described above.

For example, the present technology may be configured as cloud computing in which one function is shared by a plurality of devices via a network to process together.

In addition, each step described in the above flowcharts can be executed by one device or shared and performed by a plurality of devices.

Moreover, in a case where a plurality of processing steps is included in one step, the plurality of processing included in the one step can be performed by one device or shared and performed by a plurality of devices.

Note that, the effects described in the present specification are merely examples and are not limited, and there may be effects other than those described in the present specification.

The present technology can have the following configurations.

(1)

An information processing system including
a control unit that controls, on the basis of an exposure time of an imaging unit that images a display section, a vertical blanking period of a video displayed on the display section.

(2)

The information processing system according to Item (1),
in which the control unit is configured to delete the vertical blanking period of a first frame that is one of two adjacent frames of the video on the basis of the exposure time.

(3)

The information processing system according to Item (2),
in which the control unit is configured to delete the vertical blanking period of the first frame by advancing a display start time of a second frame that is a next frame of the first frame.

(4)

The information processing system according to Item (3),
in which the control unit is configured to extend the vertical blanking period of the second frame by the vertical blanking period of the first frame.

(5)

The information processing system according to Item (3) or (4),
in which the control unit is configured so that the vertical blanking period of the second frame is included in an exposure period of all rows of the video by changing display start times of all frames of the video on the basis of the exposure time.

(6)

The information processing system according to Item (5),
in which the control unit is configured so that the vertical blanking period of the second frame is included in the exposure period of all rows of the video on the basis of a curtain speed of the imaging unit and the exposure time.

(7)

The information processing system according to Item (6),
in which the control unit is configured to set a current mode to a first mode in which the vertical blanking period of the second frame is not included in the exposure period of all rows of the video or a second mode in which the vertical blanking period of the second frame is included in the exposure period of all rows of the video on the basis of a curtain speed of the imaging unit and the exposure time.

(8)
The information processing system according to Item (7),
in which in a case where the current mode is set to the second mode, the control unit is configured so that the vertical blanking period of the second frame is included in the exposure period of all rows of the video.

(9)
The information processing system according to Item (1),
in which the control unit is configured to control the vertical blanking period so that the exposure time is an integral multiple of a light emission cycle of the display section.

(10)
The information processing system according to Item (9),
in which in a case where the vertical blanking period is not included in an exposure period of the imaging unit, the control unit is configured to control the vertical blanking period so that the exposure time is an integral multiple of a light emission cycle of the display section.

(11)
The information processing system according to Item (10),
in which in a case where the vertical blanking period is not included in the exposure period, the control unit is configured to determine a refresh rate of the display section so that the exposure time is an integral multiple of a light emission cycle of the display section, and control the vertical blanking period on the basis of the refresh rate.

(12)
The information processing system according to Item (9) or (10),
in which in a case where the vertical blanking period is included in the exposure period of the imaging unit, the control unit is configured to control the vertical blanking period so that the exposure time is a sum of an integral multiple of a light emission cycle of the display section and the vertical blanking period.

(13)
The information processing system according to Item (12),
in which in a case where the vertical blanking period is included in the exposure period, the control unit is configured to determine a refresh rate so that the exposure time is a sum of an integral multiple of a light emission cycle of the display section and the vertical blanking period, and control the vertical blanking period on the basis of the refresh rate.

(14)
The information processing system according to any one of Items (1) to (13), further including
an acquisition unit that acquires the exposure time.

(15)
The information processing system according to any one of Items (1) to (14), further including
an input unit that acquires a video signal for displaying on the display section including a plurality of display units,
a division unit that divides the video signal into video signals for displaying on respective display units of the display section, and
an output unit that outputs a control signal for controlling the vertical blanking period and the divided video signal to the display unit,
in which the control unit is configured to control the vertical blanking period by generating the control signal.

(16)
The information processing system according to Item (15),
in which the control unit is provided on a first device,
the input unit, the division unit, and the output unit are provided on a second device different from the first device, and
the control unit outputs the control signal to the second device.

(17)
The information processing system according to Item (15),
in which the control unit, the input unit, the division unit, and the output unit are provided on a same device.

(18)
The information processing system according to any one of Items (1) to (17), further including
the display section configured to be driven according to control of the vertical blanking period by the control unit.

(19)
The information processing system according to any one of Items (1) to (18),
in which the display section emits light in a passive matrix driving system, and
the imaging unit performs imaging by a rolling shutter system.

(20)
An information processing method including a control step of
an information processing system
controlling, on the basis of an exposure time of an imaging unit that images a display section, a vertical blanking period of a video displayed on the display section.

REFERENCE SIGNS LIST

11 Video camera
131 Acquisition unit
152 HDMI terminal
153 DP terminal
154 DVI terminal
160 Distribution unit
161-1 to 161-$n$ Signal output IF
400 Re-imaging system
401 PC
402 Video wall controller
403 Video wall
411 Display unit
422 Control unit
500 Re-imaging system
501 PC
502 Video wall controller
503 Video wall
511 Display unit
521 Acquisition unit
522 Control unit

The invention claimed is:
1. An information processing system comprising
circuitry configured to, on a basis of a relation between a vertical blanking period of a video displayed on a display section and an exposure time of an imaging unit that images the display section, control the vertical blanking period of the video displayed on the display section, wherein the circuitry is further configured to delete the vertical blanking period of a first frame that is one of two adjacent frames of the video on a basis of the exposure time.

2. The information processing system according to claim 1,
wherein the circuitry is further configured to delete the vertical blanking period of the first frame by advancing a display start time of a second frame that is a next frame of the first frame.

3. The information processing system according to claim 2,
wherein the circuitry is further configured to extend the vertical blanking period of the second frame by the vertical blanking period of the first frame.

4. The information processing system according to claim 2,
wherein the circuitry is further configured so that the vertical blanking period of the second frame is included in an exposure period of all rows of the imaging unit by changing display start times of all frames of the video on a basis of the exposure time.

5. The information processing system according to claim 4,
wherein the circuitry is further configured so that the vertical blanking period of the second frame is included in the exposure period of all rows of the imaging unit on a basis of a curtain speed of the imaging unit and the exposure time.

6. The information processing system according to claim 5,
wherein the circuitry is further configured to set a current mode to a first mode in which the vertical blanking period of the second frame is not included in the exposure period of all rows of the imaging unit or a second mode in which the vertical blanking period of the second frame is included in the exposure period of all rows of the imaging unit on a basis of a curtain speed of the imaging unit and the exposure time.

7. The information processing system according to claim 6,
wherein in a case where the current mode is set to the second mode, the circuitry is further configured so that the vertical blanking period of the second frame is included in the exposure period of all rows of the imaging unit.

8. The information processing system according to claim 1, further comprising:
an acquisition unit that acquires the exposure time.

9. The information processing system according to claim 1, further comprising:
an input unit that acquires a video signal for displaying on the display section including a plurality of display units;
a division unit that divides the video signal into video signals for displaying on respective display units of the display section; and
an output unit that outputs a control signal for controlling the vertical blanking period and the divided video signal to the display unit,
wherein the circuitry is further configured to control the vertical blanking period by generating the control signal.

10. The information processing system according to claim 9,
wherein the circuitry is provided on a first device,
the input unit, the division unit, and the output unit are provided on a second device different from the first device, and
the circuitry outputs the control signal to the second device.

11. The information processing system according to claim 9,
wherein the circuitry, the input unit, the division unit, and the output unit are provided on a same device.

12. The information processing system according to claim 1, further comprising:
the display section configured to be driven according to control of the vertical blanking period by the circuitry.

13. The information processing system according to claim 1,
wherein the display section emits light in a passive matrix driving system, and
the imaging unit performs imaging by a rolling shutter system.

14. An information processing system comprising
circuitry configured to, on a basis of a relation between a vertical blanking period of a video displayed on a display section and an exposure time of an imaging unit that images the display section, control the vertical blanking period of the video displayed on the display section,
wherein the circuitry is further configured to control the vertical blanking period so that the exposure time is an integral multiple of a light emission cycle of the display section, and
wherein in a case where the vertical blanking period is not included in an exposure period of the imaging unit, the circuitry is further configured to control the vertical blanking period so that the exposure time is an integral multiple of a light emission cycle of the display section.

15. The information processing system according to claim 14,
wherein in a case where the vertical blanking period is not included in the exposure period, the circuitry is further configured to determine a refresh rate of the display section so that the exposure time is an integral multiple of a light emission cycle of the display section, and control the vertical blanking period on a basis of the refresh rate.

16. An information processing system comprising
circuitry configured to, on a basis of a relation between a vertical blanking period of a video displayed on a display section and an exposure time of an imaging unit that images the display section, control the vertical blanking period of the video displayed on the display section,
wherein the circuitry is further configured to control the vertical blanking period so that the exposure time is an integral multiple of a light emission cycle of the display section, and
wherein in a case where the vertical blanking period is included in the exposure period of the imaging unit, the circuitry is further configured to control the vertical blanking period so that the exposure time is a sum of an integral multiple of a light emission cycle of the display section and the vertical blanking period.

17. The information processing system according to claim 16,
wherein in a case where the vertical blanking period is included in the exposure period, the circuitry is further configured to determine a refresh rate so that the exposure time is a sum of an integral multiple of a light emission cycle of the display section and the vertical blanking period, and control the vertical blanking period on a basis of the refresh rate.

* * * * *